(12) United States Patent
Raether

(10) Patent No.: US 10,195,560 B2
(45) Date of Patent: *Feb. 5, 2019

(54) FILTER CARTRIDGE WITH SEAL MEMBER AND METHODS

(71) Applicant: Donaldson Company, Inc., Minneapolis, MN (US)

(72) Inventor: Thomas Donald Raether, St. Louis Park, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/691,242

(22) Filed: Aug. 30, 2017

(65) Prior Publication Data

US 2017/0361255 A1    Dec. 21, 2017

Related U.S. Application Data

(60) Continuation of application No. 15/462,003, filed on Mar. 17, 2017, now Pat. No. 9,776,120, which is a
(Continued)

(51) Int. Cl.
*B01D 46/00* (2006.01)
*B01D 46/52* (2006.01)
(Continued)

(52) U.S. Cl.
CPC ..... *B01D 46/0005* (2013.01); *B01D 46/0068* (2013.01); *B01D 46/125* (2013.01);
(Continued)

(58) Field of Classification Search
CPC ............... B01D 46/00; B01D 46/0005; B01D 46/0068; B01D 46/125; B01D 46/42;
(Continued)

(56) References Cited

U.S. PATENT DOCUMENTS 2,500,531 A   3/1950  Eger
3,789,589 A   2/1974  Delany et al.
(Continued)

FOREIGN PATENT DOCUMENTS

EP    0083169    7/1983
EP    1749562    2/2007
(Continued)

OTHER PUBLICATIONS

European Search Report dated Jan. 27, 2011.
Invitation to Pay Additional Fees with Partial International Search dated Dec. 7, 2010.

*Primary Examiner* — T. Bennett McKenzie
(74) *Attorney, Agent, or Firm* — Merchant & Gould P.C.

(57) ABSTRACT

An air filter cartridge has Z-media and a gasket arrangement with a perimeter gasket member against the downstream flow face and a side gasket member adjacent to at least a partial extension of a first side panel. The side gasket member includes no portion against second, third, and fourth side panels of the air filter cartridge. The air filter cartridge can be used in a dust collector having a tubesheet and a frame arrangement extending from the tubesheet. The perimeter gasket member seals against the frame arrangement and the side gasket member seals against the tubesheet. A method of servicing includes orienting the air filter cartridge against a guide ramp and moving the filter cartridge until the side gasket member is engaged against the tubesheet sealing surface.

14 Claims, 41 Drawing Sheets

Related U.S. Application Data continuation of application No. 14/102,068, filed on Dec. 10, 2013, now Pat. No. 9,597,623, which is a division of application No. 12/901,792, filed on Oct. 11, 2010, now Pat. No. 8,617,276.

(60) Provisional application No. 61/360,659, filed on Jul. 1, 2010, provisional application No. 61/334,665, filed on May 14, 2010, provisional application No. 61/251,493, filed on Oct. 14, 2009.

(51) Int. Cl.
*B01D 46/12* (2006.01)
*B01D 46/42* (2006.01)
*F16J 15/02* (2006.01)

(52) U.S. Cl.
CPC ......... *B01D 46/42* (2013.01); *B01D 46/4227* (2013.01); *B01D 46/525* (2013.01); *B01D 46/526* (2013.01); *F16J 15/02* (2013.01); *B01D 2265/025* (2013.01); *B01D 2265/04* (2013.01); *B01D 2267/30* (2013.01); *B01D 2267/60* (2013.01); *B01D 2271/02* (2013.01); *Y10T 29/4973* (2015.01); *Y10T 29/49826* (2015.01)

(58) Field of Classification Search
CPC .............. B01D 46/4227; B01D 46/525; B01D 46/526; B01D 2265/025; B01D 2265/04; B01D 2267/30; B01D 2267/60; B01D 2271/02; B01D 2201/304; B01D 2201/342; B01D 2201/345; F16J 15/02; Y10T 29/4973; Y10T 29/49826
USPC .............................................. 55/302; 29/428
See application file for complete search history.

(56) References Cited

U.S. PATENT DOCUMENTS

| | | |
|---|---|---|
| 4,373,635 A | 2/1983 | Mules |
| 5,029,878 A | 7/1991 | Ray |
| 5,256,312 A * | 10/1993 | Letersky ................ B01D 29/05 210/767 |
| 5,755,963 A | 5/1998 | Sugiura |
| 5,795,361 A | 8/1998 | Lanier, Jr. et al. |
| 5,820,646 A | 10/1998 | Gillingham et al. |
| 5,840,094 A | 11/1998 | Osendorf |
| 5,871,557 A | 2/1999 | Tokar et al. |
| 6,348,085 B1 | 2/2002 | Tokar |
| 6,673,136 B2 | 1/2004 | Gillingham et al. |
| 7,338,544 B2 | 3/2008 | Sporre et al. |
| 7,674,308 B2 | 3/2010 | Krisko et al. |
| 7,690,527 B2 | 4/2010 | Englund |
| 8,491,691 B2 | 7/2013 | Raether |
| 8,617,276 B2 | 12/2013 | Raether |
| 2002/0059868 A1 | 5/2002 | Gogins et al. |
| 2002/0185823 A1 | 12/2002 | Graber et al. |
| 2004/0187689 A1 | 9/2004 | Sporre et al. |
| 2005/0166559 A1 | 8/2005 | Gillingham et al. |
| 2007/0125052 A1 | 6/2007 | Holzmann et al. |
| 2008/0127825 A1 | 6/2008 | Raether |
| 2008/0127827 A1 | 6/2008 | Raether |
| 2008/0277879 A1 | 11/2008 | Pradelle et al. |
| 2010/0001477 A1 | 1/2010 | Eyers |
| 2011/0083408 A1 | 4/2011 | Raether et al. |

FOREIGN PATENT DOCUMENTS

| | | |
|---|---|---|
| WO | WO 91/19898 | 12/1991 |
| WO | WO 2008/045325 A2 | 4/2008 |
| WO | WO 2009/100119 A1 | 8/2009 |

\* cited by examiner

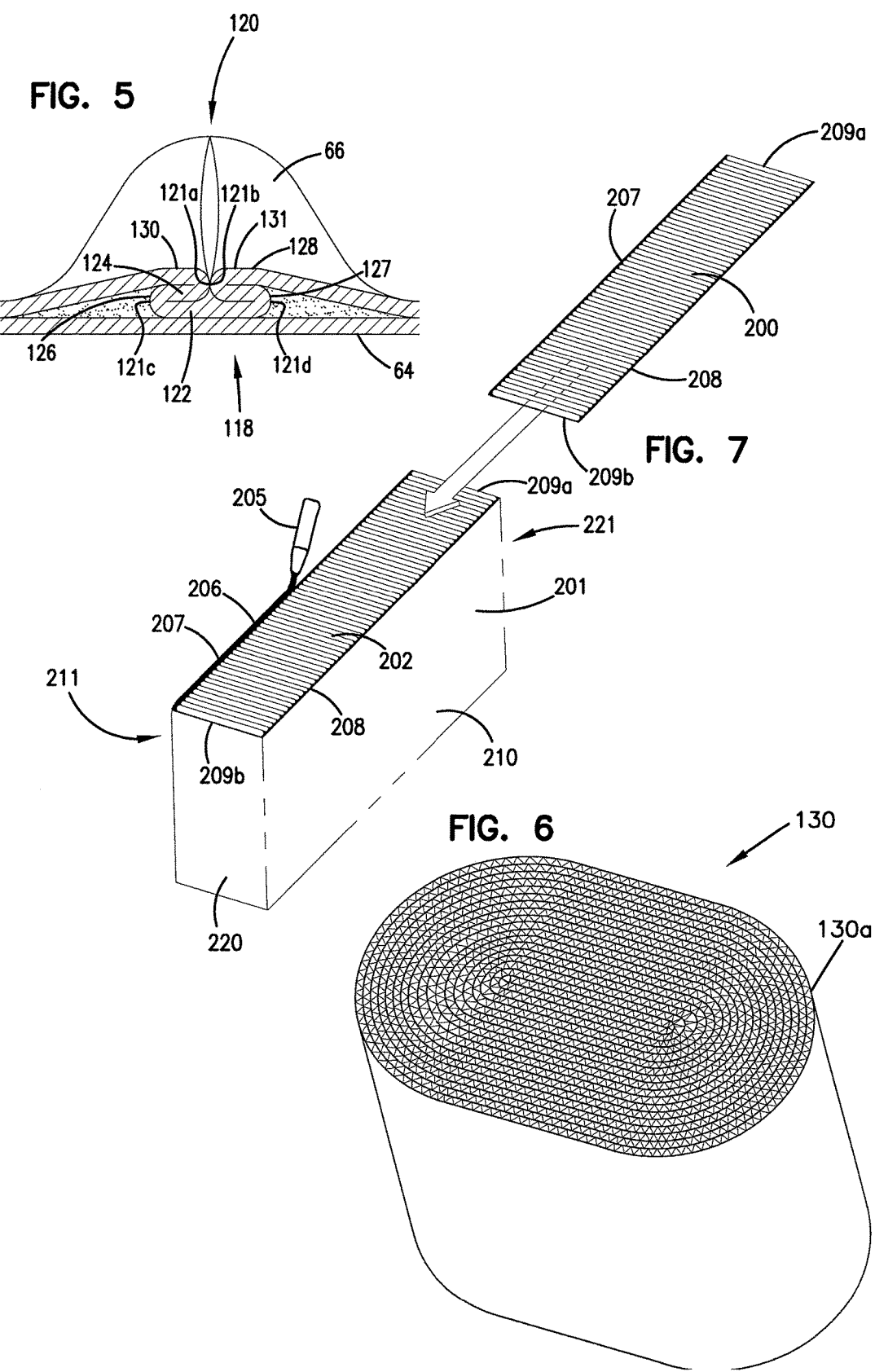

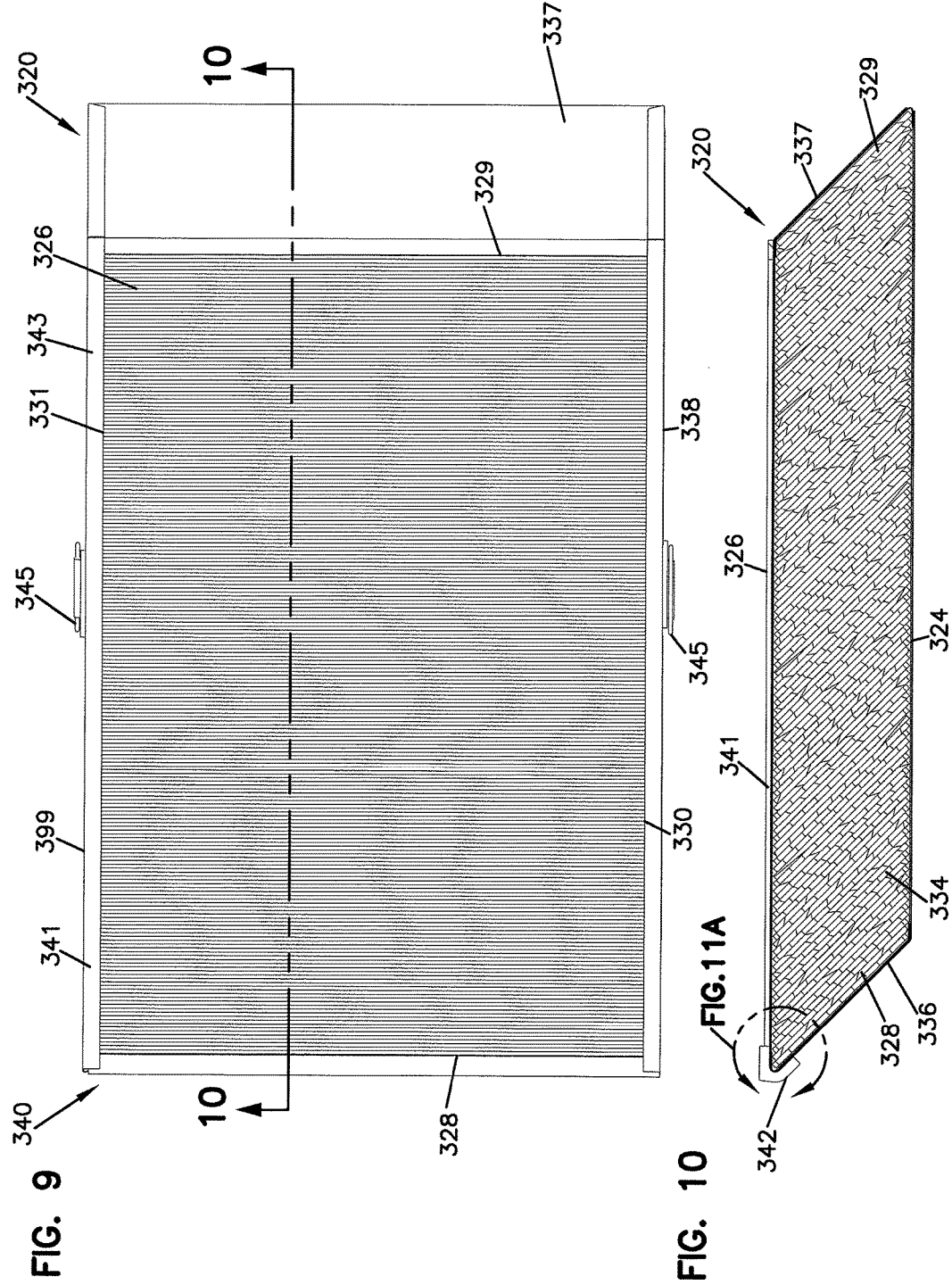

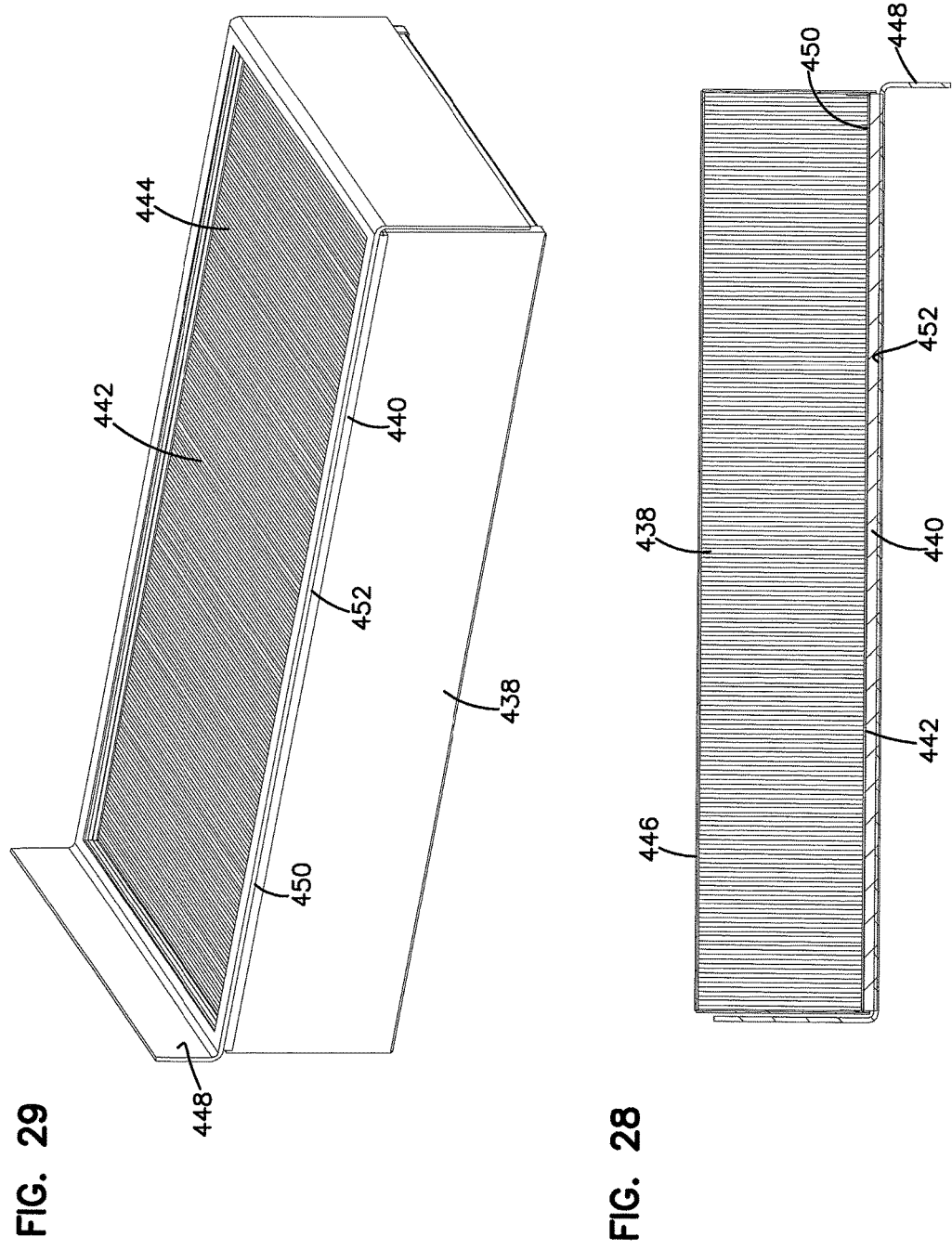

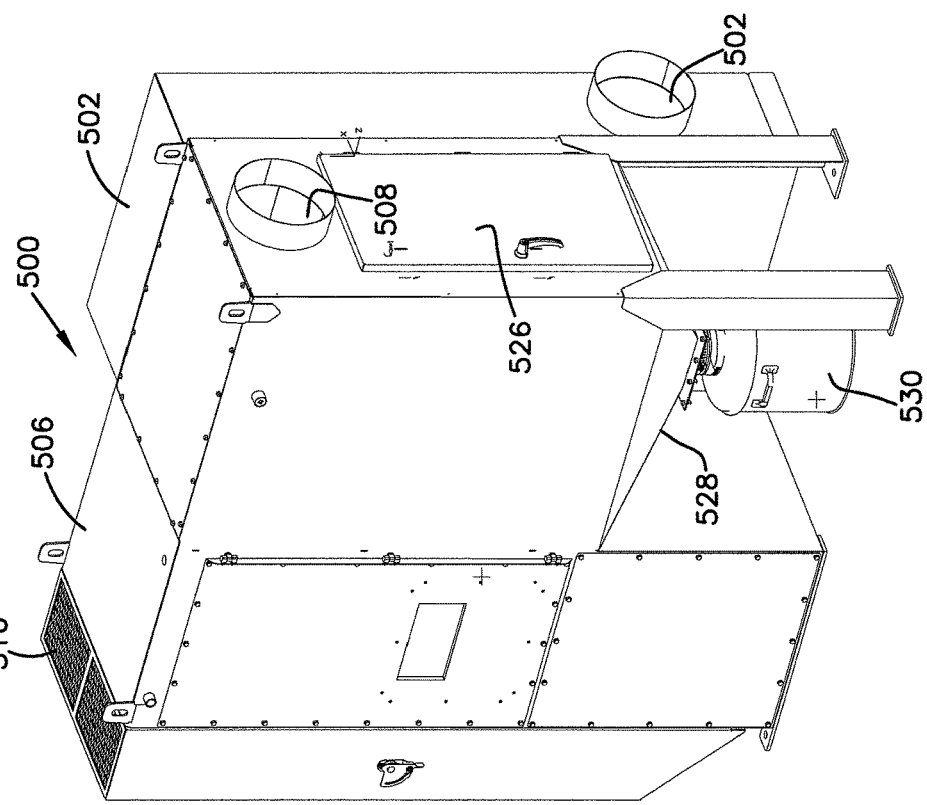
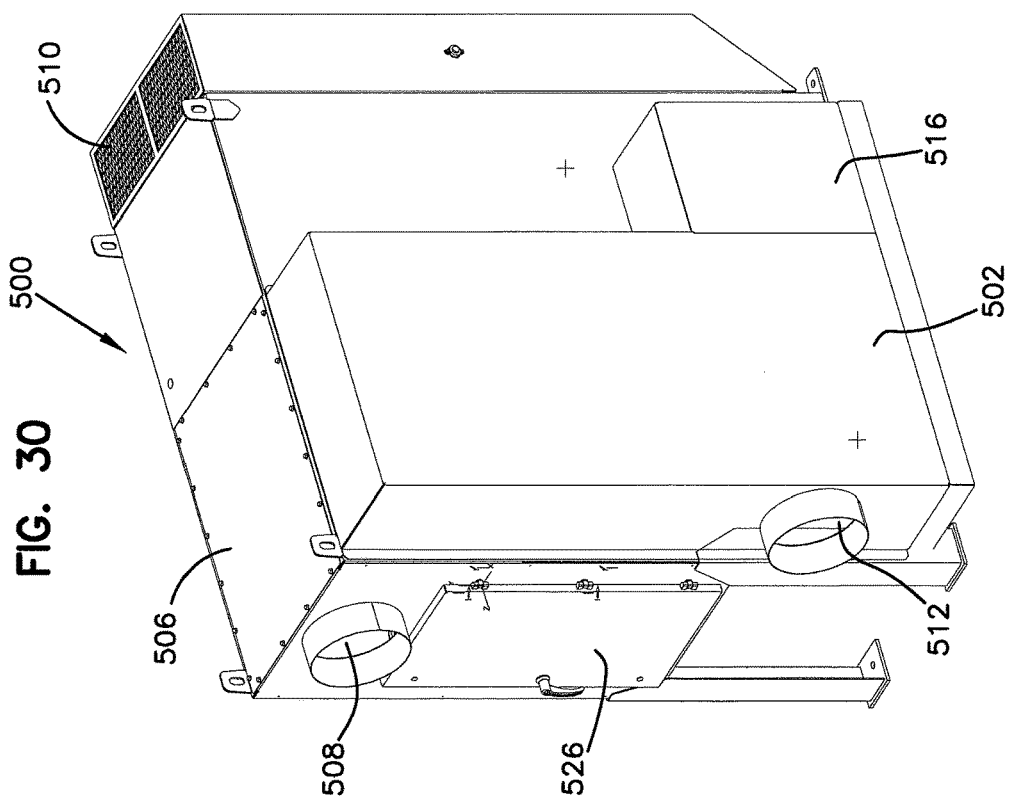

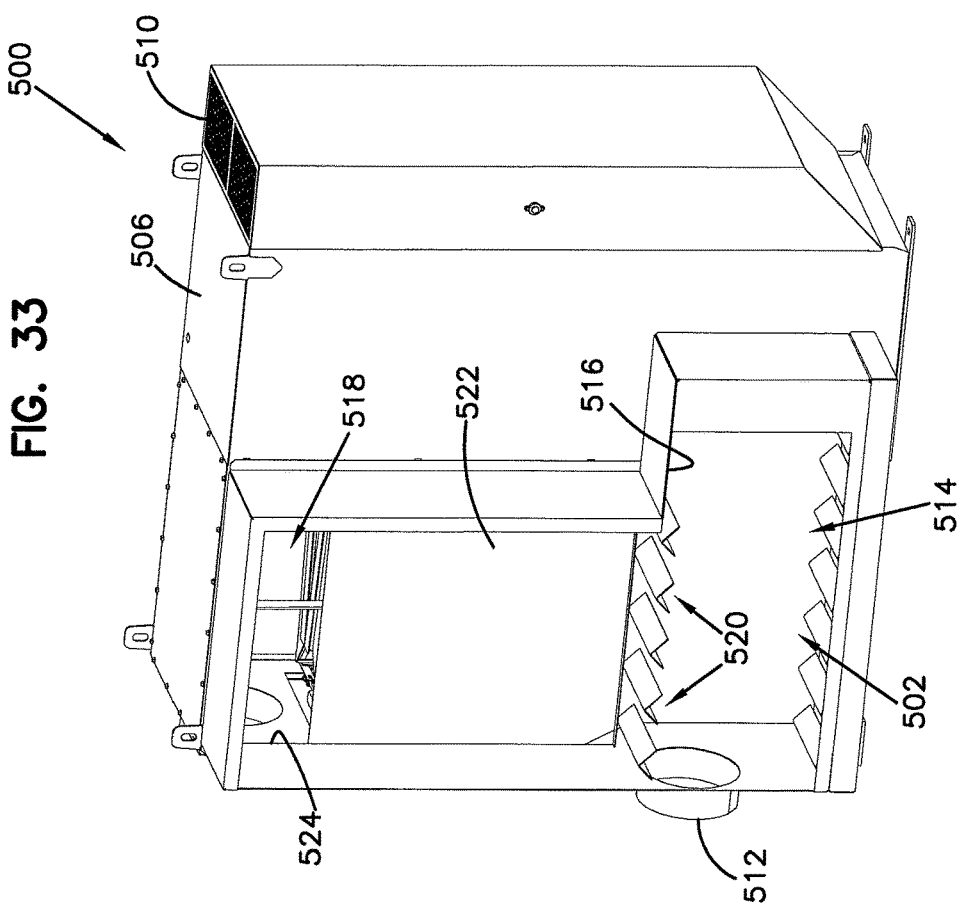
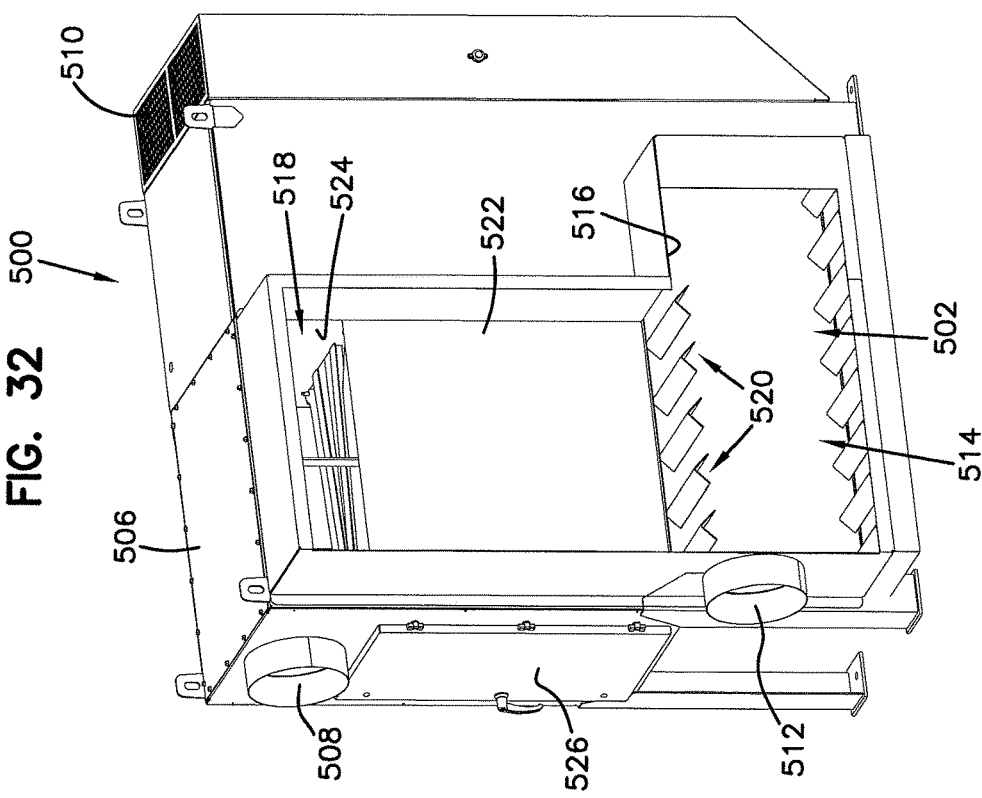

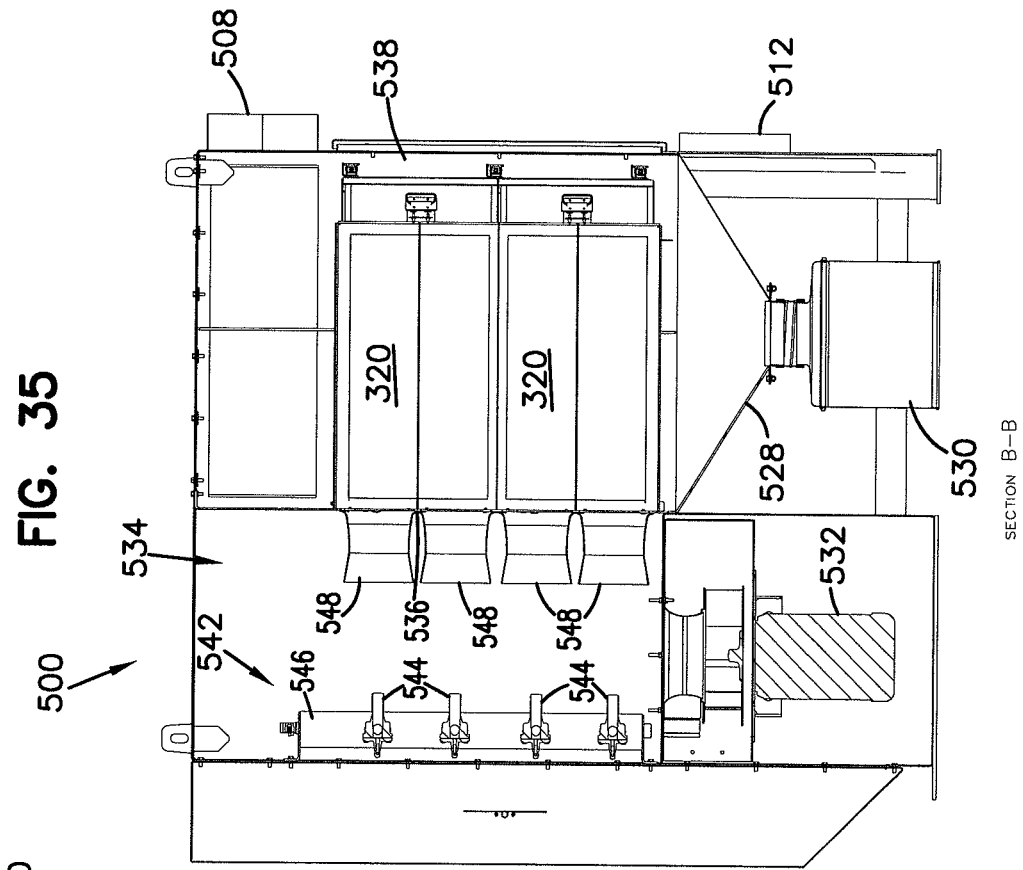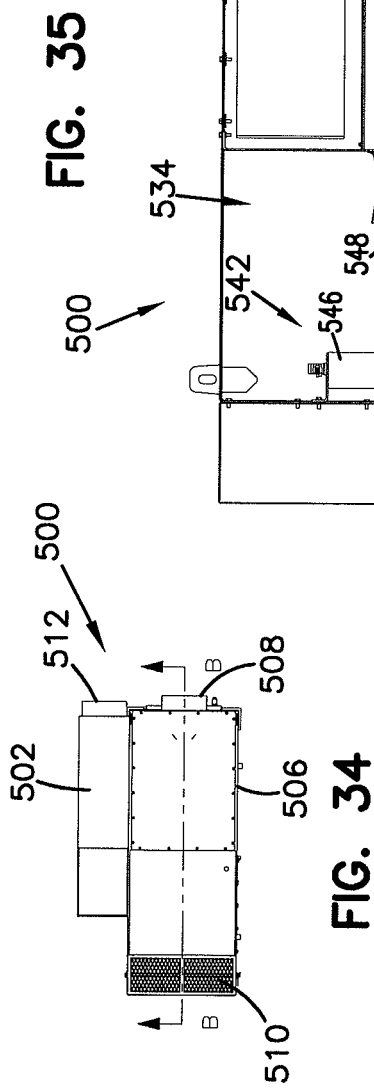

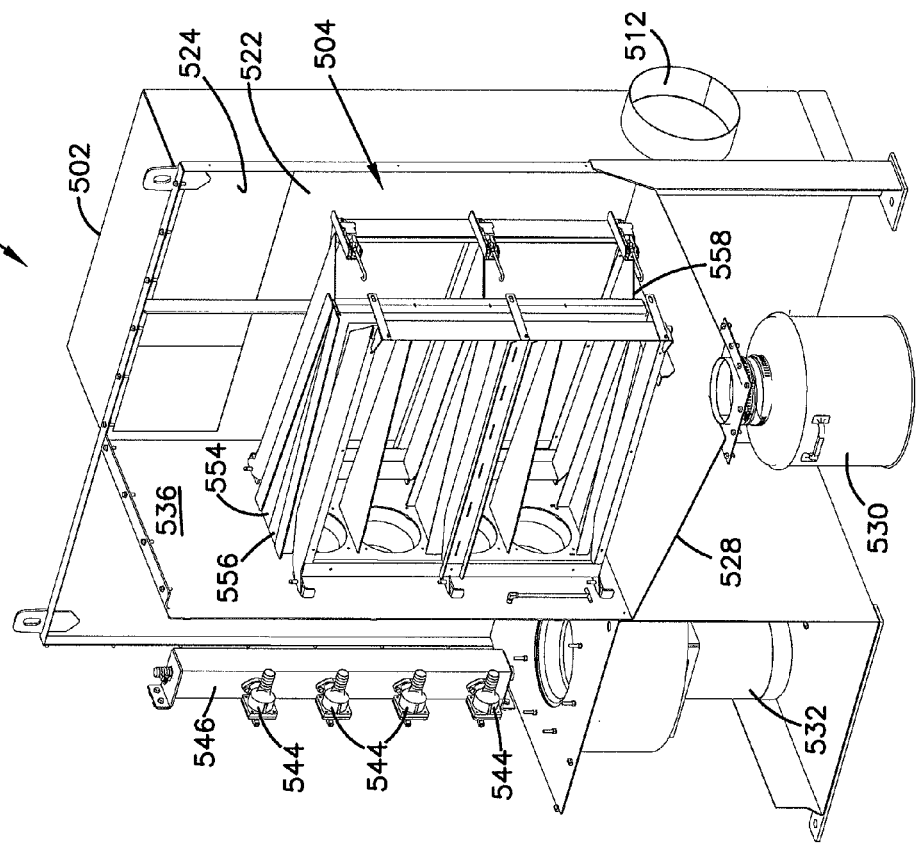
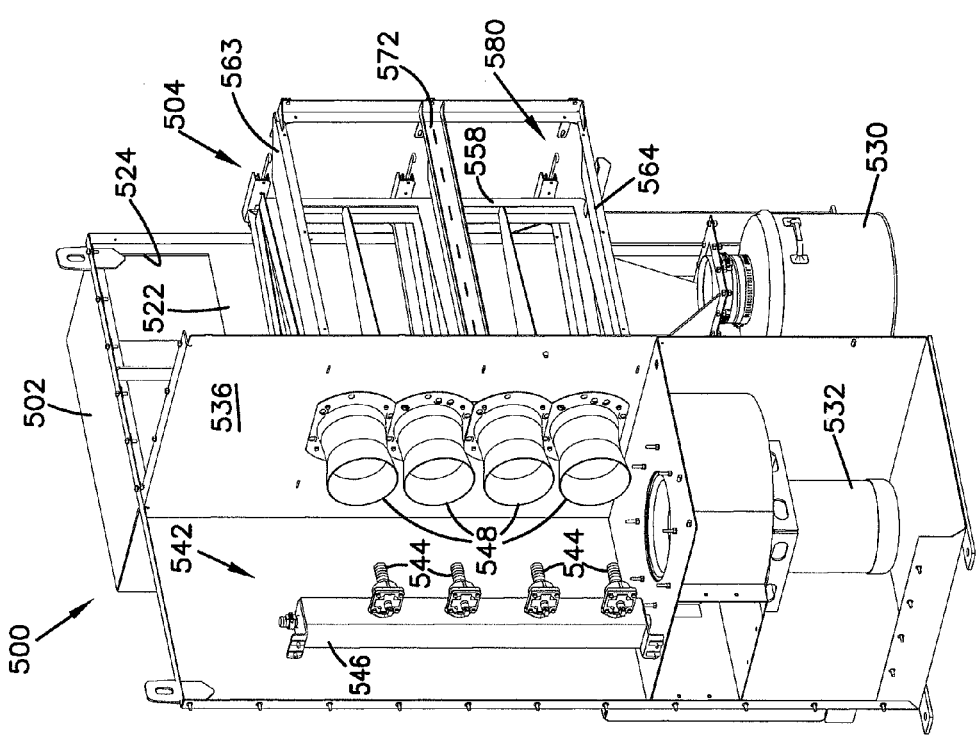

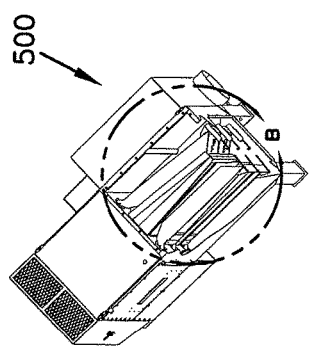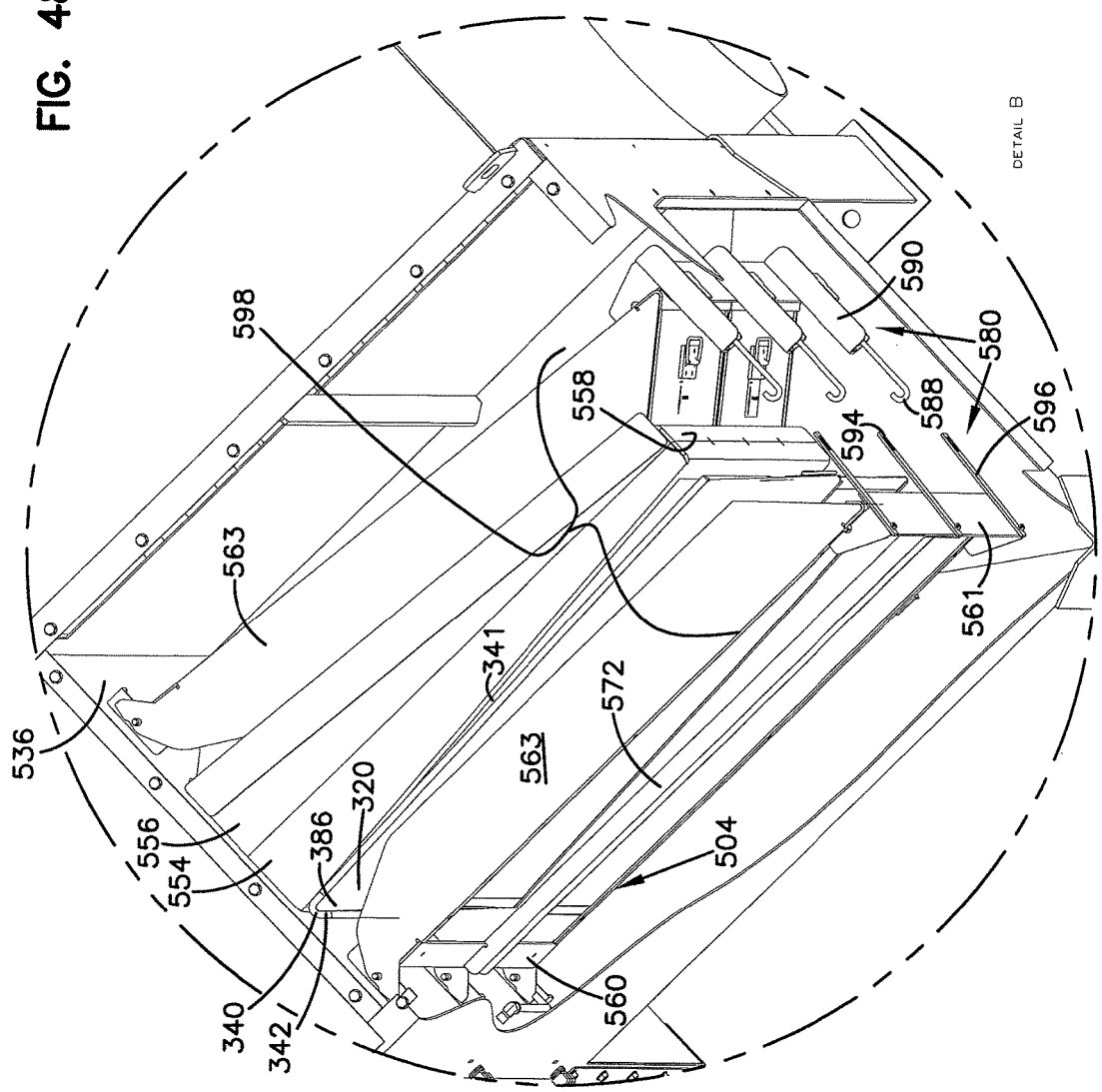

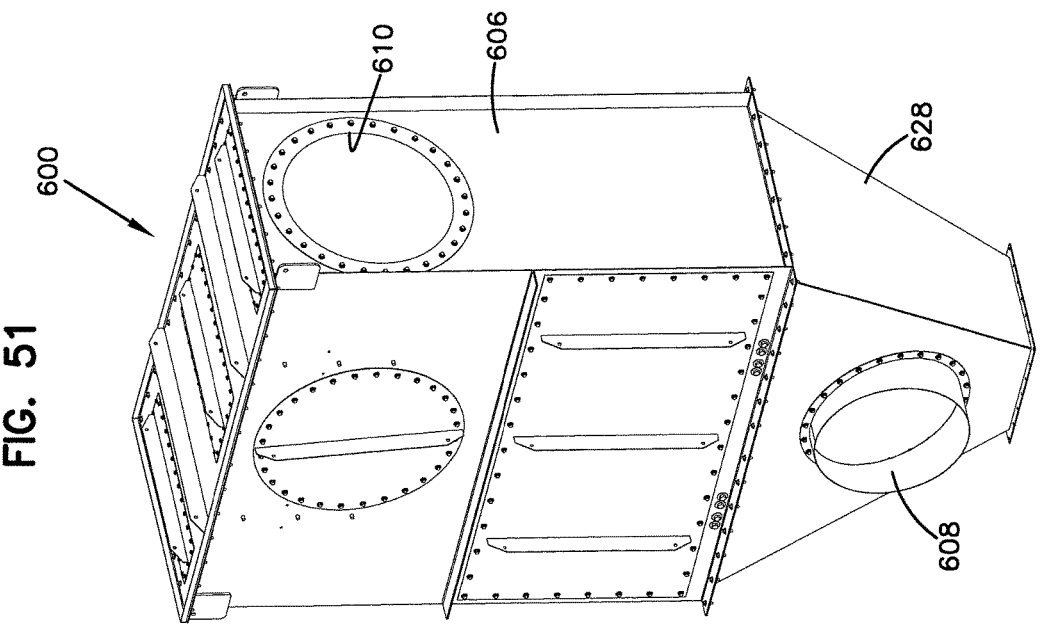
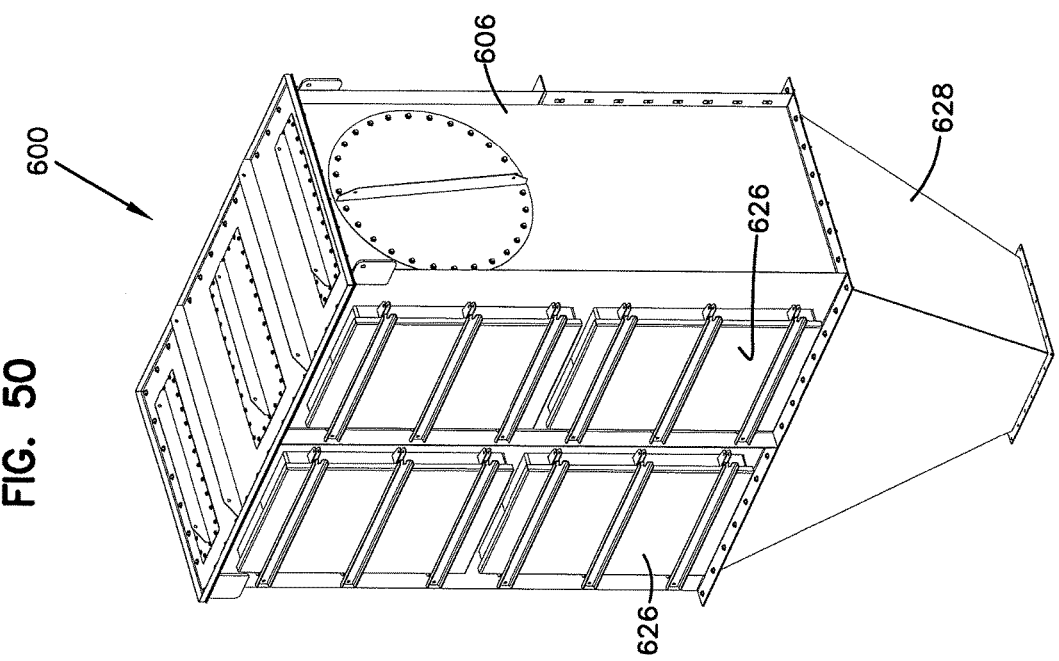

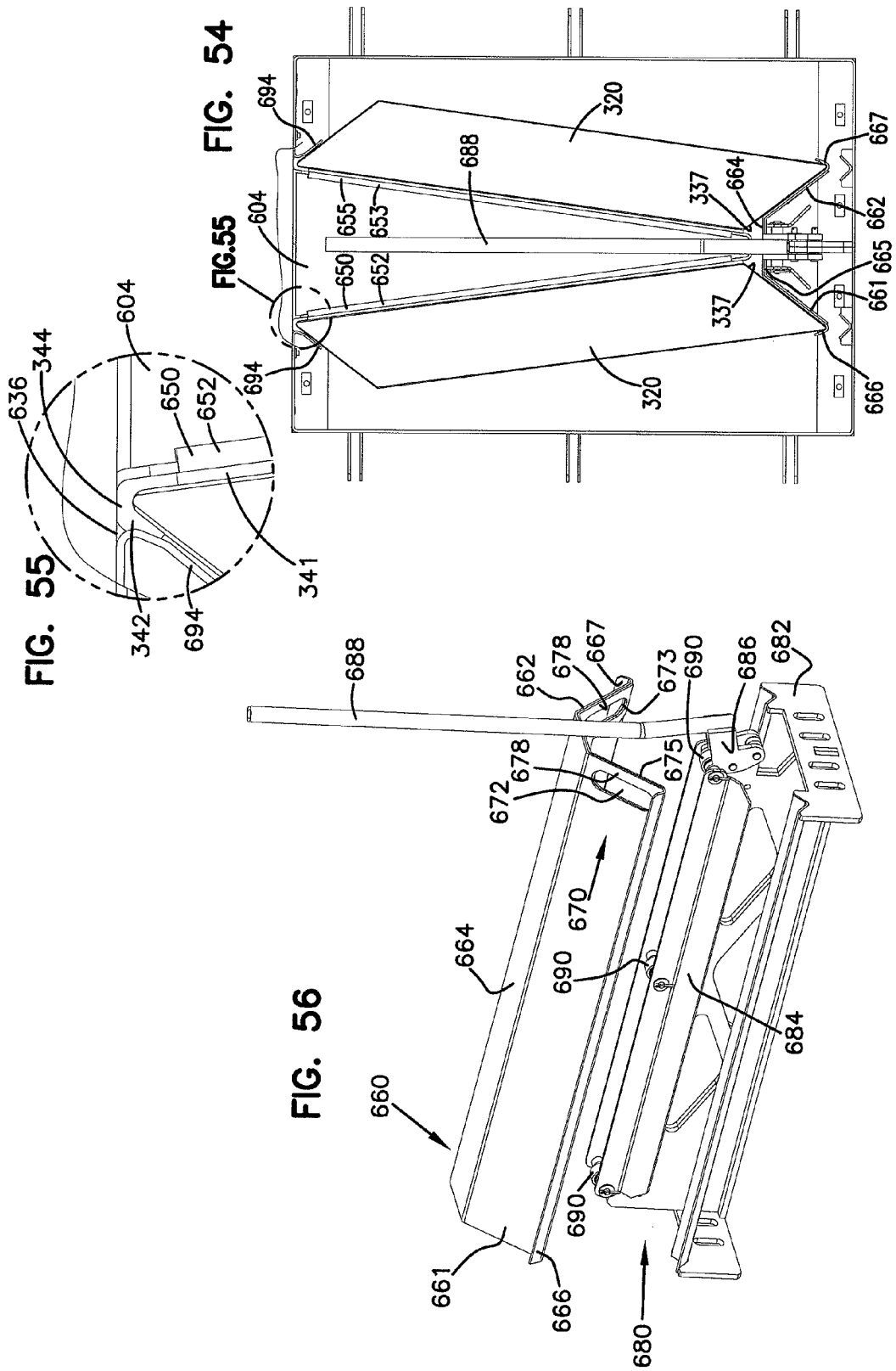

FILTER CARTRIDGE WITH SEAL MEMBER AND METHODS

This application is a continuation of application Ser. No. 15/462,003 filed Mar. 17, 2017, which is a continuation of application Ser. No. 14/102,068 filed Dec. 10, 2013, now U.S. Pat. No. 9,597,623, which is a divisional application of Ser. No. 12/901,792 filed Oct. 11, 2010, now U.S. Pat. No. 8,617,276, which application claims priority under 35 U.S.C. § 119(e) to U.S. provisional patent applications 61/251,493 filed Oct. 14, 2009; 61/334,665 filed May 14, 2010; and 61/360,659 filed Jul. 1, 2010. The disclosures of each of these applications are incorporated herein by reference in their entireties.

TECHNICAL FIELD

This disclosure concerns filters for cleaning air, for example, for use in dust collectors and other equipment. In particular, this disclosure concerns z-filters and dust collectors utilizing the z-filters and methods for using them.

BACKGROUND

Dust collectors are used to clean particulate matter from air flow streams. One embodiment of dust collectors includes bag house filters. Bag house filters include a housing, a dirty air inlet, a clean air outlet, and a tubesheet having a plurality of apertures. The tubesheet separates the housing between a dirty air side and a clean air side and holds the filter bags. The bags are made of a filter media so that as dirty air flows from the dirty air side to the clean air side, the air must flow through the bags, and the filter media of the bags prevents particulate matter from reaching the clean air side.

Another embodiment of dust collectors that is known includes the use of filter cartridges having pleated media in the form of cylinders or ovals. The filter cartridges are held by a tubesheet, and the air must flow through the pleated media of the filter cartridges from the dirty air side to the clean air side. Improvements in dust collectors are desirable.

SUMMARY

Z-filter cartridges are described that are capable of cleaning particulate matter from air flow streams. These z-filter cartridges can be utilized with dust collectors. Embodiments of dust collectors are described.

In one aspect, an air filter cartridge is provided including a media pack having upstream and downstream opposite flow faces and first and second opposite sides extending between the upstream and downstream opposite flow faces. A first side panel is against the first side of the media pack. A gasket arrangement is included. The gasket arrangement has a perimeter gasket member against the downstream flow face and around a perimeter of the downstream flow face. The gasket arrangement also includes a side gasket member, integral with the perimeter gasket member, and adjacent to at least a partial extension of the first side panel.

In another aspect, a dust collector is provided including a housing having a dirty air inlet, a clean air outlet, a tubesheet, and a frame arrangement. The tubesheet separates the housing between an unfiltered air plenum and a filtered air plenum. The tubesheet has a plurality of apertures therethrough and a sealing surface. The frame arrangement extends from the tubesheet. A first air filter cartridge includes a media pack having upstream and downstream opposite flow faces and first and second opposite sides extending between the upstream and downstream opposite flow faces. A first side panel is against the first side of the media pack. A gasket arrangement includes a perimeter gasket member against the downstream flow face and around a perimeter of the downstream flow face. The perimeter gasket member is compressed against the frame arrangement. The gasket arrangement also includes a side gasket member, integral with the perimeter gasket member, and adjacent to at least a partial extension of the first side panel. The side gasket member is compressed against the tubesheet sealing surface.

In another aspect, a method of filtering air includes directing dirty air into an unfiltered air plenum of a housing, the housing having a tubesheet and a frame arrangement. Next, there is the step of directing the dirty air through an upstream side of a media pack of a first air filter cartridge to remove contaminant from the dirty air and result in filtered air in the filtered air plenum. The media pack has upstream and downstream opposite flow faces and first and second opposite sides extending between the upstream and downstream opposite flow faces. A first side panel is against the first side of the media pack. Next, there is the step of preventing dirty air from bypassing the first air filter cartridge by a gasket arrangement including a perimeter gasket member against the downstream flow face and around a perimeter of the downstream flow face, the perimeter gasket member being compressed against the frame arrangement. A side gasket member, integral with the perimeter gasket member, and adjacent to at least a partial extension of the first side panel is compressed against the tubesheet sealing surface.

In another aspect, a method of servicing a dust collector includes providing a first air filter cartridge including a media pack having upstream and downstream opposite flow faces and first and second opposite sides extending between the upstream and downstream opposite flow faces. A first side panel is against the first side of the media pack. A gasket arrangement includes a perimeter gasket member against the downstream flow face and around a perimeter of the downstream flow face, and it includes a side gasket member that is adjacent to at least a partial extension of the first side panel. Next, there is the step of orienting the first air filter cartridge in a dust collector housing. The dust collector housing has a tubesheet and a frame arrangement. The tubesheet separating the housing between the unfiltered air plenum and a filtered air plenum has a plurality of apertures therethrough and a sealing surface. The frame arrangement extends from the tubesheet. While orienting the first air filter cartridge, there is the step moving the first filter cartridge until the side gasket member is engaged against the tubesheet sealing surface.

A gasket for use with a filter cartridge includes a first gasket segment having a free end and an opposite first end; a second gasket segment having a free end and an opposite second end; the second gasket segment being angled relative to the first gasket segment at an angle of 20-70°; a ratio of a length of the first gasket segment to the second gasket segment being between 1-2.5; and an intermediate gasket segment joining the first end of the first gasket segment and the second end of the second gasket segment. The first gasket segment, second gasket segment, and intermediate gasket segment together define an open filter cartridge-receiving cavity constructed and arranged to receive a filter cartridge.

It is noted that not all these specific features described herein need to be incorporated in an arrangement for the arrangement to have some selected advantage according to the present disclosure.

BRIEF DESCRIPTION OF THE DRAWINGS

FIG. 5 is a schematic, cross-sectional view of an example of a darted fluted;

FIG. 6 is a schematic, perspective view of a coiled media construction comprising a coiled sheet of single facer media material;

FIG. 7 is a schematic, perspective view of a stacked media construction;

FIG. 9 is a top view of the air filter cartridge of FIG. 8;

FIG. 10 is a cross-sectional view of the air filter cartridge of FIG. 8, the cross-section being taken along the line 10-10 of FIG. 9;

FIG. 28 is a side elevational view of an alternative embodiment of an air filter cartridge secured to an adapter flange, which can be used with the dust collectors of FIGS. 14-25;

FIG. 29 is a perspective view of the filter cartridge and adapter plate depicted in FIG. 28;

FIG. 30 is a perspective view of a second embodiment of a dust collector constructed in accordance with principles of this disclosure;

FIG. 31 is another perspective view of the dust collector of FIG. 30;

FIG. 32 is a perspective view of the dust collector of FIG. 30 with a wall removed to expose internal components;

FIG. 33 is another perspective view of the dust collector of FIG. 32, with a wall removed to show internal components;

FIG. 34 is a top view of the dust collector of FIGS. 30-33;

FIG. 35 is a cross sectional view of the dust collector of FIG. 34, the cross-section being taken along the line B-B of FIG. 34;

FIG. 38 is a perspective view of the dust collector of FIGS. 30-37 with external walls removed and with the filter elements removed, to show the internal components;

FIG. 39 is a perspective view of the dust collector of FIG. 38;

FIG. 47 is another upper perspective view of the dust collector of FIGS. 30-43;

FIG. 48 is an upper perspective view of a portion of the dust collector, the portion being detail b from FIG. 47;

FIG. 50 is another perspective of the dust collector of FIG. 49;

FIG. 51 is another perspective view of the dust collector of FIG. 49;

FIG. 54 is a front view of a portion of the dust collector of FIG. 49, showing the filter elements installed and sealed in position;

FIG. 55 is an enlarged view of a portion of FIG. 54;

FIG. 56 is an exploded, perspective view of a lift assembly utilized in the dust collector of FIG. 49;

DETAILED DESCRIPTION

I. Z-Filter Media Configurations, Generally.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

Figure 11A:
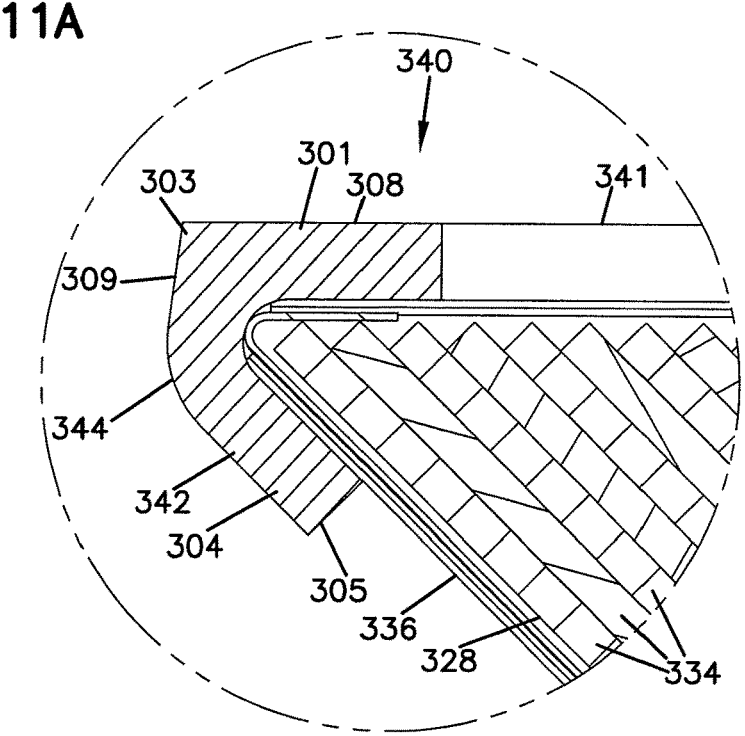
FIG. 11A is an enlarged view of a portion of the cross-section of FIG. 10.

The fluted (typically corrugated) media sheet and the facing media sheet, together, are used to define media having parallel inlet and outlet flutes; i.e. opposite sides of the fluted sheet operable as inlet and outlet flow regions. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is shown herein at FIG. 7 and described in FIG. 11 of U.S. Pat. No. 5,820,646, incorporated herein by reference.

Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, published Sep. 30, 2004 as WO 2004/082795, incorporated herein by reference. The resulting coiled arrangement generally has, as the outer surface of the media pack, a portion of the facing sheet, as a result. In some instances a protective covering can be provided around the media pack.

The term "corrugated" when used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending there across.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. (The term "straight through flow configuration" disregards, for this definition, any air flow that passes out of the media pack through the outermost wrap of facing media.) The term "serviceable" in this context is meant to refer to a media containing filter cartridge that is periodically removed and replaced from a corresponding air cleaner. In some instances, each of the inlet flow end and outlet flow end will be generally flat or planar, with the two parallel to one another. However, variations from this, for example non-planar faces are possible.

In general, the media pack includes appropriate seal material therein, to ensure there is no unfiltered flow of air through the media pack, in extension from front flow face (an inlet flow face) completely through and outwardly from opposite oval face (outlet flow face).

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to inhibit air flow from one flow face to another without filtering passage through the filter media; and/or, such a media coiled or otherwise constructed or formed into a three dimensional network of flutes; and/or, a filter construction including such media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face. However, alternative z-filter media arrangements are possible, see for example US 2006/0091084 A1, published May 4, 2006, incorporated herein by reference; also comprising flutes extending between opposite flow faces, with a seal arrangement to prevent flow of unfiltered air through the media pack.

Figure 1:
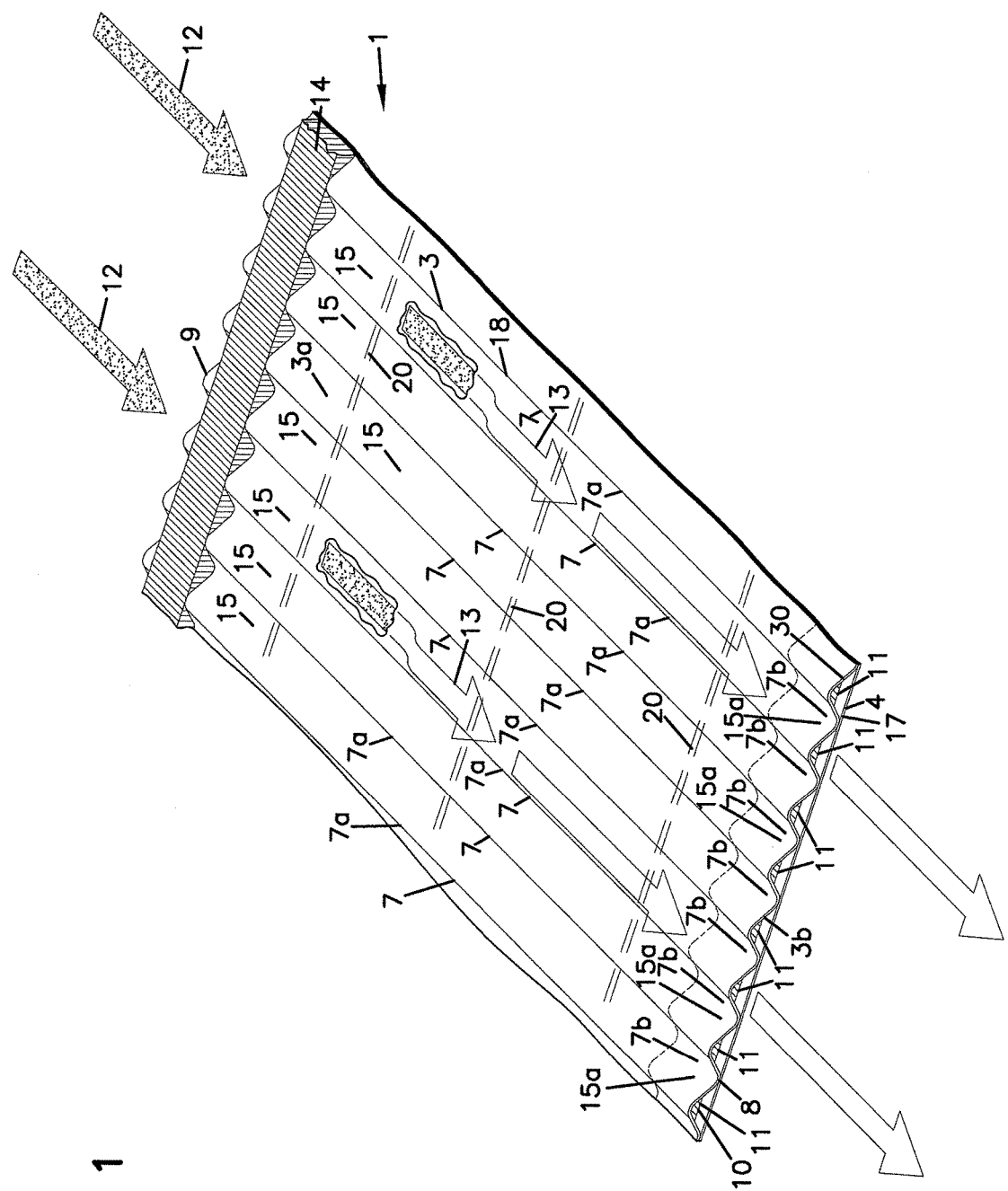
FIG. 1 is a fragmentary, schematic, perspective view of a single facer strip of z-filter media comprising a flutes sheet secured to a facing sheet.

In FIG. 1 herein, an example of media 1 useable in z-filter media is shown. The media 1 is formed from a fluted (corrugated) sheet 3 and a facing sheet 4. Herein, a strip of media comprising fluted sheet secured to facing sheet will sometimes be referred to as a single facer strip, or by similar terms.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction; an equal number of ridges and troughs are necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70% (typically at least 80%) of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

In the example shown, adjacent edge 8 is provided sealant, in this instance in the form of a sealant bead 10, sealing the corrugated (fluted) sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

In the example shown, adjacent edge 9, is provided sealant, in this instance in the form of a seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus, bead 14 will form a seal between a back side 17 of facing sheet 4, and side 18 of the corrugated sheet 3. The bead 14 will sometimes be referred to as a "winding bead" since it is typically applied, as the strip 1 is coiled into a coiled media pack. If the media 1 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

In more general terms, z-filter media comprises fluted filter media secured to facing filter media, and configured in a media pack of flutes extending between first and second opposite flow faces. A sealant arrangement is provided within the media pack, to ensure that air entering flutes at a first upstream edge cannot exit the media pack from a downstream edge, without filtering passage through the media.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media especially those which use straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Still referring to FIG. 1, at 20 tack beads are shown positioned between the corrugated sheet 3 and facing sheet 4, securing the two together. The tack beads can be for example, discontinuous lines of adhesive. The tack beads can also be points in which the media sheets are welded together.

From the above, it will be apparent that the corrugated sheet 3 is typically not secured continuously to the facing sheet, along the troughs or ridges where the two adjoin. Thus, air can flow between adjacent inlet flutes, and alternately between the adjacent outlet flutes, without passage through the media. However air which has entered in inlet flute cannot exit from an outlet flute, without passing through at least one sheet of media, with filtering.

Figure 2:
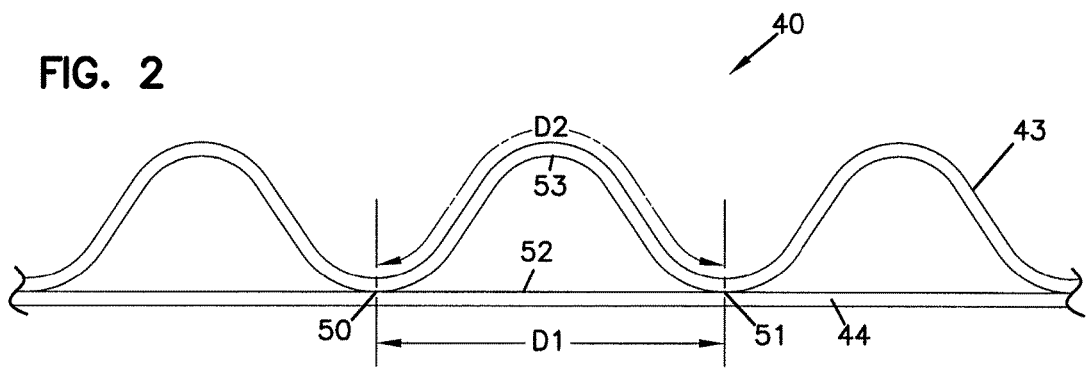
FIG. 2 is an enlarged, schematic, fragmentary view of a single facer sheet comprising fluted media secured to the facing media.

Attention is now directed to FIG. 2, in which a z-filter media construction 40 utilizing a fluted (in this instance regular, curved, wave pattern corrugated) sheet 43, and a non-corrugated flat, facing, sheet 44, is depicted. The distance D1, between points 50 and 51, defines the extension of flat media 44 in region 52 underneath a given corrugated flute 53. The length D2 of the arch-shaped media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows: |
| | R1000 = .0675 inch (1.715 mm); R1001 = .0581 inch (1.476 mm); |
| | R1002 = .0575 inch (1.461 mm); R1003 = .0681 inch (1.730 mm); |
| DCI B Flute: | Flute/flat = 1.32:1; The Radii (R) are as follows: |
| | R1004 = .0600 inch (1.524 mm); R1005 = .0520 inch (1.321 mm); |
| | R1006 = .0500 inch (1.270 mm); R1007 = .0620 inch (1.575 mm); |

TABLE A-continued (Flute definitions for FIG. 3)

| | |
|---|---|
| Std. E Flute: | Flute/flat = 1.24:1; The Radii (R) are as follows:<br>R1008 = .0200 inch (.508 mm); R1009 = .0300 inch (.762 mm);<br>R1010 = .0100 inch (.254 mm); R1011 = .0400 inch (1.016 mm); |
| Std. X Flute: | Flute/flat = 1.29:1; The Radii (R) are as follows:<br>R1012 = .0250 inch (.635 mm); R1013 = .0150 inch (.381 mm); |
| Std. B Flute: | Flute/flat = 1.29:1; The Radii (R) are as follows:<br>R1014 = .0410 inch (1.041 mm); R1015 = .0310 inch (.7874 mm);<br>R1016 = .0310 inch (.7874 mm); |
| Std. C Flute: | Flute/flat = 1.46:1; The Radii (R) are as follows:<br>R1017 = .0720 inch (1.829 mm); R1018 = .0620 inch (1.575 mm); |
| Std. A Flute: | Flute/flat = 1.53:1; The Radii (R) are as follows:<br>R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and Ser. No. 12/012,785, filed Feb. 4, 2008 can be used, with air cleaner features as characterized herein below. The complete disclosures of each of U.S. Ser. Nos. 12/215,718 and 12/012,785 are incorporated herein by reference.

Figure 3A:
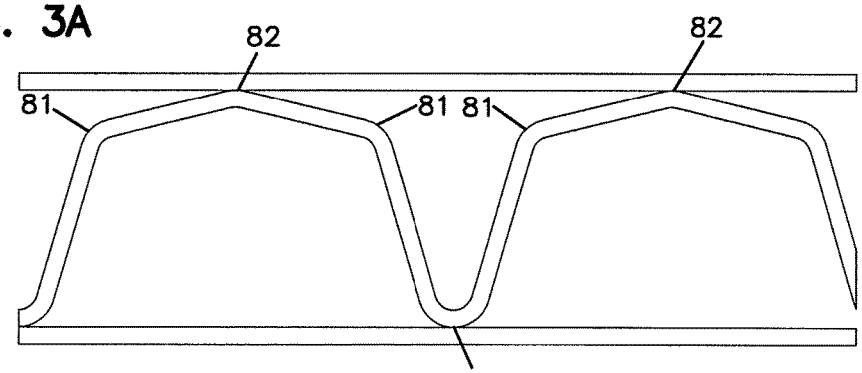
FIG. 3A is schematic, fragmentary, cross-sectional view of a further fluted media configuration in a single facer media pack.
Figure 3B:
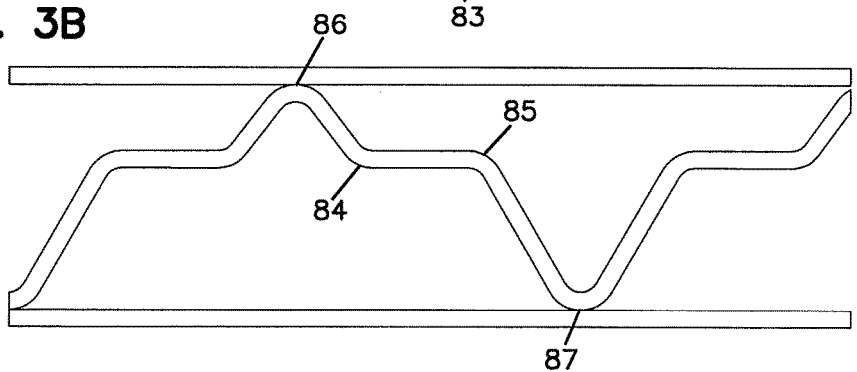
FIG. 3B is a schematic, fragmentary, cross-sectional view of a still further alternate flute definition.
Figure 3C:
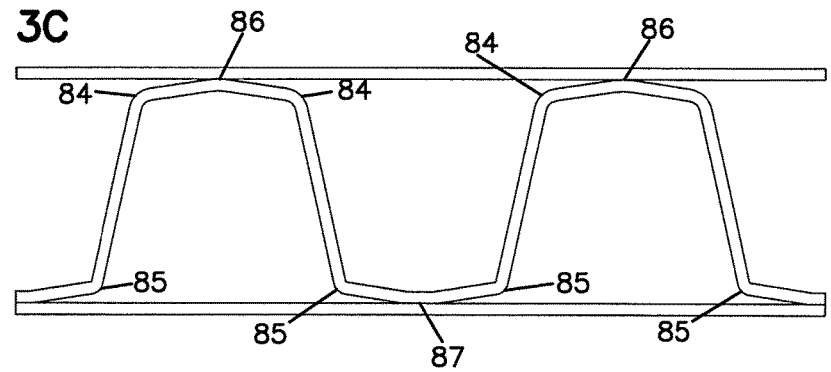
FIG. 3C is a schematic, fragmentary, cross-sectional view of yet another flute definition for a media pack.
Figure 3:
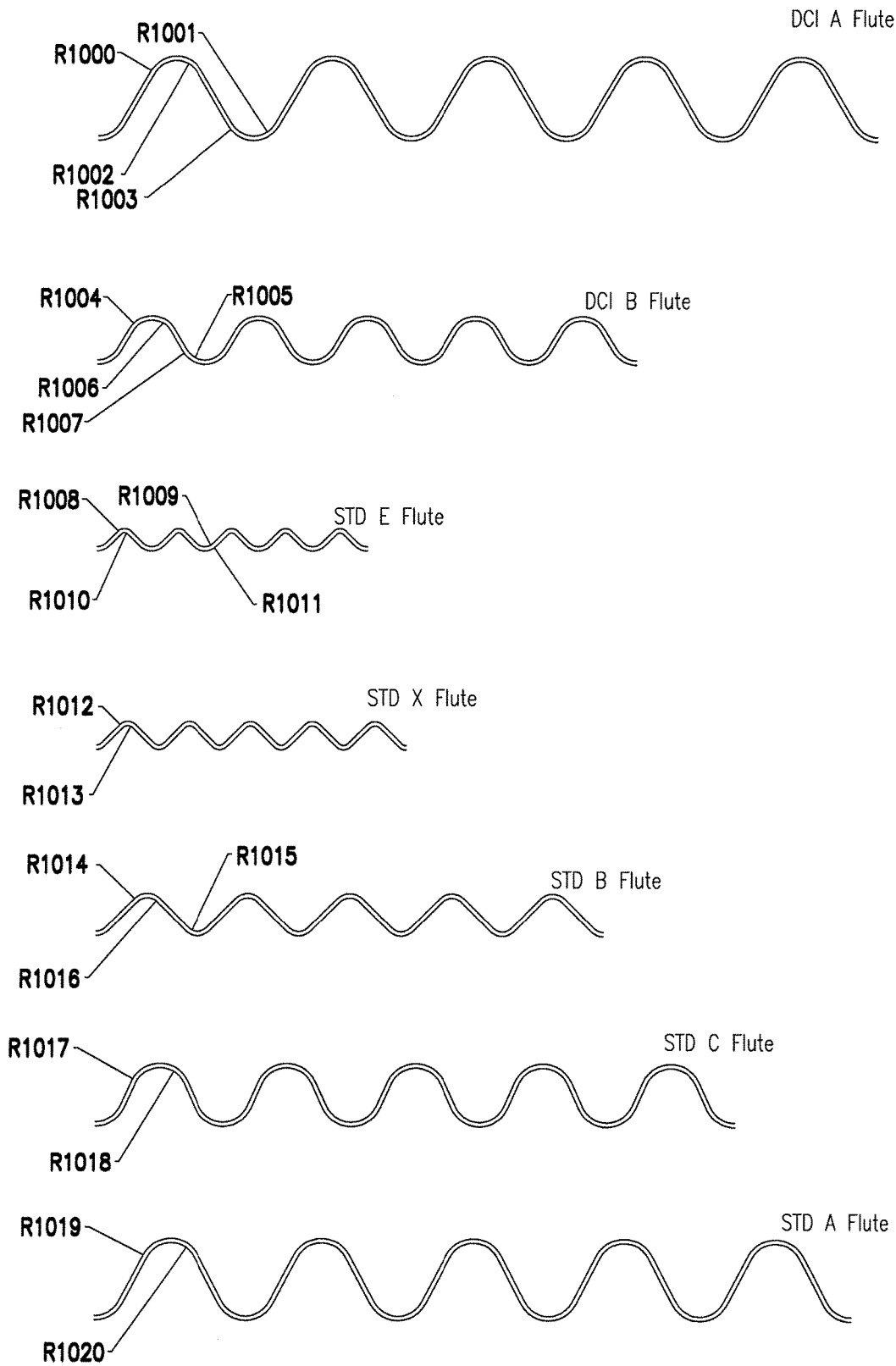
FIG. 3 is a schematic view of various selected flute shapes.

In FIGS. 3A-3C, cross-sectional views of exemplary portions of filtration media are shown wherein the fluted sheet has one or more non-peak ridge extending along at least a portion of the flute length. FIG. 3A shows a fluted sheet having one non-peak ridge 81 provided between adjacent peaks 82, 83, and FIGS. 3B and 3C show fluted sheets having two non-peak ridges 84, 85 between adjacent peaks 86, 87. The non-peak ridges 81, 84, 85 can extend along the flute length any amount including, for example, an amount of 20% of the flute length to 100% of the flute length. In addition, the fluted sheet can be provided without non-peak ridges 81, 84, 85 between all adjacent peaks 82, 83, 86, 87, and can be provided with differing numbers of non-peak ridges 81, 84, 85 between adjacent peaks 82, 83, 86, 87 (e.g., alternating zero, one, or two non-peak ridges in any arrangement). The presence of non-peak ridges 81, 84, 85 can help provide more media available for filtration in a given volume, and can help reduce stress on the fluted sheet thereby allowing for a smaller radius at the peaks and therefore reduced media masking. Such media can be used in arrangements according to the present disclosure.

II. Manufacture of Coiled Media Configurations Using Fluted Media, Generally.

Figure 4:
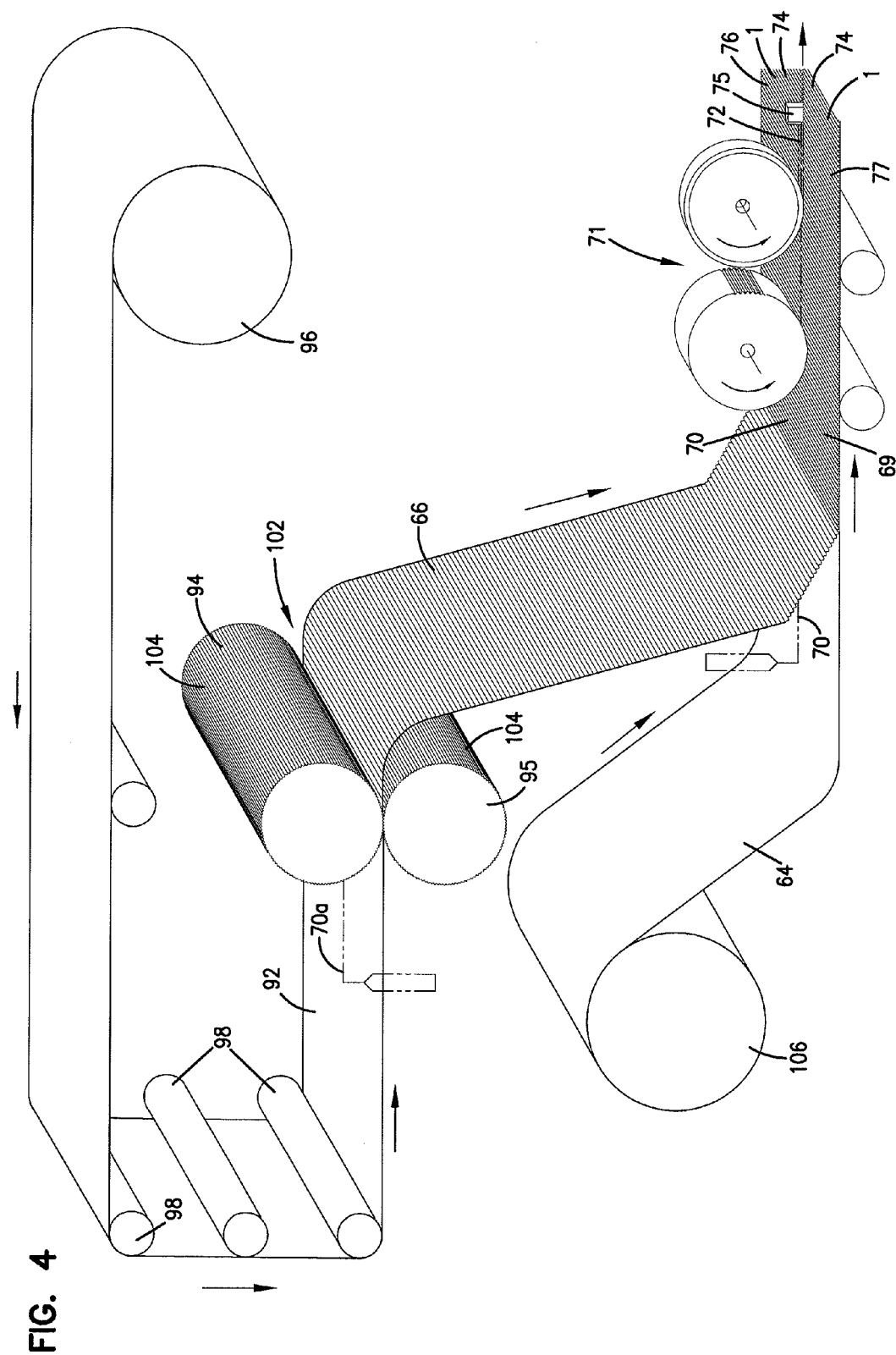
FIG. 4 is a schematic view of a process for making single facer media for use in a media pack according to the present disclosure.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located there between at 70. The adhesive bead 70 will form a single facer bead 14, FIG. 1.

The term "single facer bead" references a sealant bead positioned between layers of a single facer; i.e., between the fluted sheet and facing sheet.

An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location. The strips or pieces 76, 77 can then be cut across, into single facer strips for stacking, as described below in connection with FIG. 7.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of media 92 through a pair of corrugation rollers 94, 95. In the schematic shown in FIG. 4, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

Of course the equipment of FIG. 4 can be modified to provide for the tack beads 20, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In example applications, typically D2=1.25-

1.35×D1, although alternatives are possible. In some instances the techniques may be applied with curved wave patterns that are not "regular," including, for example, ones that do not use straight flutes. Also, variations from the curved wave patterns shown are possible.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, and 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and incorporated herein by reference.

Alternate approaches to darting the fluted ends closed are possible. Such approaches can involve, for example, darting which is not centered in each flute, and rolling or folding over the various flutes. In general, darting involves folding or otherwise manipulating media adjacent to fluted end, to accomplish a compressed, closed state.

Techniques described herein are particularly well adapted for use in media packs that result from a step of coiling a single sheet comprising a corrugated sheet/facing sheet combination, i.e., a "single facer" strip.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US 04/07927, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Reference numeral 130, FIG. 6, generally indicates a coiled media pack 130. The coiled media pack 130 comprises a single strip 130a of single facer material comprising a fluted sheet secured to facing sheet coiled around a center, which can include a core, or which can be careless as illustrated. Typically, the coiling is with facing sheeting directed outwardly. As previously described, in general a single facer bead and winding bead would be used, to provide flute seals within the media.

The particular coiled media pack 130 depicted comprises an oval media pack 131. It is noted that the principles described herein, however, can be applied starting with the media pack having a circular configuration.

In FIG. 7, schematically there is shown a step of forming a stacked z-filter media pack from strips of z-filter media, each strip being a fluted sheet secured to a facing sheet. Referring to FIG. 7, single facer strip 200 is being shown added to a stack 201 of strips 202 analogous to strip 200. Strip 200 can be cut from either of strips 76, 77, FIG. 4. At 205, FIG. 7, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 7, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 7, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media pack 201 shown being formed in FIG. 7, is sometimes referred to herein as a "blocked" stacked media pack. The term "blocked" in this context, is an indication that the arrangement is formed to a rectangular block in which all faces are 90° relative to all adjoining wall faces. Alternate configurations are possible, as discussed below in connection with certain of the remaining figures. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media pack will be referenced as having a parallelogram shape in any cross-section, meaning that any two opposite side faces extend generally parallel to one another.

It is noted that a blocked, stacked arrangement corresponding to FIG. 7 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003. All four of these latter references are incorporated herein by reference. It is noted that a stacked arrangement shown in U.S. Ser. No. 10/731,504, is a slanted stacked arrangement.

A variety of filter media having upstream and downstream flow faces are contemplated and can be used in various implementations. Among those include a form of pleated media with flutes having defined peaks to reduce masking, such as those described in patent publication US 2010/0078379, incorporated herein by reference.

III. Example Dust Collector and Components, FIGS. 8-29

A. Example Air Filter Cartridges, FIGS. 8-13

Figure 8:
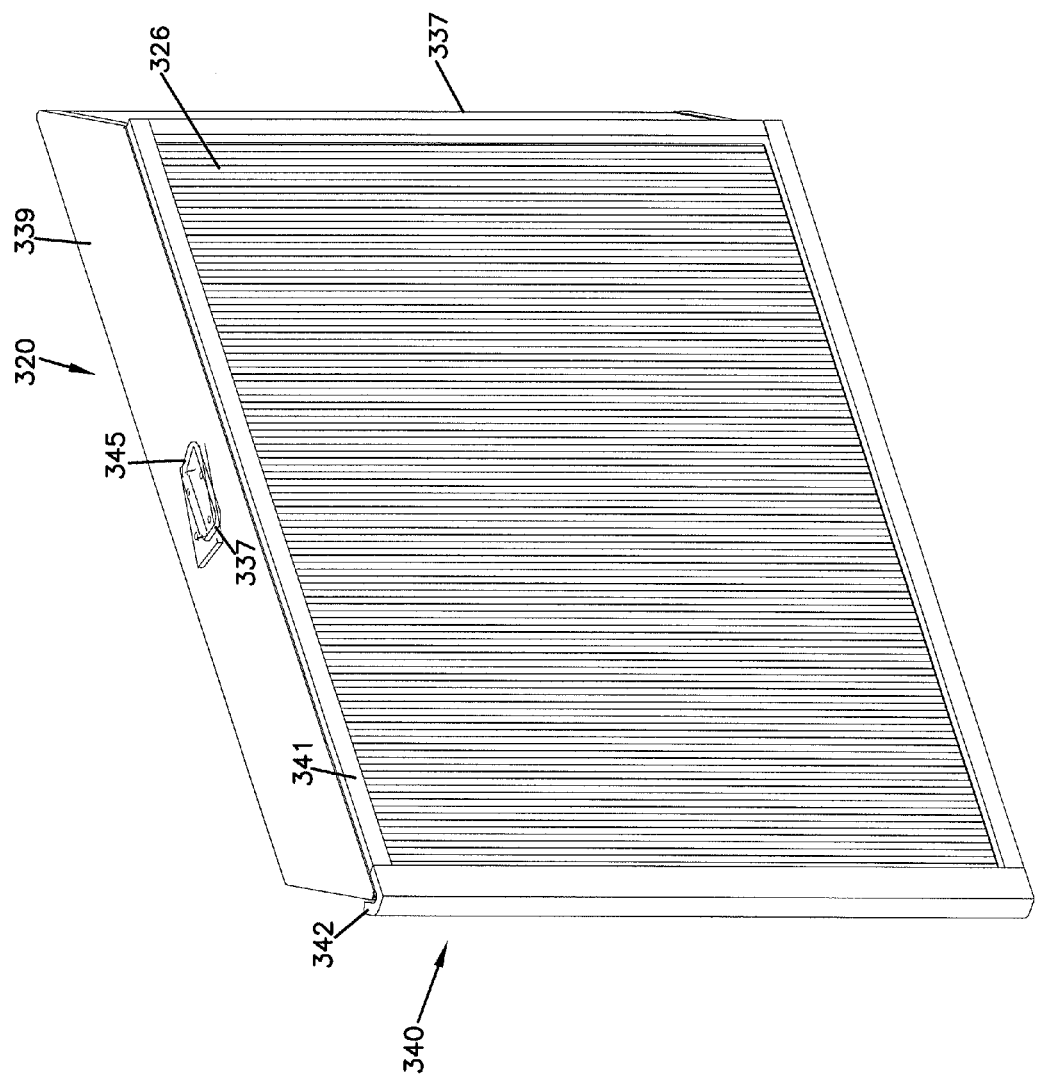
FIG. 8 is a perspective view of a first embodiment of an air filter cartridge utilizing a media pack having a stack of strips of single facer filter media, constructed in accordance with principles of this disclosure.
Figure 8A:
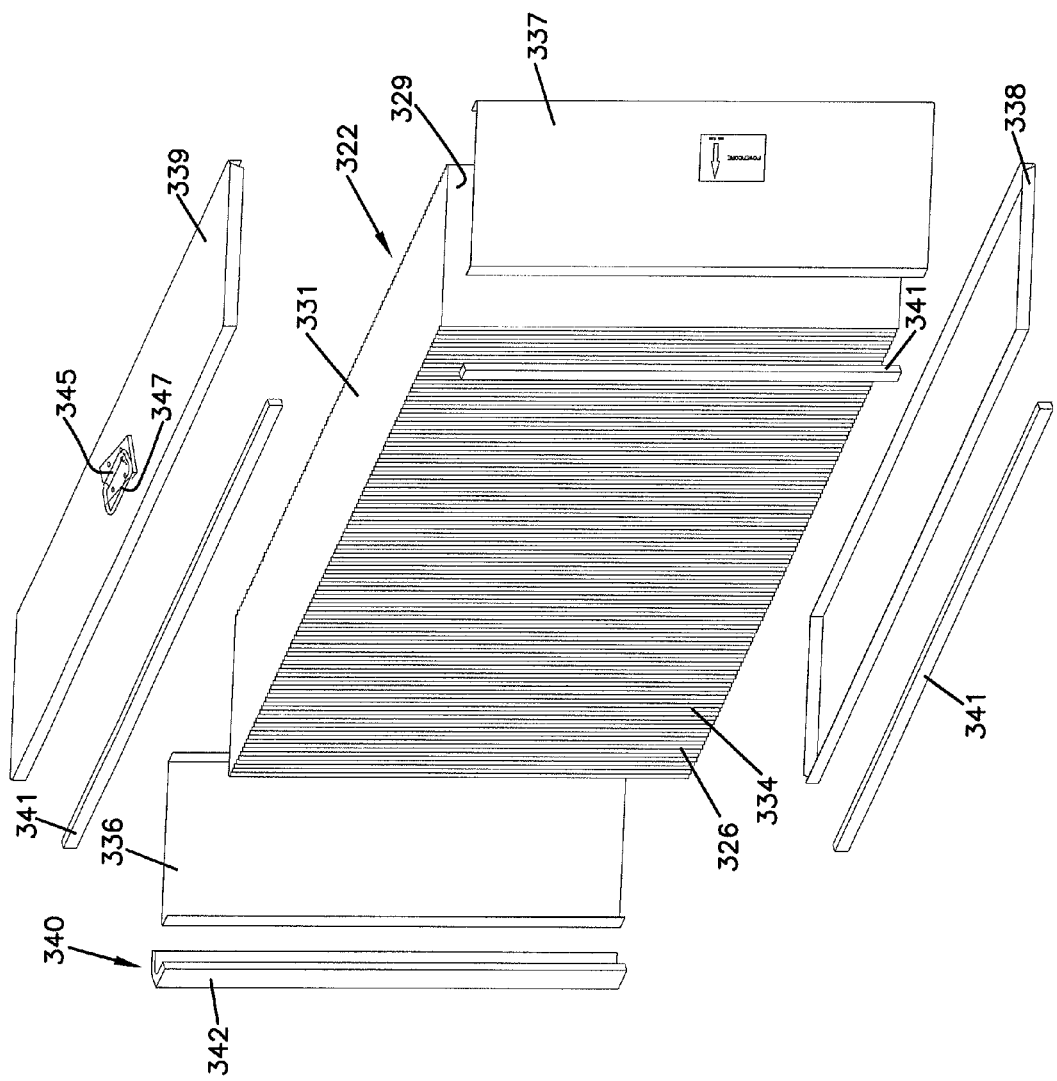
FIG. 8A is an exploded perspective view of the air filter cartridge of FIG. 8.

One embodiment of an air filter cartridge is depicted in FIG. 8 generally at 320. The air filter cartridge 320 includes a media pack 322 of z-media having an upstream flow face 324 (FIG. 10) and an opposite downstream flow face 326. In the embodiment shown, the upstream flow face 324 and the downstream flow face 326 are generally flat, planar, and parallel to each other.

The media pack 322 includes first and second opposite sides 328, 329 (FIG. 10) extending between the upstream and downstream flow faces 324, 326. The media pack 322 also includes third and fourth opposite sides 330, 331 (FIG. 9) extending between the upstream and downstream flow faces 324, 326. As can be seen in the embodiment of FIGS. 8-10 and as mentioned above, the upstream flow face 324 and downstream flow face 326 are parallel, in this embodiment. In this embodiment, each strip 334 of the media pack 322 is angled relative to a horizontal surface from the upstream flow face 324 to the downstream flow face 326 at an angle of 20-80 degrees, for example 30-60 degrees, and more particularly 40-50 degrees.

Still in reference to FIGS. 8-11, the air filter cartridge 320 pictured includes a first side panel 336 against the first side 328 of the media pack 322. The first side panel 336 is typically a rigid material to help protect the media pack 322. It can be a rigid plastic or it can be metal. The first side panel 336 is depicted as extending from the upstream flow face 324 to the downstream flow face 326. The first side panel 336 can be against the media pack 322 in a variety of ways. For example, the first side panel 336 can be a molded piece that is molded directly onto the media pack 322; or it can be a pre-made piece that is secured with adhesive or glue. Other attachment methods can be used.

In this embodiment, the air filter cartridge 320 further includes a second side panel 337 against the second side 329 of the media pack 322. In this embodiment, there is also a third side panel 338 against to the third side 330 of the media pack 322, and a fourth side panel 339 against the fourth side 331 of the media pack 322. The second side panel 337, third side panel 338, and fourth side panel 339 each help to protect the media pack 322. They can be pre-made pieces that are made of a rigid material and can include a rigid plastic or metal that are then secured by adhesive or glue; alternatively, they can be molded pieces that are directly molded to the media pack 322. In the embodiment depicted, each of the second side panel 337, third side panel 338, and fourth side panel 339 extend from the upstream flow face 324 to the downstream flow face 326.

In accordance with principles of this disclosure, the air filter cartridge 320 further includes a gasket arrangement 340. The gasket arrangement 340 is to create a seal with an appropriate sealing surface in whatever system the air filter cartridge 320 is being installed, such that the air to be filtered does not bypass the media pack 322.

In this embodiment, the gasket arrangement 340 includes a perimeter gasket member 341 and a side gasket member 342. The perimeter gasket member 341 is against the downstream flow face 326 and around the edge or perimeter of the downstream flow face 326. In the embodiment shown, the perimeter gasket member 341 forms a rectangular window 343, with the opening in the window exposing the downstream flow face 326.

In this embodiment, the side gasket member 342 is adjacent to at least a partial extension of the first side panel 336. By the term "partial extension" it is meant that the side gasket member 342 may only cover a part of the first side panel 336. By the term "adjacent to," it is meant it is next to the partial extension of the first side panel 336 at least when the cartridge 320 is operably installed for use in a dust collector. In the embodiment shown, the side gasket member 342 extends a distance of no greater than 40% of an overall length of the first side panel 336. In the particular embodiment shown, the side gasket member 342 is against the first side panel 336. It is shown to extend a distance of at least 5% and typically 10-30% of the overall length of the first side panel 336.

In this embodiment, the media pack 22 includes a stack of strips 34 of single facer filter media material, with each strip 34 including a fluted media sheet 3 (FIG. 1) secured to a facing media sheet 4 (FIG. 1) and oriented with flutes 7 (FIG. 1) of each fluted sheet extending in a direction between the upstream and downstream flow faces 24, 26.

In the embodiment shown, the side gasket member 342 is integral with the perimeter gasket member 341. By "integral," it is meant that the side gasket member 342 and perimeter gasket member 341 are adjacent to each other without a gap in between and can include two separate pieces attached or fitted together; it can also mean they are molded into one single unitary piece. This can be seen in FIG. 12A, such that the perimeter gasket member 341 wraps around to form the side gasket member 342, joining together at intersection 344.

In preferred implementations, the side gasket member 342 includes no portion adjacent or against the second side panel 337, the third side panel 338, and the fourth side panel 339 (i.e., the second side panel 337, third side panel 338, and fourth side panel 339 are "gasket-free"). That is, in preferred implementations, the side gasket member 342 is adjacent only to the first side panel 336.

When the side gasket member 342 is against the first side panel 336, it will be at the same angle that the side panel 336 is relative to the downstream flow face 336. In this embodiment, that angle will typically be 20-80 degrees, for example 30-60 degrees, and more particularly 45-50 degrees.

The gasket arrangement 340 can be constructed of typical materials used for gaskets, such as polyurethane foam, urethane, rubber, silicone, and any other typical gasket material.

The gasket arrangement 340 may be secured to a remaining portion of the cartridge 320 by a variety of techniques including, for example, adhesive or by directly molding the gasket arrangement 340 onto the remaining portion of the cartridge 320.

Figure 11B:
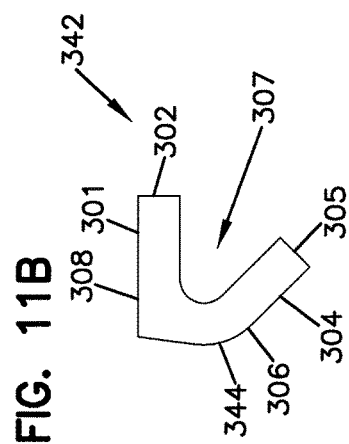
FIG. 11B is an enlarged view of a profile of the gasket used with the filter cartridge of FIGS. 8-10.
Figure 11C:
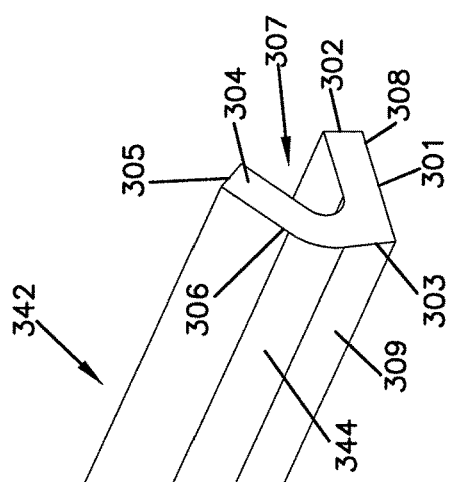
FIG. 11C is a perspective view of the gasket of FIG. 11B.

In reference now to FIGS. 11B and 11C, an enlarged view of one useable side gasket member 342 is depicted. In the embodiment shown, the side gasket member 342 includes a first gasket segment 301. First gasket segment 301 has a free end 302 and an opposite first end 303. The gasket 342 depicted further includes a second gasket segment 304 having a free end 305 and an opposite second end 306. Note that the second end 306 is the portion of the second gasket segment 304 where the straight segment stops and a curved section begins. This can be seen in FIG. 11C.

In the example embodiment shown, both the first gasket segment 301 and the second gasket segment 304 are straight. The second gasket segment 304 is angled relative to the first gasket segment 301 at an angle of between 20-70 degrees.

Intermediate gasket segment 344 joins the first end 303 of the first gasket segment 301 and the second end 306 of the second gasket segment 304. As can be seen in FIG. 11B, the first gasket segment 301, second gasket segment 304, and intermediate gasket segment 344 together define an open filter cartridge-receiving cavity 307 constructed and arranged to receive a remaining portion of the filter cartridge 320.

The first gasket segment 301 and the second gasket segment 304 are sized to create an appropriate seal when operably installed. In example embodiments, a ratio of a length of the first gasket segment 301 to the second gasket segment 304 is between 1-2.5. In this case, the length is measured between each of the segment's respective free end 302, 305 and the opposite end 303, 306. In one example embodiment, the ratio of the length of the first gasket segment 301 to the second gasket segment 304 is between 1.6-2.0.

Preferably, the first gasket segment 301 and second gasket segment 304 each has a thickness of between 0.35-0.40 inches. Of course, there may be variations. In one embodiment, the gasket 342 is made of a compressive material having a resistance of 3-5 psi at 25 percent compression. One useable material is EDPM sponge. Other materials that are useable include polyurethane, foamed polyurethane, rubber, and silicone, just to name a few examples. Many materials are useable.

Figure 16:
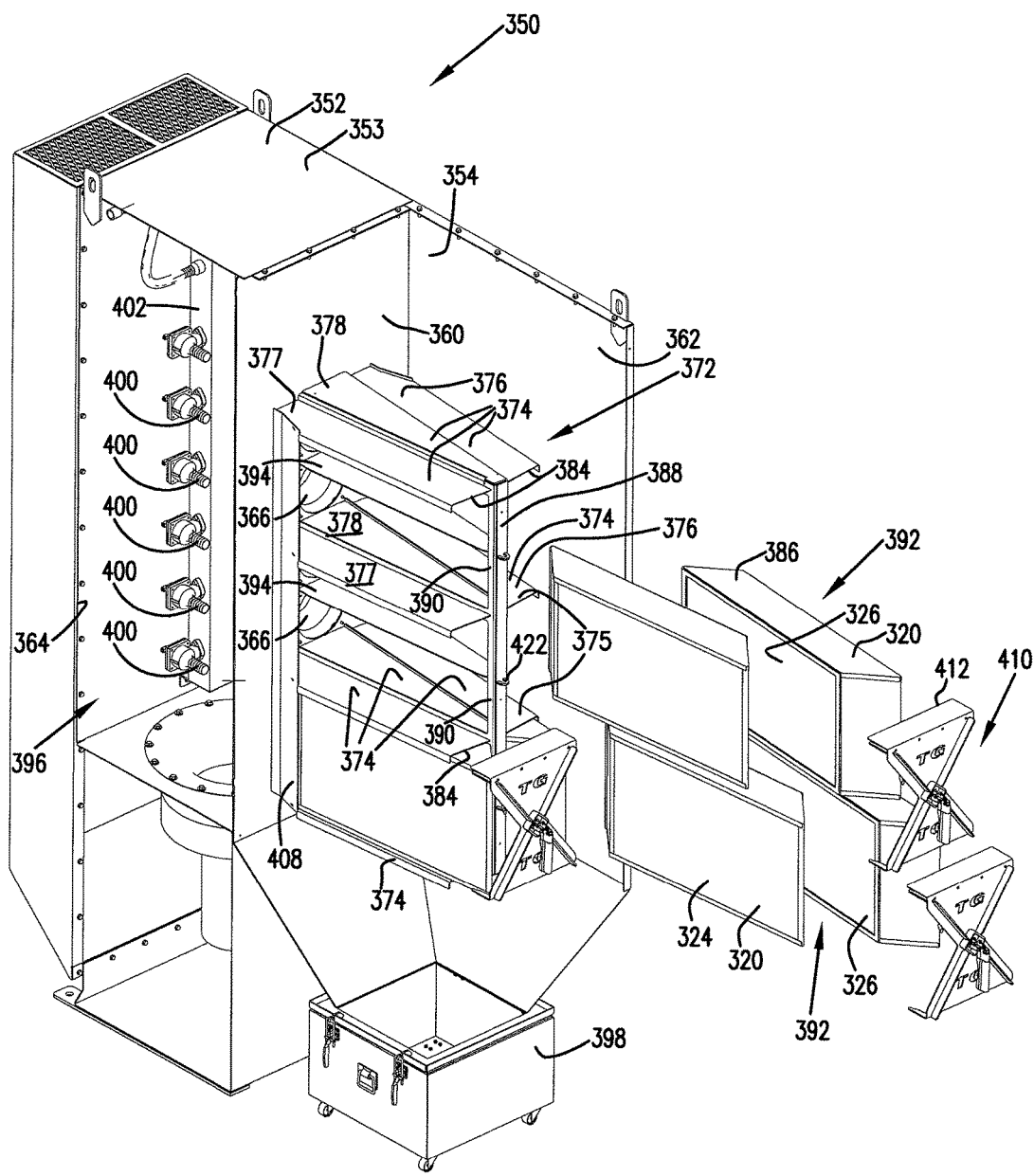
FIG. 16 is an exploded, perspective view of the dust collector of FIG. 14, with portions removed to enhance clarity.
Figure 17:
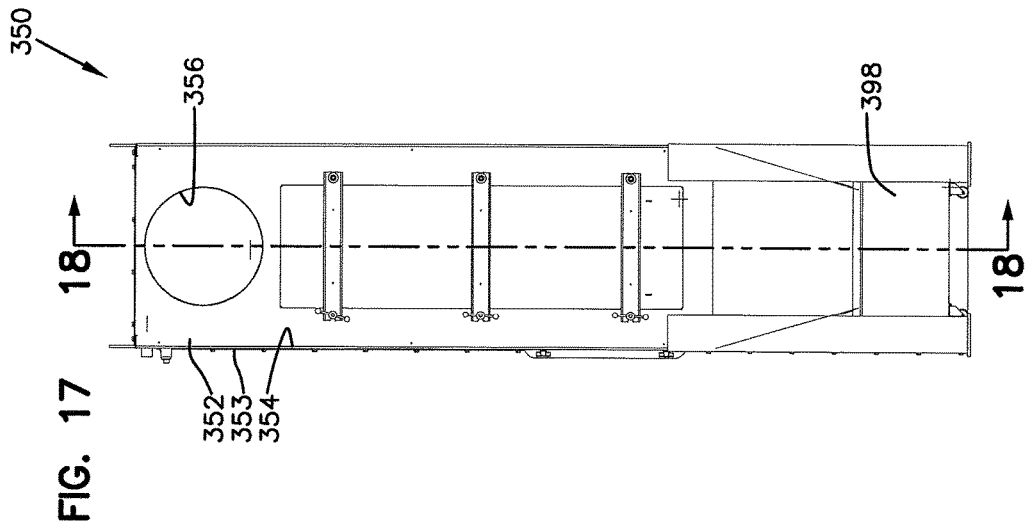
FIG. 17 is a side view of the dust collector of FIG. 14.

In use, the gasket 342 creates a seals by compression between the side gasket member 342 and tubesheet 360 (FIG. 16). In particular, in preferred embodiments, the seal is created between the outer surface 308 of the first gasket segment 301 and the outer surface 309 of the first end 303 of the first gasket segment 301. Note that in the embodiment shown, surfaces 309 and 308 are generally orthogonal or perpendicular to each other.

In one example embodiment, the filter cartridge 320 includes at least one handle 345 to allow for handling and manipulation of the cartridge 320. In the embodiment illustrated, at least one handle 345 is secured, connected, or attached to one of the second side panel 337, third side panel 338, and fourth side panel 339. While a variety of embodiments are possible, this embodiment shown includes one handle 345 secured to fourth side panel 339 and a second handle 345 secured to the third side panel 338 (FIG. 10). The handles 345 are shown centered on the panels 338, 339. The handles 345 have a grasping ring 347, which is movable from against the panels 338, 339 to a position away from the panels 338, 339 so that they may be grasped by 4 fingers of a typical adult sized hand.

Figure 13:
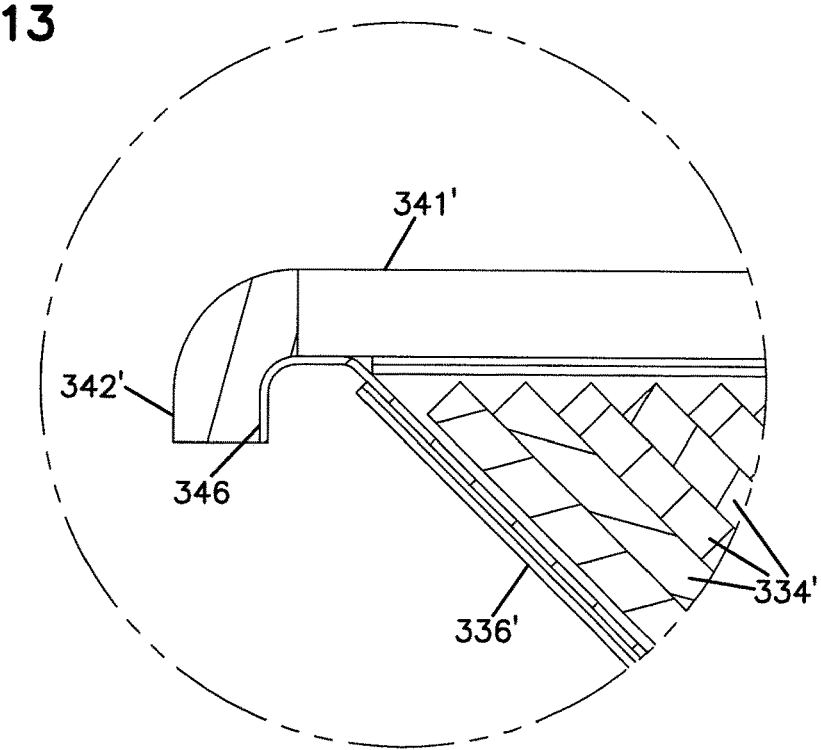
FIG. 13 is an enlarged view of a cross-section of a portion of the air filter cartridge of FIG. 12.
Figure 12:
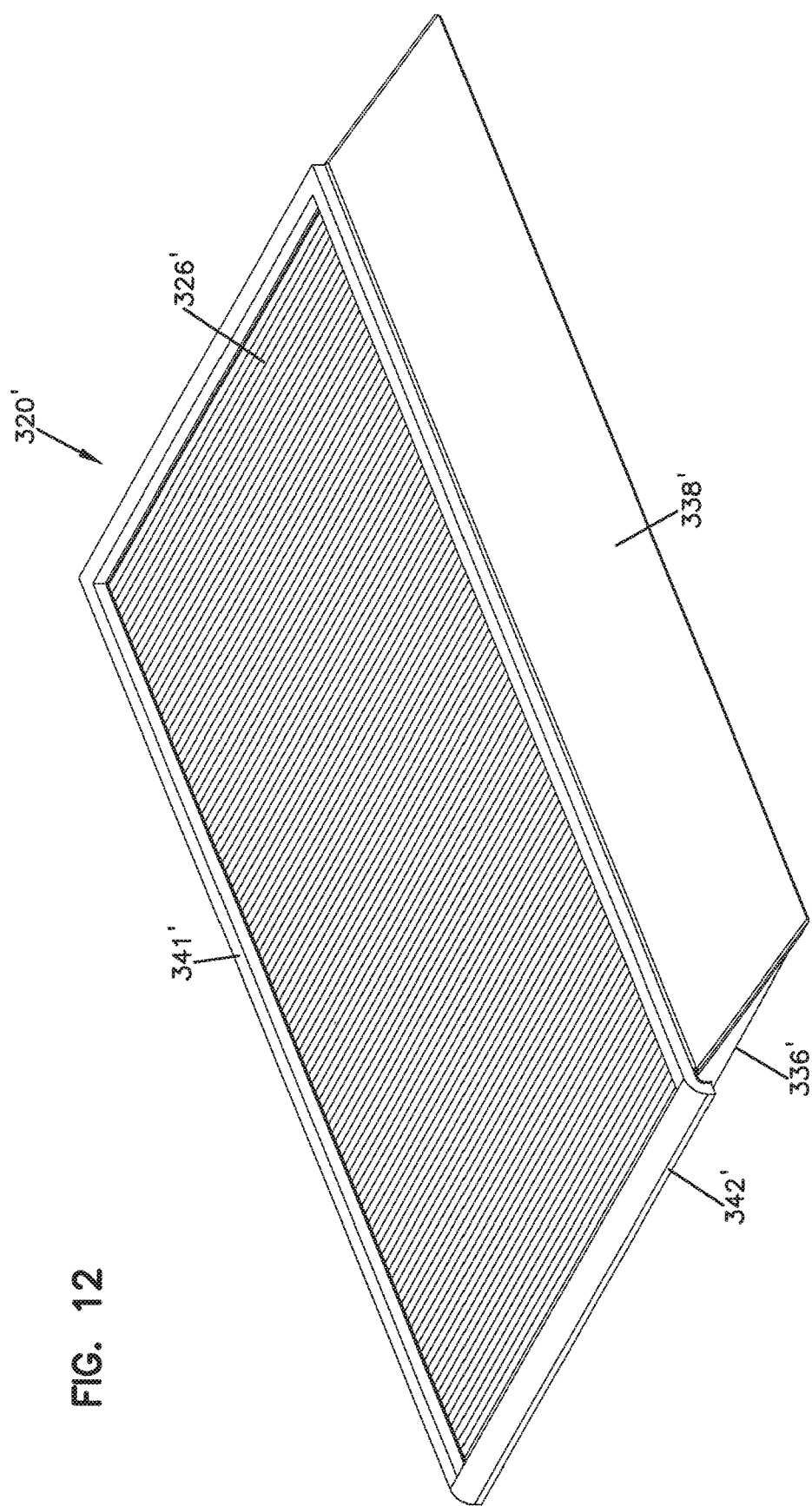
FIG. 12 is a perspective view of another embodiment of an air filter cartridge having a media pack comprising a stack of strips of single facer filter media material, constructed in accordance with principles of this disclosure.
Figure 14:
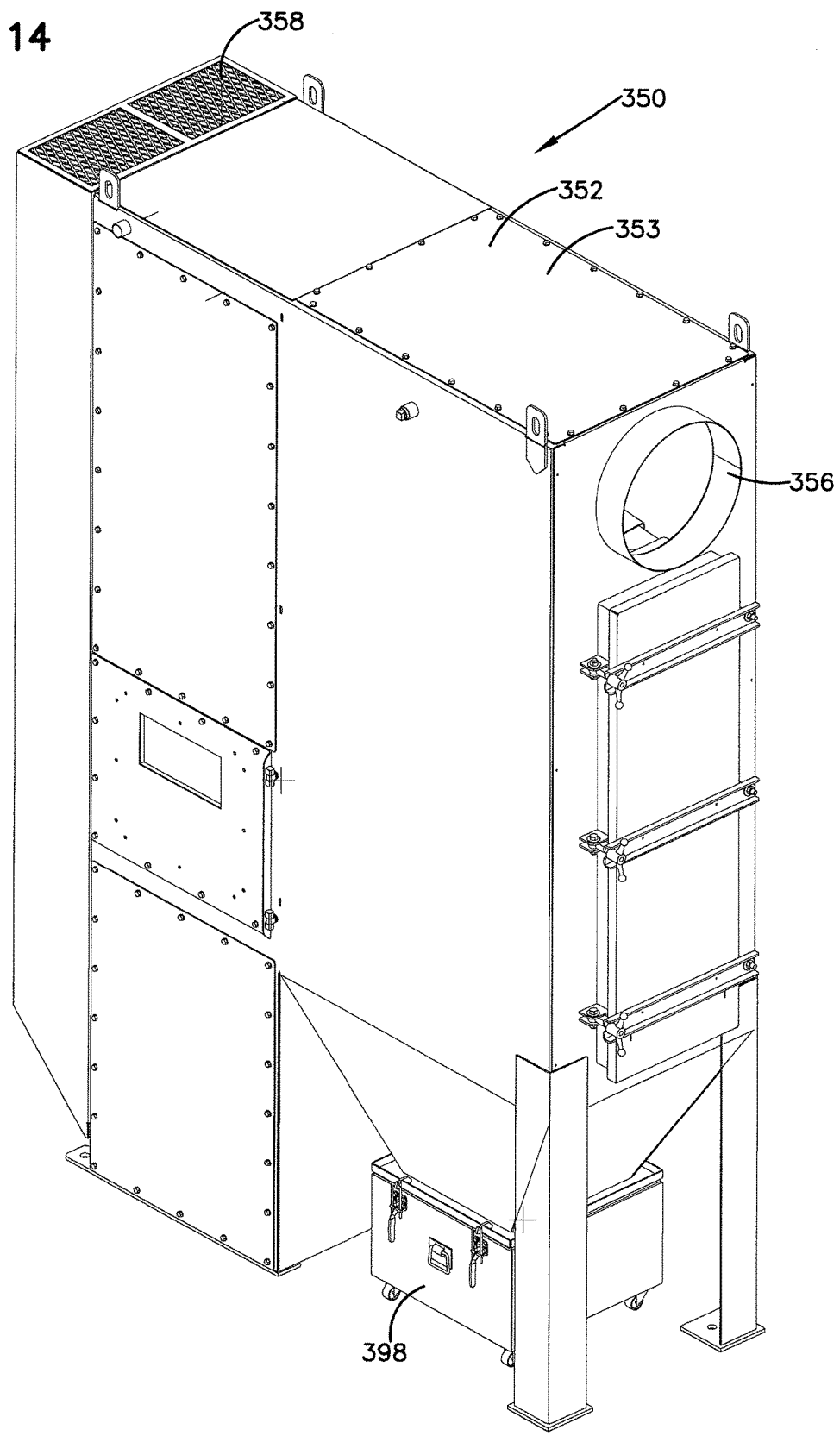
FIG. 14 is a perspective view of a first embodiment of a dust collector utilizing air filter cartridges of the type shown in FIGS. 8-13, constructed in accordance with principles of this disclosure.

In reference now to FIGS. 12 and 13, another embodiment of an air filter cartridge is depicted at 320'. The air filter cartridge 320' has the same features as the air filter cartridge 320, with the exception of the arrangement of the side gasket member 342'. In this embodiment, the air filter cartridge 320' includes a gasket mounting face 346 (FIG. 13) projecting from and spaced from a remaining portion of the air filter cartridge 320'. The gasket mounting face 346 is angled relative to a plane containing the perimeter gasket member 341'. The gasket mounting face 346 supports the side gasket member 342'.

Typically, the gasket mounting face 346 will be angled from 45 degrees to −180 degrees relative to the downstream flow face 326'. Many useful embodiments will include the gasket mounting face 346 to be angled from 30 degrees to −150 degrees relative to the downstream flow face 326'. As can be seen in FIG. 13, the side gasket member 342' is spaced from the first side panel 336'.

B. Example Dust Collector, FIGS. 14-20

Figure 15:
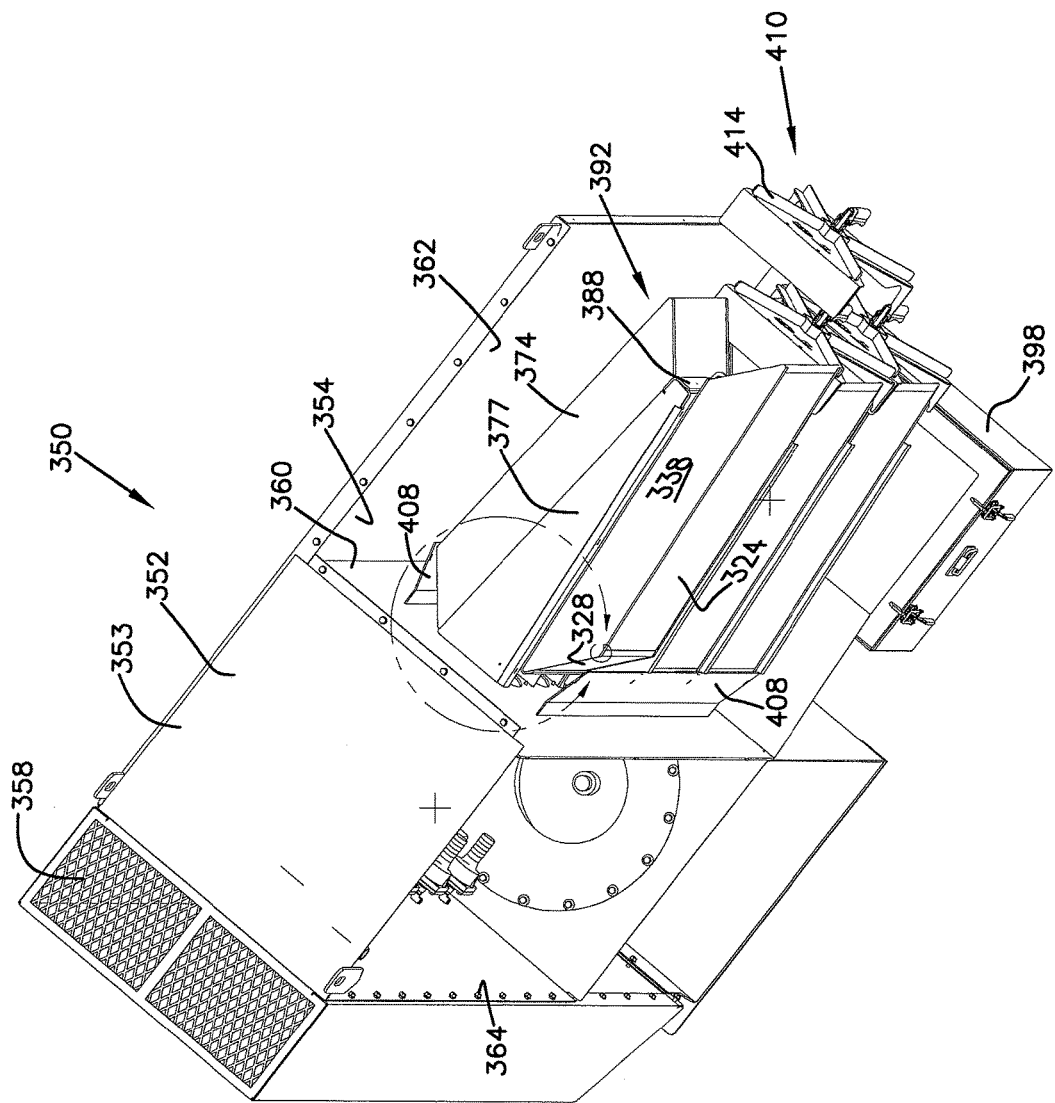
FIG. 15 is a partially exploded, perspective view, with portions removed to enhance clarity, of the dust collector of FIG. 14.

FIGS. 14-20 show a first embodiment of a dust collector 350 that utilizes filter cartridges of the type characterized above. FIGS. 21-25 show an example embodiment of a dust collector 460, utilizing filter cartridges of the type described above. In this section, the first embodiment of the dust collector 350 is described, but many of the features are the same for the dust collector 430, so in some instances, FIGS. 21-25 are referred to in this section because the illustration is clearer. The dust collector 350 is used for filtering air. For example, the dust collector 350 can be used for cleaning dust and other types of particulate from the air. In general, the dust collector 350 includes a housing 352. The housing 352 can be made from sheet metal or other types of rigid materials. The housing 352 forms an enclosure 353 with an interior volume 354 (FIGS. 15 and 60).

The housing 352 has an unfiltered or dirty air inlet 356 and a filtered or clean air outlet 358. In general, unfiltered air enters the dust collector 350 through the dirty air inlet 356. Air filter cartridges 320 oriented within the dust collector 350 remove dust and other particulate from the air, and then the clean, filtered air is exhausted from the dust collector 350 through the clean air outlet 358.

The dust collector 350 further includes a tubesheet 360. The tubesheet 360 functions as a wall that separates the interior volume 354 of the housing 352 between an unfiltered air plenum 362 and a filtered air plenum 364. The tubesheet 360 has a plurality of holes or apertures 366 therethrough. The apertures 366 are for allowing filtered air to flow from the downstream flow face 326 of the air filter cartridges 320 through the tubesheet 360, into the filtered air plenum 364, and then out through the clean air outlet 358.

Figure 18:
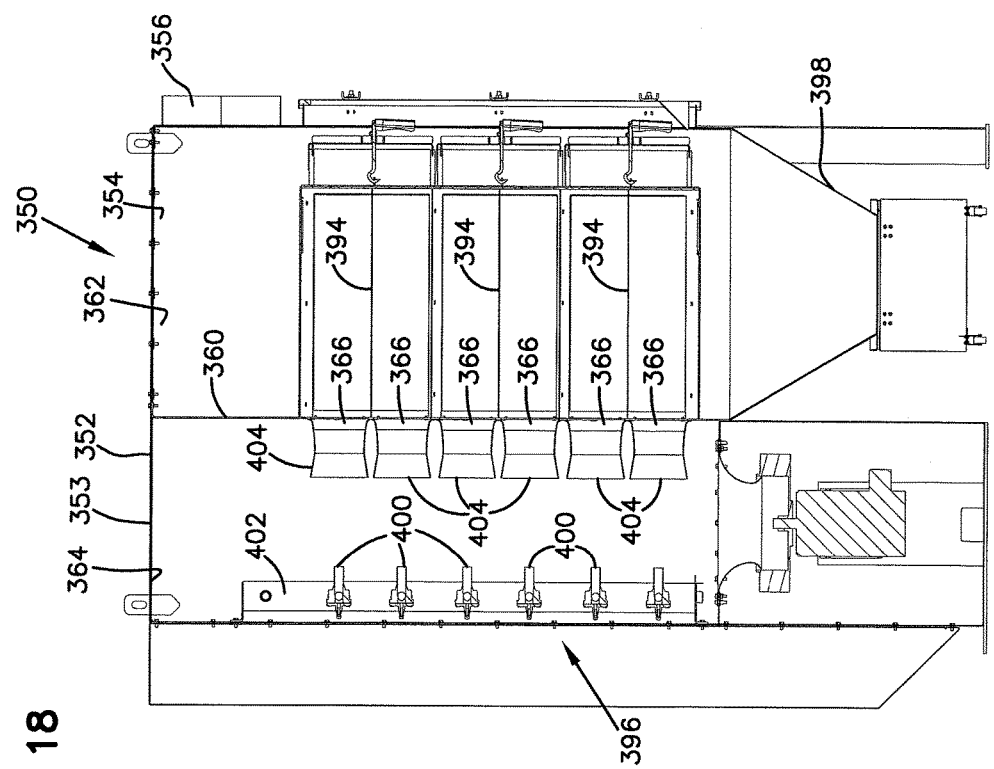
FIG. 18 is a cross-sectional view of the dust collector of FIG. 17, the cross-section being taken along the line 18-18 of FIG. 17.
Figure 19:
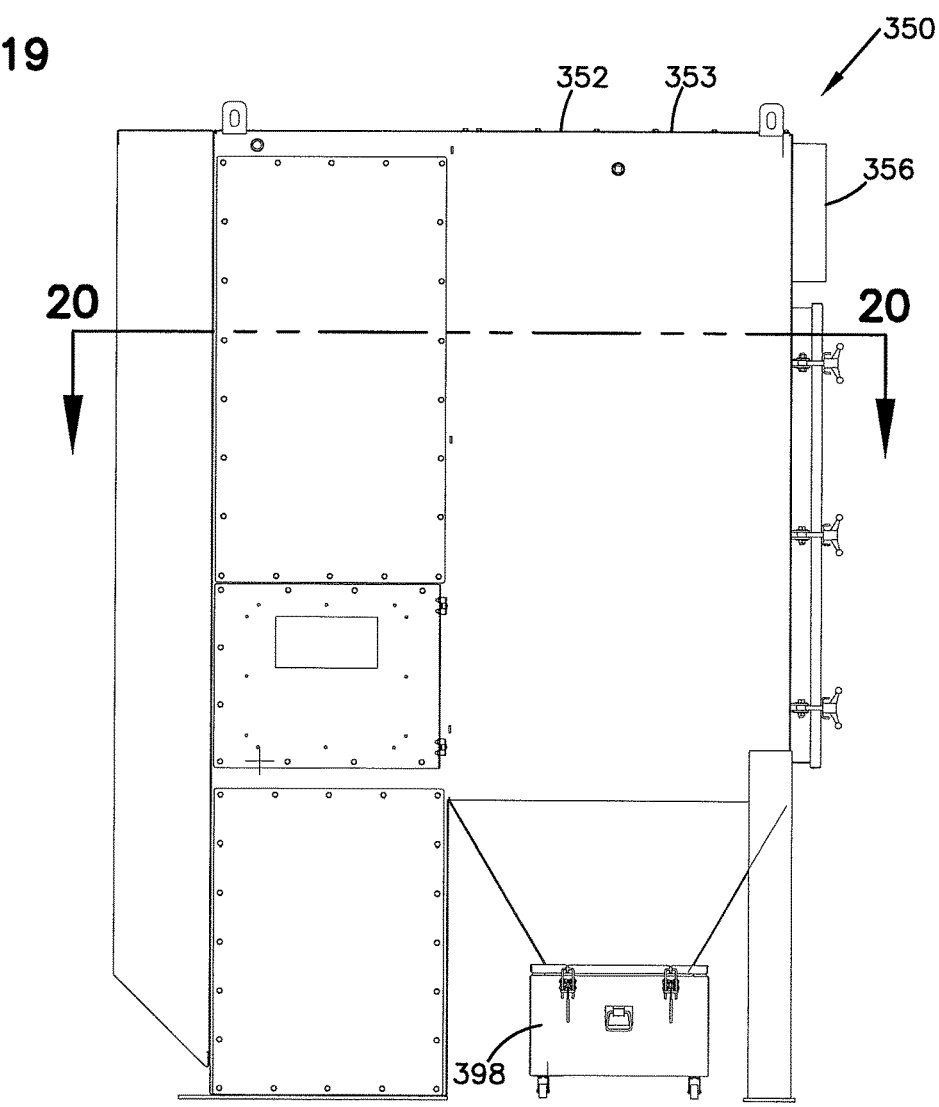
FIG. 19 is a front view of the dust collector of FIG. 14.

In the embodiment illustrated in FIG. 18, the plurality of apertures 366 is shown as at least 2 apertures 366, and specifically, 6 apertures 366. Depending upon the desired capacity for the dust collector 350, there can be more or fewer apertures 366.

Figure 20:
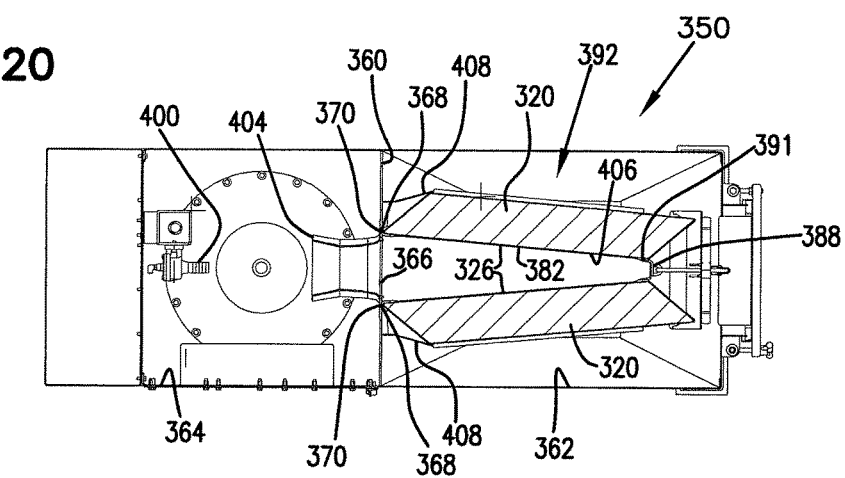
FIG. 20 is a cross-sectional view of the dust collector of FIGS. 14-19, the cross-section being taken along the line 20-20 of FIG. 19.
Figure 25:
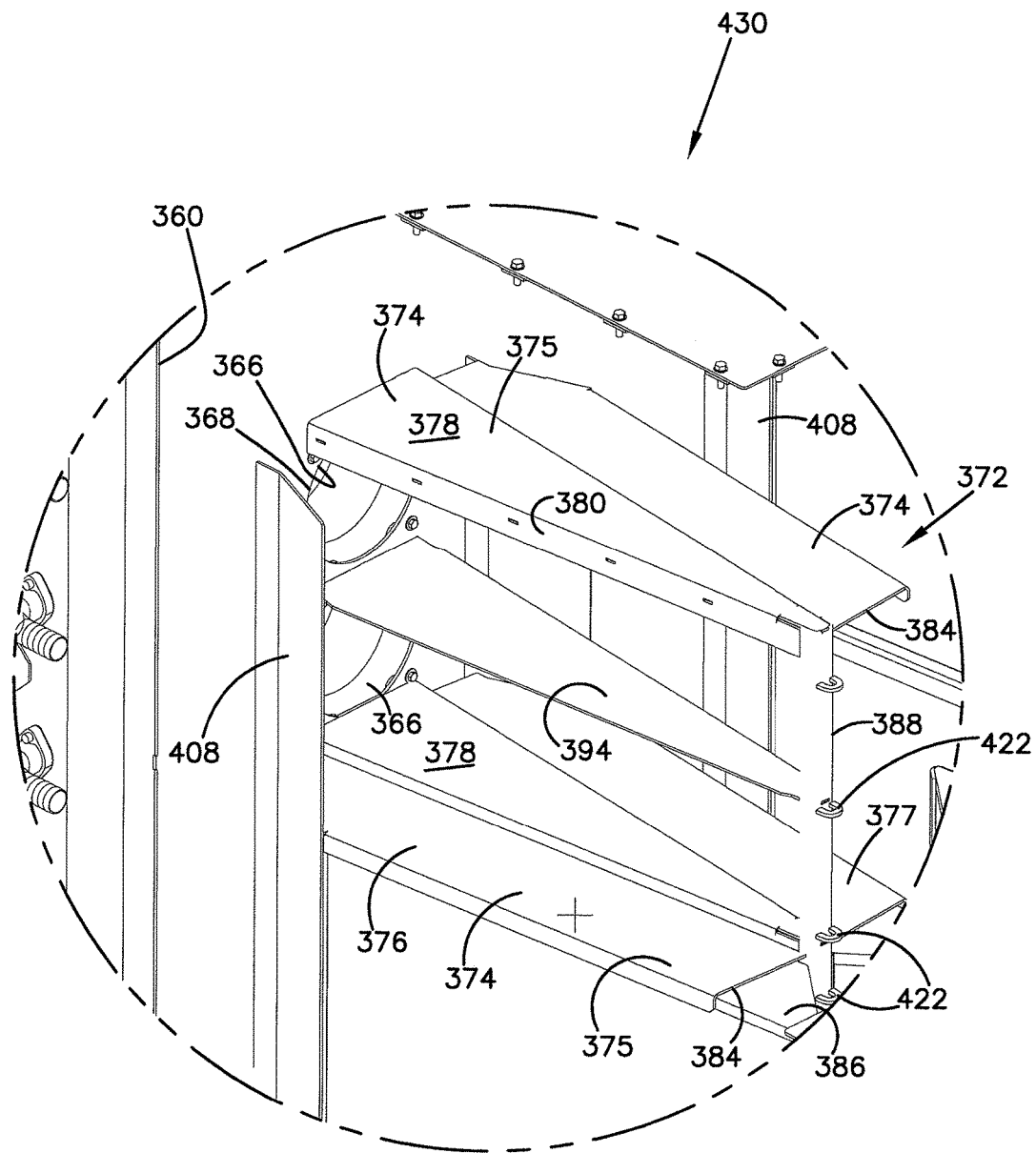
FIG. 25 is an enlarged view of a portion of the perspective view of FIG. 22.

The tubesheet 360 defines a sealing surface 368 (FIGS. 20 and 25). The sealing surface 368 is located on the side of the tubesheet 360 in the unfiltered plenum 362. In the embodiment shown, the sealing surface 368 is adjacent to the apertures 366. The sealing surface 368 forms a seal 370 (FIG. 20) between and against the tubesheet 360 and the air filter cartridge 320. In particular, the seal 370 is formed between and against the sealing surface 368 of the tubesheet 360 and the side gasket member 342 of the air filter cartridge 320.

The housing 352 further includes a frame arrangement 372, best shown in FIGS. 16 and 25. The frame arrangement 372 extends from the tubesheet 360. In the embodiment shown, the frame arrangement 372 extends generally orthogonally from the tubesheet 360. The frame arrangement 372 helps to hold and support the air filter cartridges 320 in the dust collector 352.

In this embodiment, the frame arrangement 372 includes a plurality of trays 374. In general, the trays 374 form dividers 375 between vertically aligned air filter cartridges 320.

As can be seen in FIGS. 16 and 25, the trays 374 include, in this embodiment, 2 outside trays 376, 377 on either side of a mid tray 378. The mid tray 378 defines a sealing surface 380 (best seen in connection with the embodiment of FIG. 25) which forms a seal with the gasket arrangement 340 of the air filter cartridge 320. In particular, the sealing surface 380 forms a seal 382 (FIG. 20) between and against the sealing surface 380 of the mid tray 378 of the frame arrangement 372 and the perimeter gasket member 341 of the air filter cartridge 320. The sealing surface 380 is generally perpendicular to a planar portion of the trays 374. The planar portion of the trays 374, in this embodiment, are generally parallel to the ground horizontal surface, while the sealing surface 380 is generally perpendicular to the ground horizontal surface. The sealing surface 380 is also generally in a plane that is not coplanar with the plane of the sealing surface 368 of the tubesheet 360.

Each of the outside trays 376 form receiving channels 384 that receive an upper portion 386 of the air filter cartridge 320. This helps to help hold the air filter cartridges 320 in place in the dust collector 350.

In this embodiment, the frame arrangement 372 further includes a bar 388 spaced from the tubesheet 360 and attached to the trays 374. The bar 388 has a sealing surface 390 that forms a seal 391 (FIG. 20) with the perimeter gasket member 341 of the gasket arrangement 340 of the air filter cartridge 320.

In general, the bar 388 runs parallel to the tubesheet 360. The air filter cartridges 320 are operably installed between the bar 388 and the tubesheet 360, with assistance in supporting the filter cartridges 320 in place by use of the trays 374. As described below, the bar 388 is also useful as part of the clamp arrangement to secure the air filter cartridges 320 in place.

In the embodiment shown, the air filter cartridges 320 are installed in the dust collector 350 in filter pairs 392. Each filter element pair 392 includes first and second air filter cartridges 320 being oriented in the housing 352 horizontally adjacent to each other and generally angled in a direction outwardly as they extend from the bar 388 to the tubesheet 360. As can be seen in FIG. 20, the bar 388 is located between each air filter cartridge 320 in the filter pair 392. As can also be seen in FIG. 20, the air gap or volume 406 between the respective downstream sides 326 of the two air filter cartridges 320 increases as the distance increases from the bar 388 to the tubesheet 360. This forms a type of V-filter arrangement.

As can be seen in FIGS. 15 and 16, the dust collector 350 includes a plurality of filter element pairs 392. In the particular embodiment shown, there are 3 element pairs 392. It should be understood that in other embodiments, there can be more or fewer element pairs 392, depending upon the desired capacity of filtration.

In this embodiment, the frame arrangement 392 further includes a splitting plane 394. The splitting plane 394 extends from the tubesheet 360 to the bar 388 and is vertically between and spaced from the trays 374. The splitting plane 394 is oriented relative to the tubesheet 360 such that it is between two adjacent apertures 366 in the tubesheet 360. The splitting plane 394 is also oriented between the downstream flow faces 326 of adjacent filter cartridges 320 in a filter element pair 392. The splitting plane 394 helps to split the pulse of air in the reverse pulse air cleaning system, as described further below.

The dust collector 350 further includes a reverse pulse cleaning arrangement 396. The reverse pulse cleaning arrangement 396 is constructed and arranged to emit a pulse of air from the filtered air plenum 364, through the downstream flow faces 326 of each of the air filter cartridges 320. By pulsing air from the clean air side through the downstream flow faces 326, dust and other debris clogging the upstream flow faces 324 of the air filter cartridges 320 are dislodged and knocked loose from the air filter cartridge 320. From there, the dust and debris falls by gravity into a dust collection hopper 398 located below the arrangement of cartridges 320. The reverse pulse cleaning arrangement 396 includes, preferably, at least one nozzle 400 for each aperture 366 in the tubesheet 360. The nozzles 400 are in air flow communication with a manifold 402, which is connected to a source of pressurized air. The reverse pulse cleaning arrangement 396 periodically sends a pulse air through the manifold 402 to the nozzles 400. The pulse of air leaves each nozzle 402 and flows through the apertures 366. From there, the air flows in a reverse direction through the normal direction of air flow through the air filter cartridges 320.

In the preferred embodiment shown, each of the apertures 366 includes a venturi 404 to help direct the pulse of air from the nozzle 400 through the apertures 366, and into the volume 406 (FIG. 20) between the downstream flow faces 326 of opposing filter cartridges 320 in each filter element pair 392. The venturi 404 circumscribes each respective aperture 366 and helps to ensure that the air pulse is evenly directed into the volume 406.

By reviewing FIG. 16, it should be appreciated that in the embodiment shown, each filter element pair 392 has two apertures 366 in communication with its respective volume 406 between the opposing downstream flow faces 326. In the preferred embodiment, there are two nozzles 400 per filter element pair 392, one nozzle 400 for each aperture 366. The splitting plane 394 is between adjacent apertures 366 for each filter element pair 392. The splitting plane 394 helps to make sure that the pulse of air for each aperture 366 contacts its intended surface of the media pack 322.

The dust collector 350 further includes a guide ramp 408. The guide ramp 408 projects from the tubesheet 360 and is adjacent to the tubesheet sealing surface 368. The ramp 408 is constructed and arranged to orient each of the air filter cartridges 320 in sealing engagement against the tubesheet sealing surface 368. As can be seen in FIG. 15, the ramp 408 is angled from the tubesheet 360, in a direction that is generally non-coplanar and non-orthogonally with respect to the tubesheet 360. In practice, as each filter cartridge 320 is slid along the trays 374 and in the channels 384, the end of the air filter cartridge 320 nearest to the tubesheet 360 engages the ramp 408. The ramp 408 helps to slide and guide the air filter cartridge 320 into place with the side gasket member 342 engaging and abutting against the sealing surface 368 of the tubesheet 360. In the embodiment shown, there are a pair of guides 408, one guide for each side of the filter pairs 392. That is, there is one guide 408 on lateral sides of the tubesheet 360 with the apertures 366 between the ramps 408.

Figure 21:
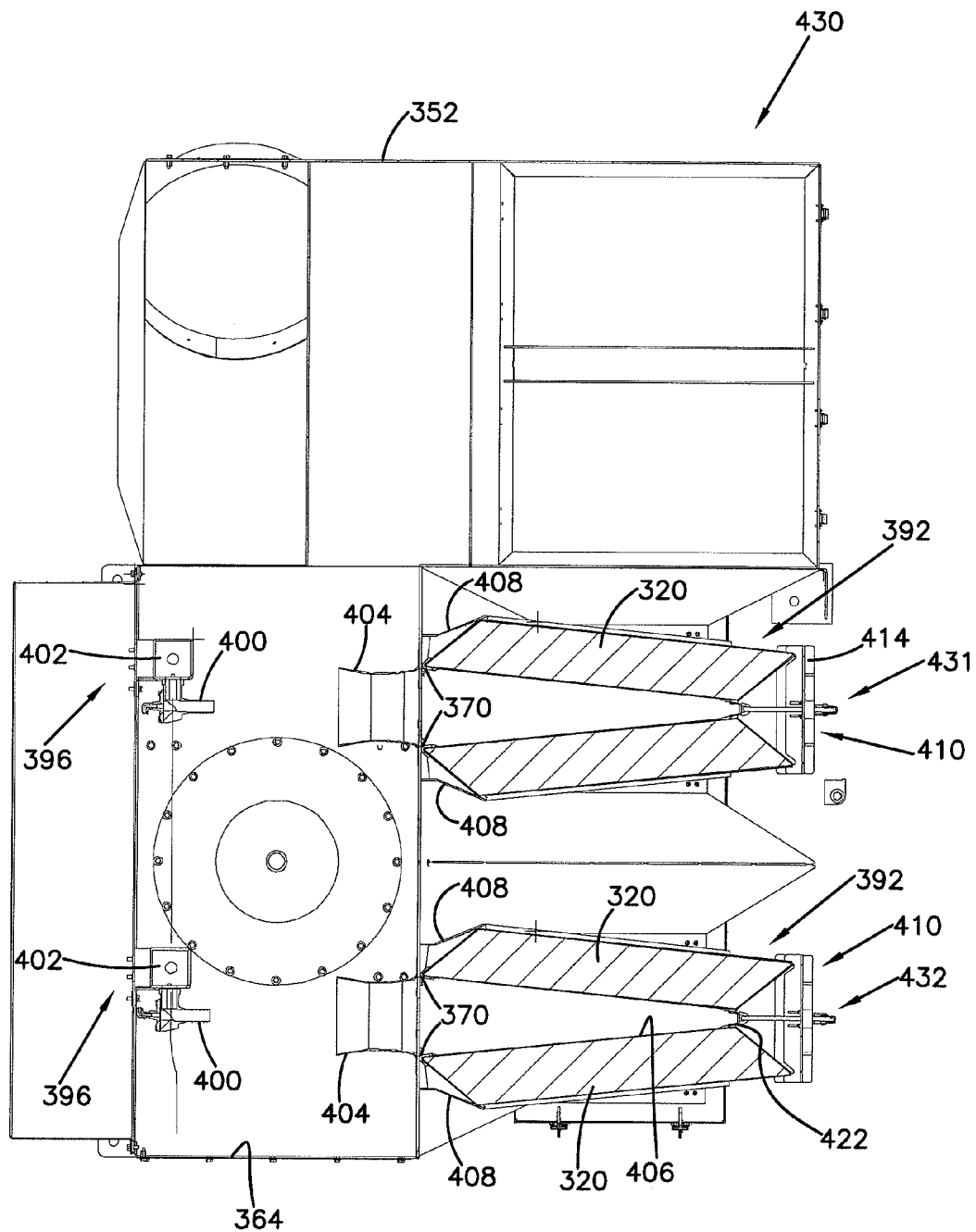
FIG. 21 is a cross-sectional view of another embodiment of a dust collector utilizing the air filter cartridges of FIGS. 8-13, constructed in accordance with principles of this disclosure.
Figure 22:
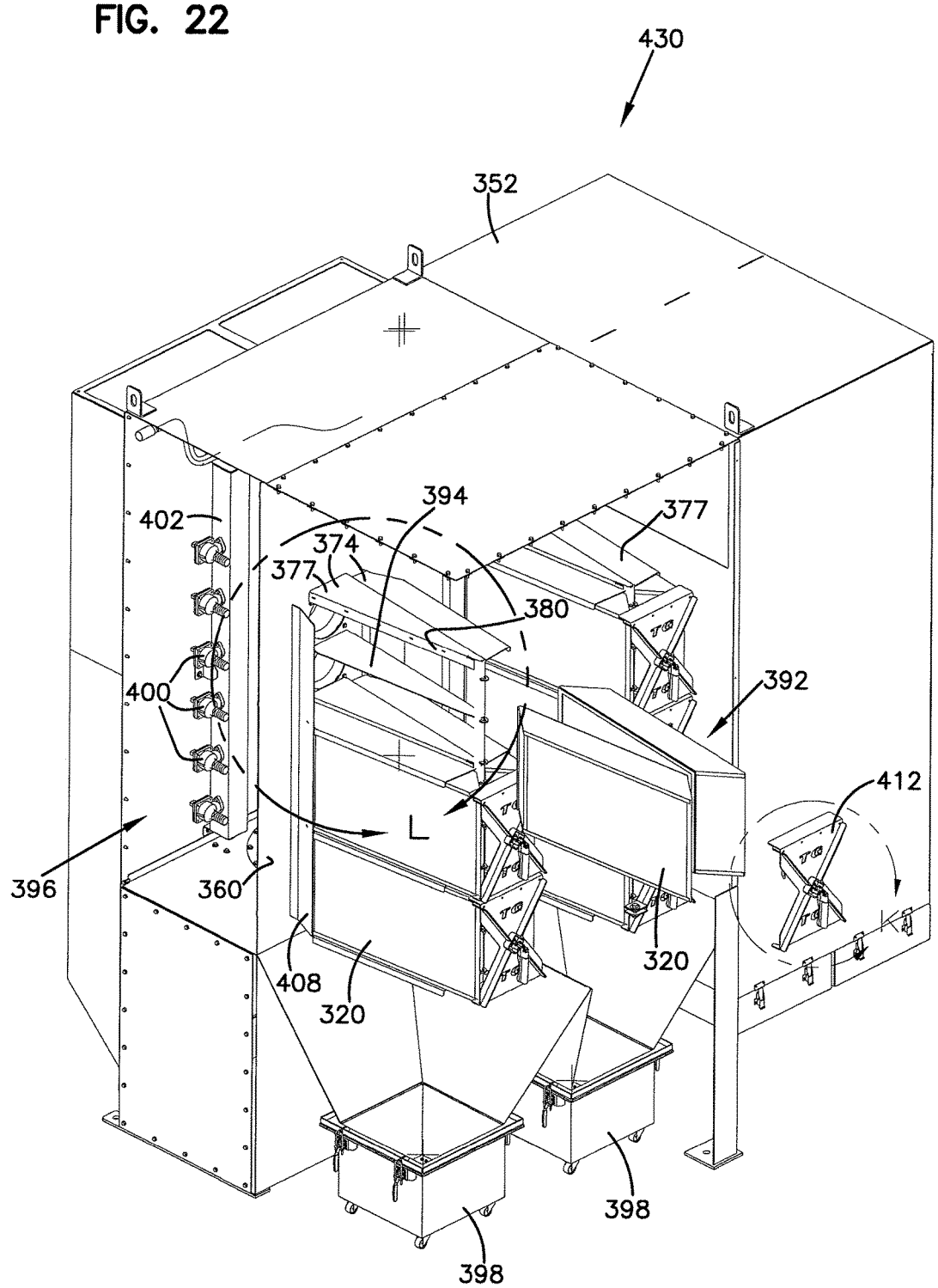
FIG. 22 is an exploded, perspective view of the dust collector of FIG. 21, with portions removed to enhance clarity.
Figure 23:
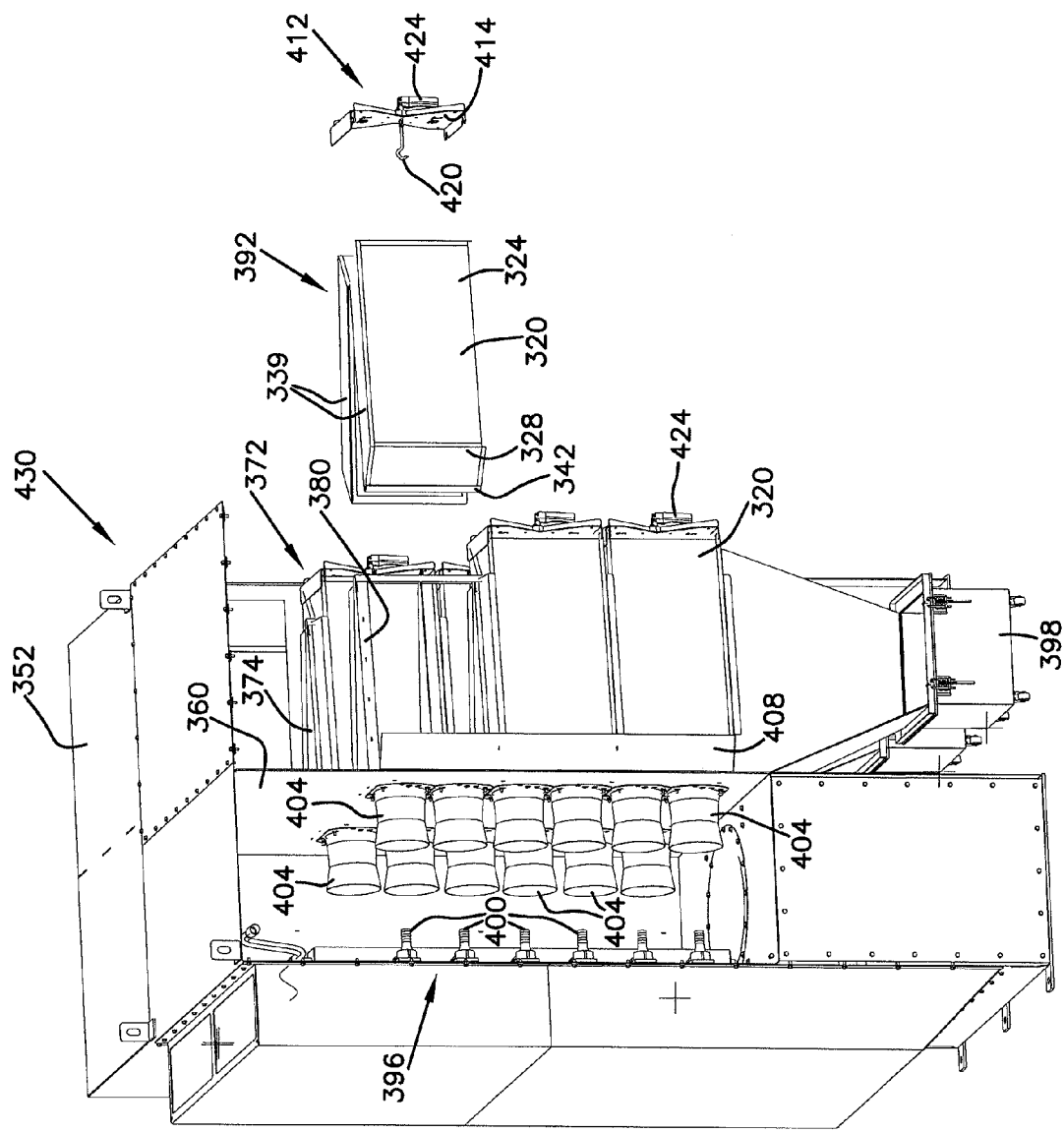
FIG. 23 is another exploded, perspective view of the dust collector of FIGS. 21 and 22, with portions removed to enhance clarity.
Figure 24:
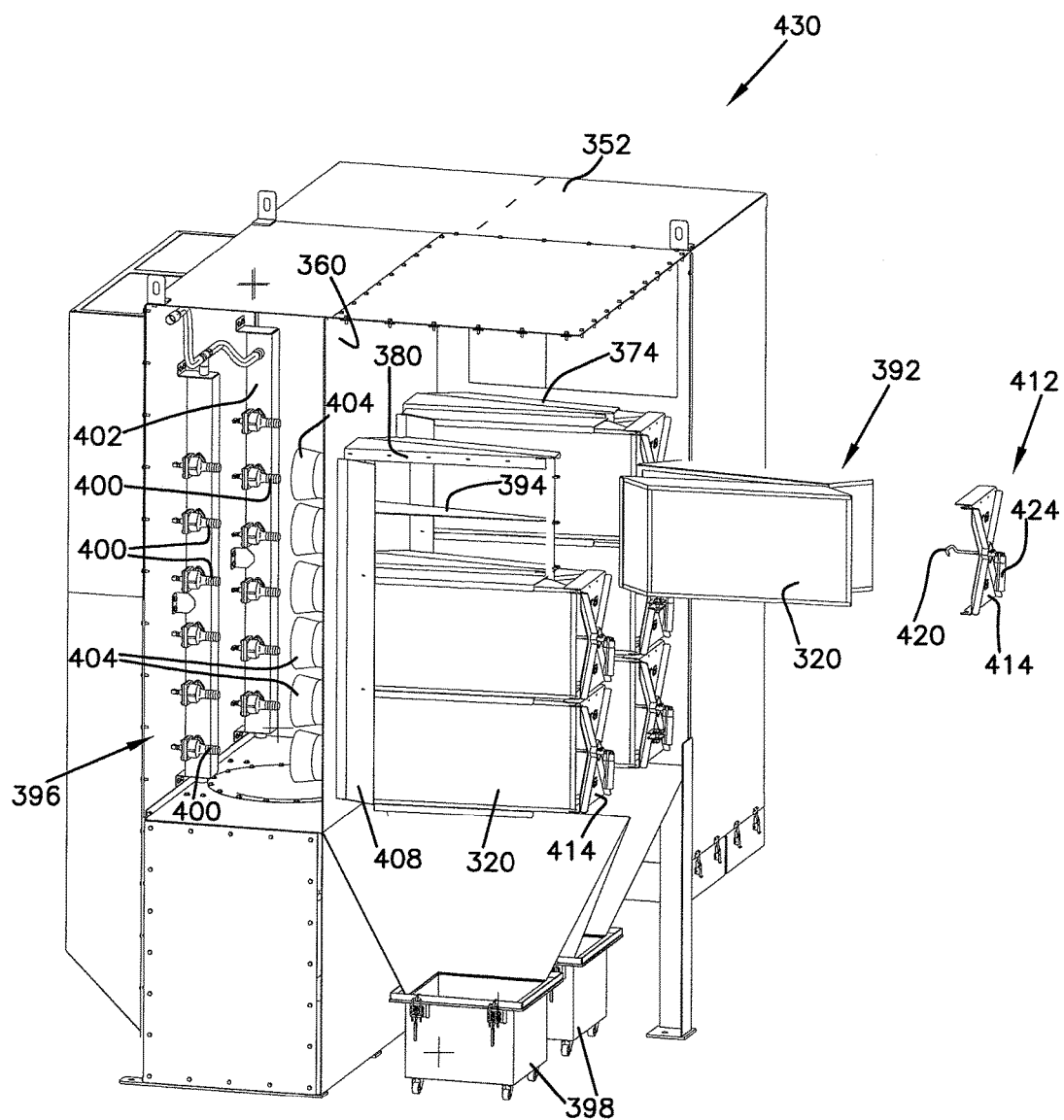
FIG. 24 is another exploded, perspective view of the dust collector of FIGS. 21-23 with portions removed to enhance clarity.
Figure 27:
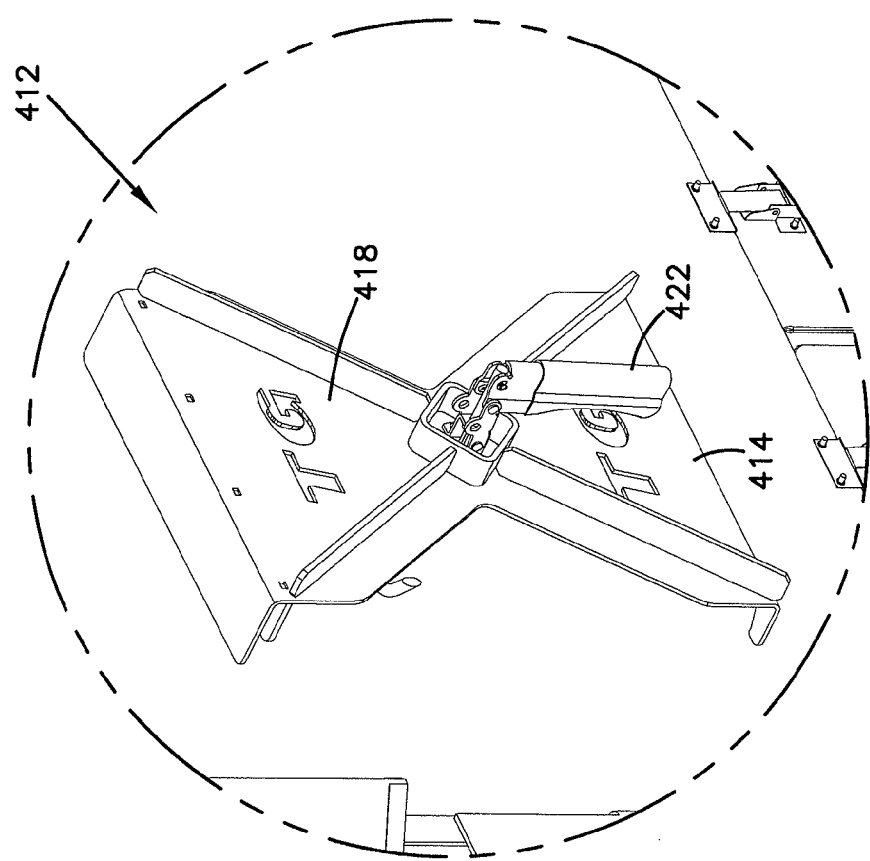
FIG. 27 is another perspective view of the clamp arrangement of FIG. 26.
Figure 26:
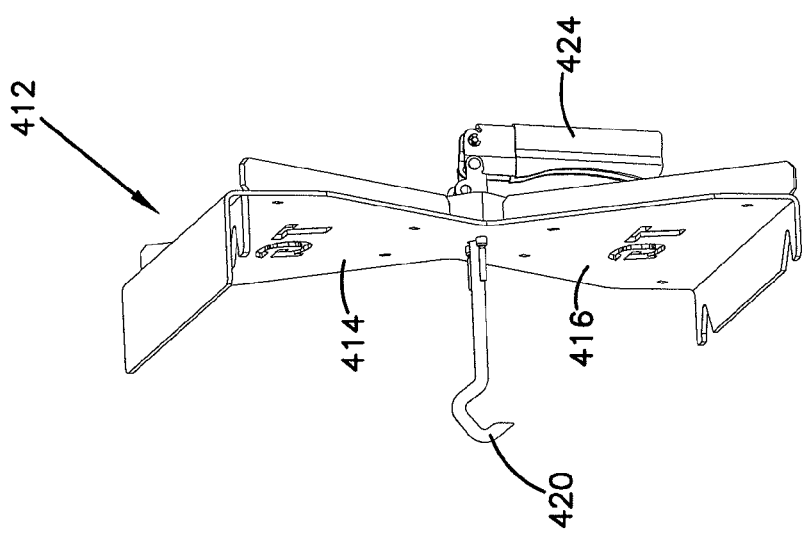
FIG. 26 is a perspective view of a clamp arrangement utilized with the dust collectors of FIGS. 14-25.

The dust collector 350 further includes a clamp arrangement 410 (FIG. 21). The clamp arrangement 410 is for operably securing the filter element pairs 392 in sealing engagement with the tubesheet 360 and the frame arrangement 372. As embodied herein, the clamp arrangement 410 includes an end clamp 412 (FIGS. 26 and 27) operably securing the filter element pair 392 against the tubesheet 360. The end clamp 412, in this embodiment, includes a plate 414 having a filter side 416 and an exterior side 418. Attention is directed to FIGS. 26 and 27, which shows an example embodiment of the plate 414. The plate 414, on the filter side 416 will engage the trays 374. A hook 420 extends from the filter side 416 of the plate 414 and removably catches a rib 422 (FIG. 25) projecting from the bar 388.

In preferred embodiments, the bar 388 includes a plurality of loops, catches, or ribs 422 projecting therefrom. The ribs 422 are for engaging the hooks 420 to be used in connection with the clamp arrangement 410.

Each plate 414 includes a handle 424 extending from the exterior side 418 of the plate 414. The handle 424 is operably secured to the hook 420 such that by moving the handle 424 when the hook 420 is engaged with the rib 422 will cause compression or release of the plate 414 against the respective filter pair 492.

In the embodiment of FIGS. 14-20, the clamp arrangement 410 includes a plurality of the end clamps 412, and particularly, first, second and third end clamps 412.

It should be understood how each air filter cartridge 320 operably fits within the housing 352. Each filter cartridge 320 is slid along the trays 374 and within a respective channel 384. The end of the air filter cartridge 320 will engage the guide ramp 414, which will help to guide and direct the cartridge 320 into sealing engagement against the tubesheet 360. The side gasket member 342 will engage against the sealing surface 368 of the tubesheet 360. At the same time, the perimeter gasket member 341 will engage against the sealing surface 380 of the mid-tray 378 and the sealing surface 390 of the bar 388. The end clamp 412 will be oriented over the ends of a filter element pair 392. The hook 420 will be oriented to latch or catch the rib 422. The handle 424 will be pivoted in order to pull the plate 414 in a direction against the bar 388, pushing the filter element pair 392 against the tubesheet 360. This helps to form the seal 370, 382, and 391.

In use, dirty air is directed through the dirty air inlet 356 into the unfiltered air plenum 362 of the housing 352. The dirty air is then directed through the upstream flow faces 324 of the media pack 322 of a first air filter cartridge 320. In this embodiment, the dirty air would be directed through the upstream flow face 324 of each filter element pair 392. Dirty air is prevented from bypassing the air filter cartridge 320 by the perimeter gasket member 341 that is compressed against the frame arrangement 372 and the side gasket member 342 that is compressed against the tubesheet sealing surface 368.

During use, the air filter cartridges 320 will be periodically back flushed of dust and debris by pulsing of the reverse pulse cleaning arrangement 396. This will send jets of air through the downstream flow face 326 and through the upstream flow face 324. This will help to knock built up dust and debris from the media pack 322. This dust and debris will fall by gravity into the hopper 398.

After a period of use, the air filter cartridges will need replacement. To service the dust collector 350, the end clamps 412 are removed by pivoting the handle 424 and releasing the hook 420 from the rib 422. This allows the end clamp 412 to be removed from the housing 352. This also releases the seals between the gasket arrangement 340 and the tubesheet 360 and frame arrangement 372. Each air filter cartridge 320 of each filter element pair 392 is then removed from the housing 352. The old filter cartridge 320 is then recycled, incinerated, or otherwise discarded. A new filter cartridge 320 is then provided and installed as described previously.

C. The Embodiment of FIGS. 21-25

Another embodiment of a dust collector is illustrated in FIGS. 21-25 at reference numeral 430. This embodiment is the same as the embodiment of the dust collector 350, with the exception of having a plurality of filter pairs 392 arranged in parallel first and second columns 431, 432. Otherwise, all of the structure in the dust collector 430 is analogous to the structure of dust collector 350. As such, the parts of the dust collector 430 carry the same reference numerals and the parts and description are incorporated herein by reference. The parts in the dust collector 430 are duplicated, one set of parts for each column 431, 432. It should be understood that while 2 columns are shown, depending upon the desired size and capacity desired, there could be more than 2 columns.

D. Adapter Arrangement, FIGS. 28 and 29

In some systems, it may be desirable to use a standard air flow cartridge that merely has a perimeter gasket member and not a side gasket member. In such systems, it will be necessary to modify the dust collector sealing surfaces to receive this type of air filter cartridge.

FIGS. 28 and 29 show a filter cartridge 438 having a perimeter gasket 440 surrounding the downstream flow face 442. The media pack 444 can be as described above with respect to FIGS. 1-7. In this embodiment, each strip of the media pack is straight and not angled relative to a horizontal surface from the upstream face 446 to the downstream flow face 442.

The filter cartridge 438 does not include a side gasket member, such as side gasket member 342 in the proceeding embodiments. When such a filter cartridge such as cartridge 438 is utilized, an adapter flange 448 is secured to the tubesheet sealing surface 368. The adapter flange 448 has an adapter sealing surface 450 orthogonal to the tubesheet sealing surface 368 and forms a seal 452 with the perimeter gasket member 440.

It should be understood that in FIGS. 28 and 29, only the adapter flange 448 and filter cartridge 438 is illustrated. The adapter flange 448 would be secured to the tubesheet sealing surface 368 in the dust collector housing 352. When using the adapter flange 448, filter element cartridges 438 can be used that do not have the side gasket member 342.

IV. Example Dust Collector

A. FIGS. 30-48

Another embodiment of a dust collector is shown in FIGS. 30-48 at 500. The dust collector 500 is similar to the dust collector 350 of FIGS. 14-20, except that the dust collector 500 includes additional features including a pre-cleaner 502 and a movable frame arrangement 504 (sometimes referred to herein as simply "frame 504").

The dust collector 500 includes a housing 506. The housing 506 can be made of materials such as sheet metal to form a plurality of walls enclosing the internal components. The housing 506 defines an inlet 508 for taking in dirty, unfiltered air and an outlet 510 for exhausting clean, filtered air. As mentioned above, in the embodiment shown, there is a pre-cleaner 502. The pre-cleaner 502 is optional, and in embodiments in which there is a pre-cleaner 502, the inlet 508 is blocked or closed. Instead, the inlet for dirty, unfiltered air is through the pre-cleaner inlet 512.

The pre-cleaner 502 is constructed in accordance with the disclosure described in PCT/US2009/033061 filed Feb. 4, 2009 claiming priority to U.S. Provisional Patent Application No. 61/026,236 filed Feb. 5, 2008, which applications are herein incorporated by reference. The pre-cleaner 502 includes an inlet volume constituting an unfiltered air plenum, 514 and a "bump out" in the form of a pre-separation region 516 that is spaced both laterally and axially relative to a filter region 518, which includes at least one air filter cartridge 320. In FIGS. 32 and 33, it can be seen how the inlet volume 514 is lined with an air baffle arrangement 520 along an upper portion thereof. The baffle arrangement 520 extends from the pre-cleaner inlet 512 until the pre-separator bump out region 516. The baffle arrangement 520 is to help ensure that unfiltered air is directed into the pre-separator region 516 before being drawn into the filter region 518. A wall baffle 522 laterally separates the filter region 518 from the inlet volume 514. The baffle arrangement 520 axially separates the inlet volume 514 from the filter region 518. As can be seen in FIGS. 32 and 33, an opening 524 allows the unfiltered air to flow from the inlet volume 514 into the filter region 518.

The pre-separation region 516 will reduce the impact of high velocity particulate, which encourages dust to settle out of the air stream before flowing into the filter region 518.

The housing 506 includes a door 526 that is openable and closable in order to access the filter region 518. Other features visible for the dust collector 500 includes a dust collection hopper 528 leading to a collection drum 530. The hopper 528 is located under or below the filter region 518 to collect dust or other particulate that falls by gravity from the filter region 518 for various reasons including, for example, reverse-pulse cleaning. In FIG. 35, a blower arrangement 532 can be seen on a filtered air side 534 of the tubesheet 536. The blower arrangement 532 operates to draw air through the housing inlet 508 or pre-cleaner inlet 512, then through the filter region 518, then to the filtered air side 534, and then exhaust the filtered air through the outlet 510.

The tubesheet 536 is analogous to the tubesheet 360, described above. The tubesheet 536 functions as a wall that separates an interior volume of the housing 506 between an unfiltered air side or plenum 538 (FIG. 35) and the filtered air side or plenum 534. The tubesheet 536 has a plurality of holes or apertures 540 therethrough. The apertures 540 are for allowing filtered air to flow from the filter region 518 through the tubesheet 536, into the filtered air plenum 534, and then out through the clean air outlet or exhaust 510. In this embodiment, the filter elements used are the same as the air filter cartridges 320, described above. As such, the same reference numerals will be used in connection with description of the air filter cartridges 320. The filter cartridge 320 is secured within the frame 504 and sealed with the gasket arrangement 340 against the tubesheet 536 to prevent unfiltered air from passing through the apertures 540. The frame 504 is discussed further below.

As with the dust collector 350, the dust collector 500 further includes a reverse pulse cleaning arrangement 542. The reverse pulse cleaning arrangement 542 is constructed and arranged to emit a pulse of air from the filtered air plenum 534, and through the downstream flow faces 326 of each of the air filter cartridges 320. By pulsing air from the clean air side 534 through the downstream flow faces 326, dust and other debris clogging the upstream flow faces 324 of the air filter cartridges 320 are dislodged and knocked loose from the air filter cartridge 320. From there, the dust and debris falls by gravity into dust collection hopper 528 located below the filter region 518.

The reverse pulse cleaning arrangement 542 includes, preferably, at least one nozzle 544 for each aperture 540 in the tubesheet 536. The nozzles 544 are in air flow communication with a manifold 546, which is connected to a source of pressurized air. The reverse pulse cleaning arrangement 542 periodically sends a pulse of air through the manifold 546 to the nozzles 544. The pulse of air leaves each nozzle 544 and flows through the apertures 540. From there, the air flows in a reverse direction from the normal direction of air flow through the air filter cartridges 320.

In the embodiment shown, each of the apertures 540 includes a venturi 548 to help direct the pulse of air from the nozzle 544 through the apertures 540. The venturi 548 circumscribes each respective aperture 540 and helps to ensure that the air pulse is evenly directed into the clean air volume 406 (FIG. 20, above) of each air filter cartridge 320.

The frame 504 holds the filter cartridges 320 in sealing engagement against the tubesheet 536. In this example, the frame 504 is movable, in particular, pivotable with respect to the tubesheet 536 to allow the filter cartridges 320 to be selectively installed and removed for servicing and change out. The frame 504 is pivotally attached to the tubesheet 536 by a hinge arrangement 550 (FIG. 43), in this example. In this example embodiment, the hinge arrangement 550 includes an integral stop 552 to prevent the frame 504 from rotating so far that it bumps into other internal structure within the housing 506. The stop 552 will engage the tubesheet 536 after the frame 504 rotates its maximum amount from its position when it is in a sealed position. This rotation will be no more than 90 degrees, usually under 60 degrees, and typically 5-45 degrees. The frame 504 is preferably pivotable relative to the tubesheet 536 between an operable position, in which the air filter cartridge 320 is sealed against the tubesheet 536 for operating of the dust collector 500, and a service position, in which the air filter cartridge 320 is unsealed against the tubesheet 536 to allow servicing of the dust collector 500 by changing out the old filter cartridge 320 for a new filter cartridge 320.

The frame 504, as mentioned above, is pivotally attached to the tubesheet 536 and rotates toward and from a central V-frame 554 between its operable position and service position. The V-frame 554 defines a mid-tray 556, analogous to the mid-tray 378, described above. Further, the V-frame 554 includes a vertical bar 558 that is spaced from the tubesheet 536 and runs vertically generally parallel to the tubesheet 536. The bar 558 is analogous to the bar 388, described above.

Figure 45:
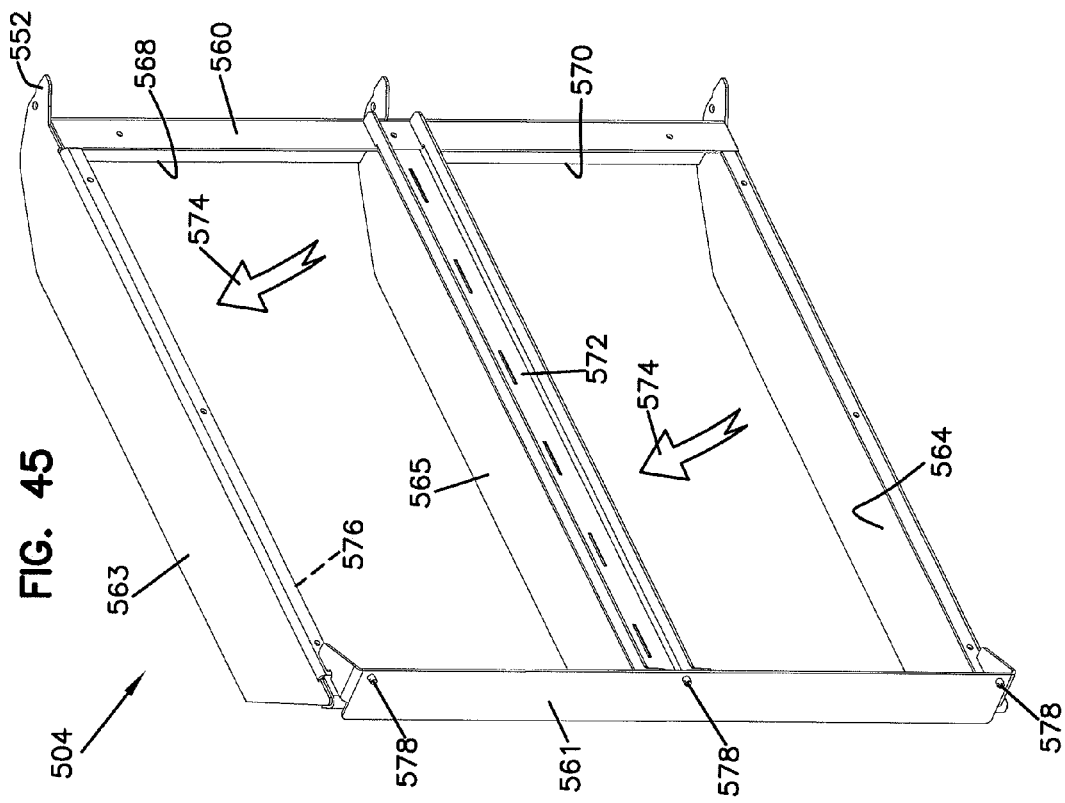
FIG. 45 is another perspective view of the frame of FIG. 44.
Figure 44:
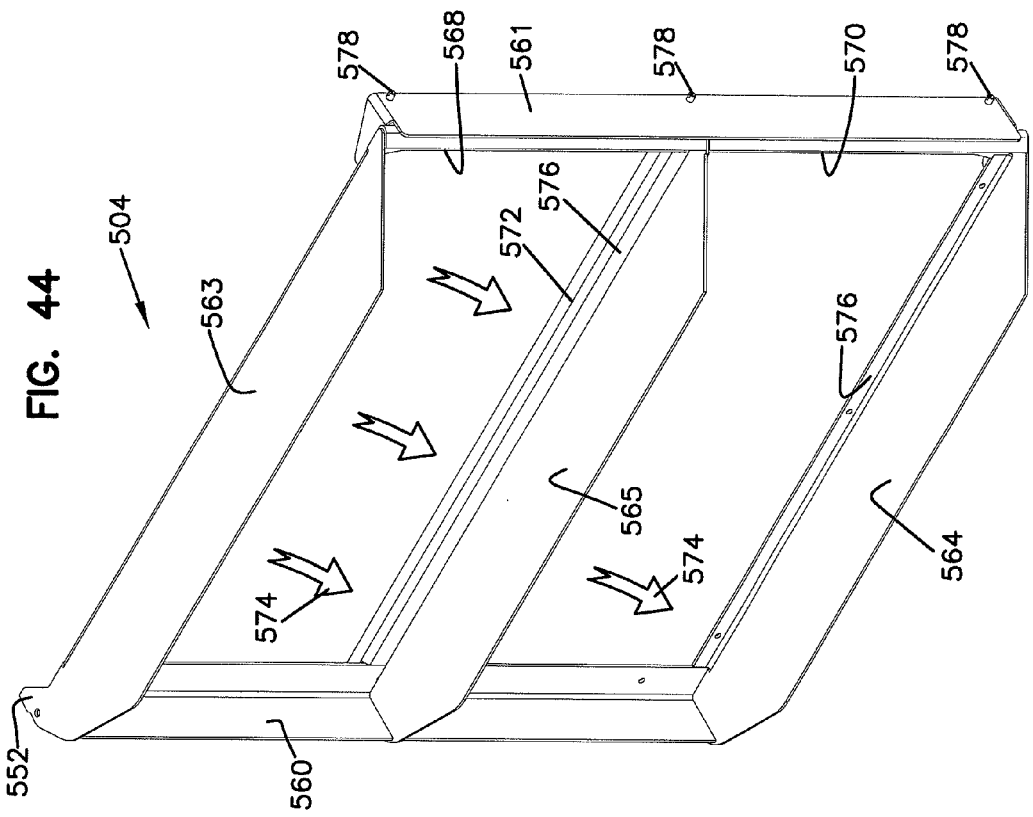
FIG. 44 is a perspective view of the frame used in the dust collector of FIGS. 30-43.

In reference now to FIGS. 44 and 45, perspective views of the example frame 504 are depicted. In FIGS. 44 and 45, the frame 504 includes, in the embodiment shown, a pair of parallel rails 560, 561, spaced from each other and, in use, extending in a vertical direction. Between the rails 560, 561 are a plurality of trays, shown herein as a top tray 563, a bottom tray 564, and center tray 565 shown in this example, as half way between the top tray 563 and bottom tray 564.

The rails 560, 561, the top tray 563, and the center tray 565 define a first window 568. The first window 568 is sized to expose the flow faces of a first air filter cartridge 320. Analogously, the rails 560, 561 and the bottom tray 564 and center tray 565 define a second window 570, which is sized to expose the flow faces of a second air filter cartridge 320. As such, in this embodiment, each tray 504 is sized and configured to hold two filter cartridges 320. In other embodiments, the trays 504 can be sized to hold more or fewer filter cartridges 320. The trays 563-565 are sized and shaped to help support the filter cartridges 320 within the frame 504.

Extending between the rails 560, 561 is a mid-bar 572. The mid-bar 572 is shown centered between the top tray 563 and bottom tray 564. The mid-bar 572 helps to secure the center tray 565 to the rails 560, 561.

The frame 504 as seen in FIG. 44 is the frame 504 as would be viewed from the downstream perspective of the frame 504. That is, air flow is flowing in a direction shown at arrows 574 through the windows 568, 570. As mentioned above, the windows 568, 570 will be holding filter cartridges 320. The frame shown in FIG. 45 is in the opposite perspective view, and is showing the frame 504 from an upstream side of the frame 504. The air is flowing in the direction of arrow 574.

In FIG. 44, it can be seen how the frame 504 includes projections 576 adjacent to the bottom tray 564 and the center tray 565. There is also an analogous projection 576 adjacent to the top tray 563, which is not visible in FIG. 44, but the opposite surface is visible in FIG. 45. The projections 576 help to hold the filter cartridges 320 in place within the frame 504 and prevent the cartridges 320 from backing out of sealing engagement with the tubesheet 536 and the V-frame 554.

Figure 41:
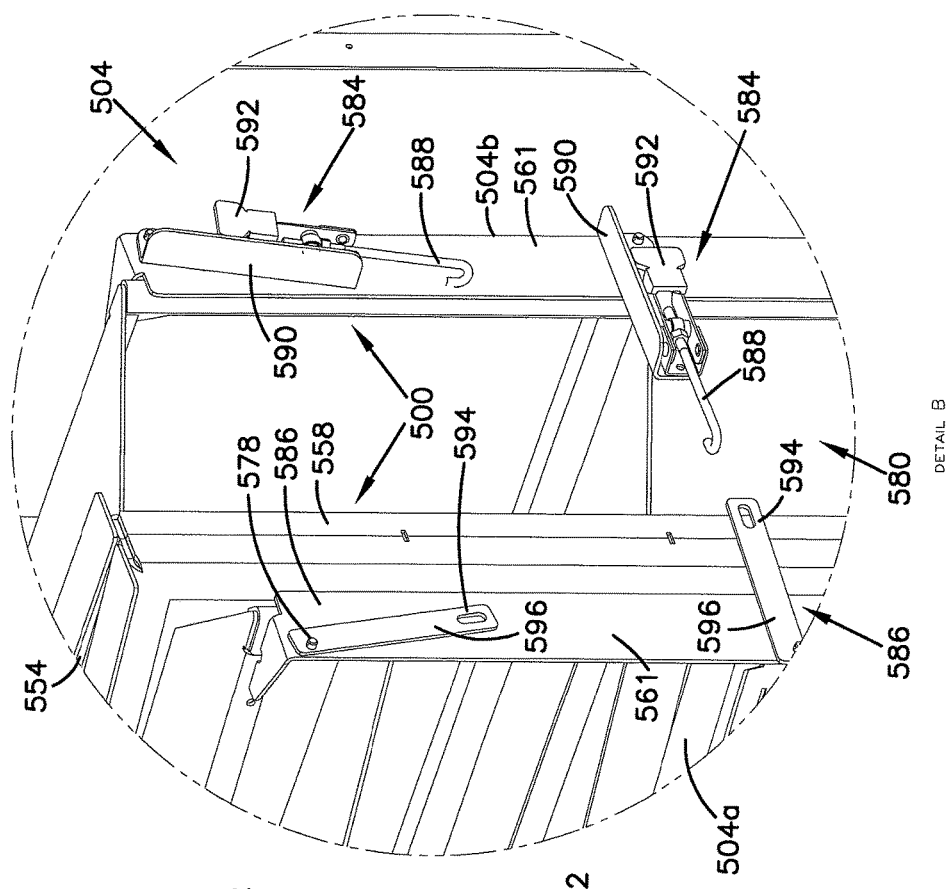
FIG. 41 is an enlarged perspective view of detail B shown in FIG. 40.
Figure 40:
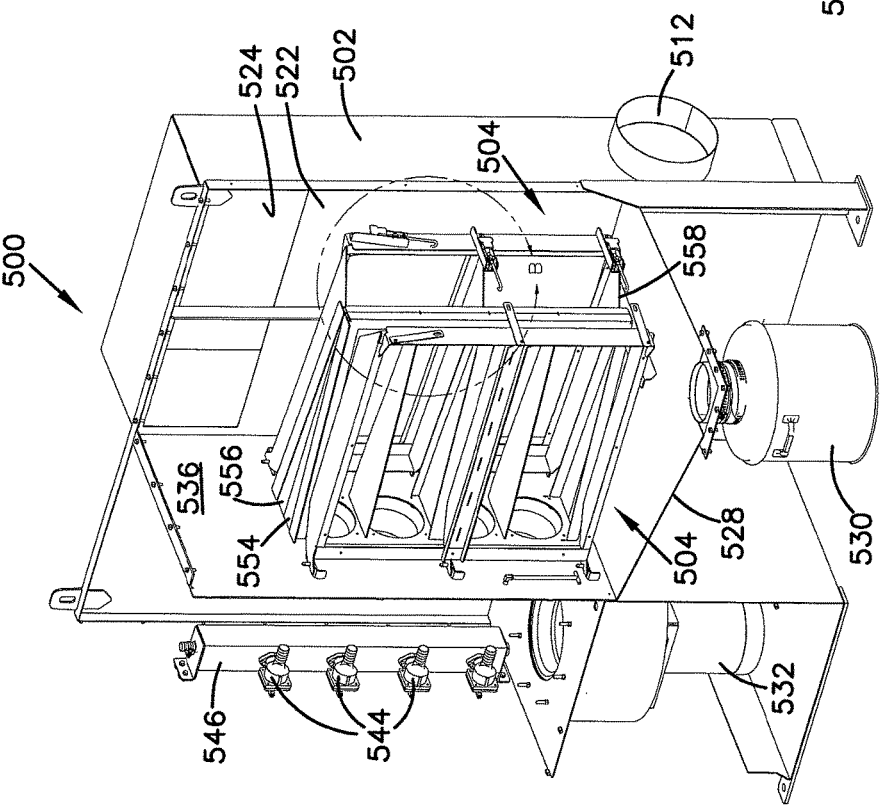
FIG. 40 is a perspective view of the dust collector of FIGS. 38 and 39, with walls and filter elements removed to show internal components.
Figure 43:
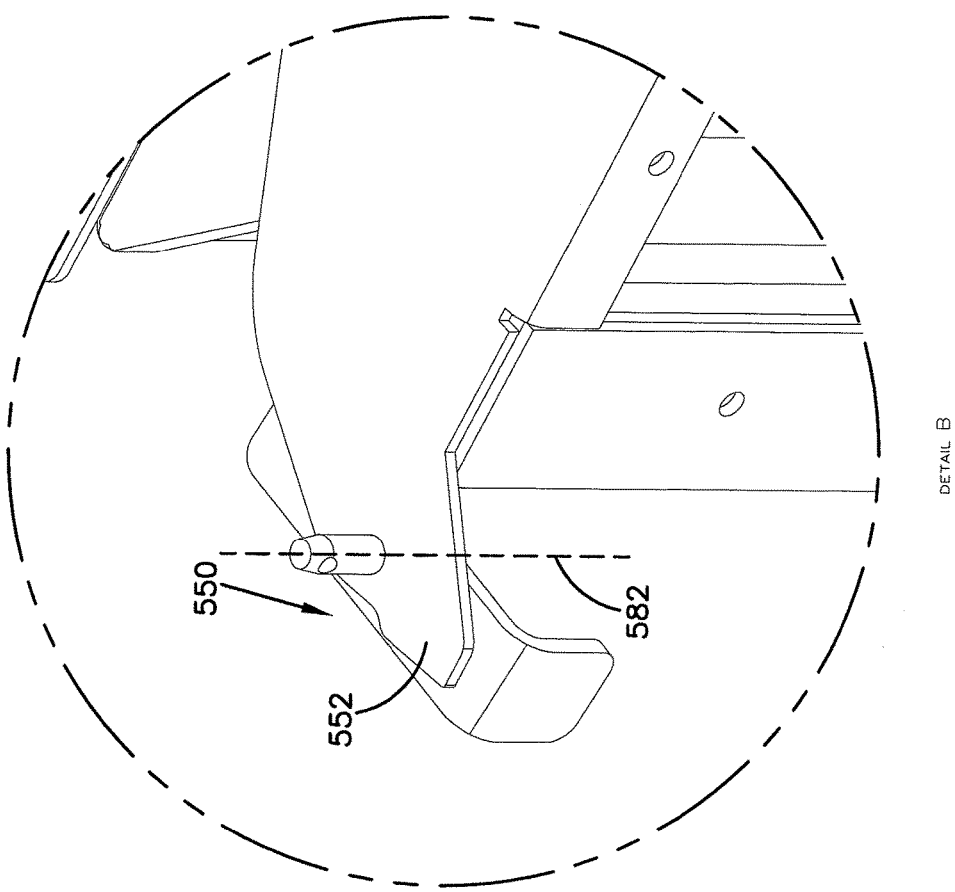
FIG. 43 is an enlarged perspective view of detail B of FIG. 42.

The rail 561 that is located distal relative to the tubesheet 536 includes, in this example embodiment, a plurality of pins or projections 578 projecting therefrom. In this example, the pins or projections 578 hold a part of a clamp assembly 580 (FIG. 41). More details on the clamp assembly 580 are discussed further below.

Figure 46:
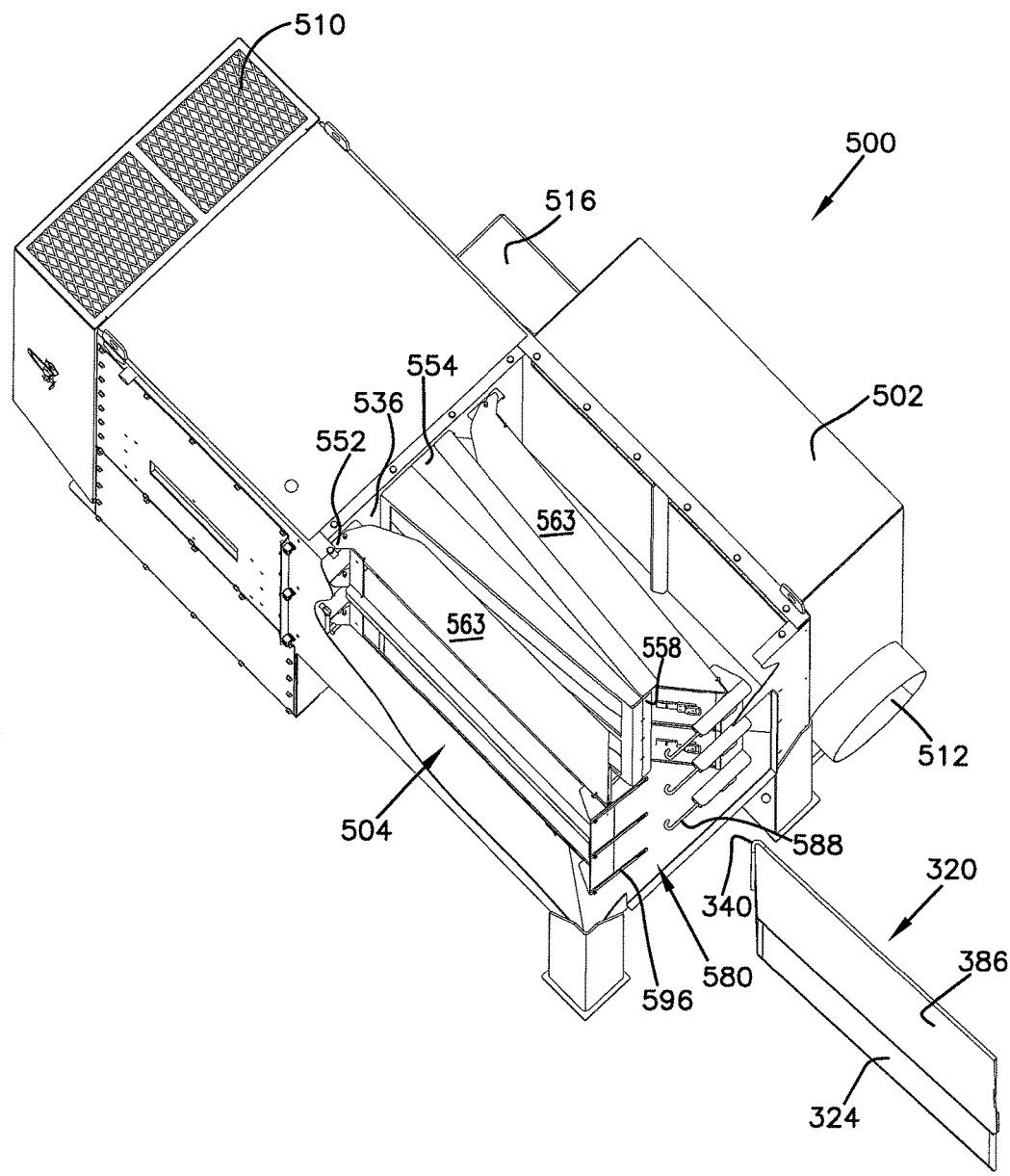
FIG. 46 is an upper perspective view of the dust collector of FIGS. 30-43 and showing a filter cartridge removed therefrom.
Figure 49:
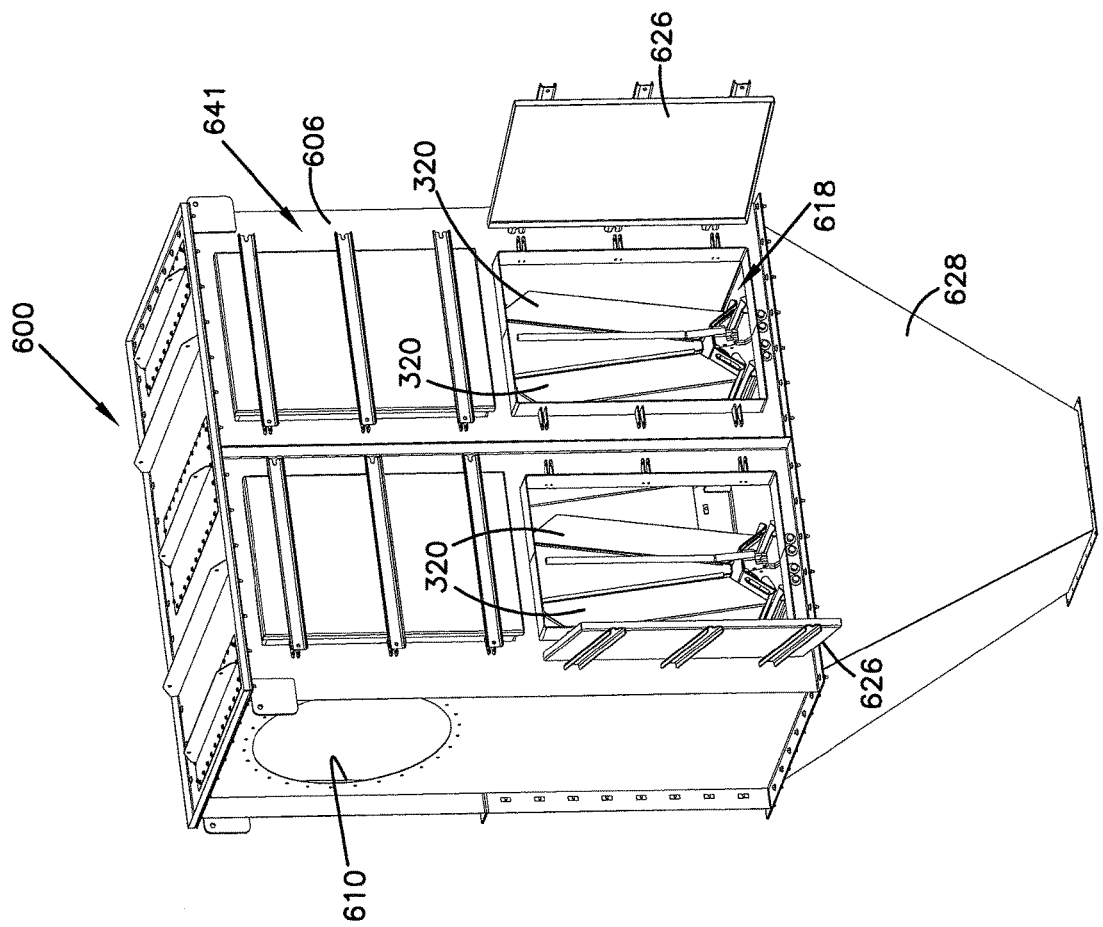
FIG. 49 is a perspective view of another embodiment of a dust collector, constructed in accordance with principles of this disclosure.
Figure 53:
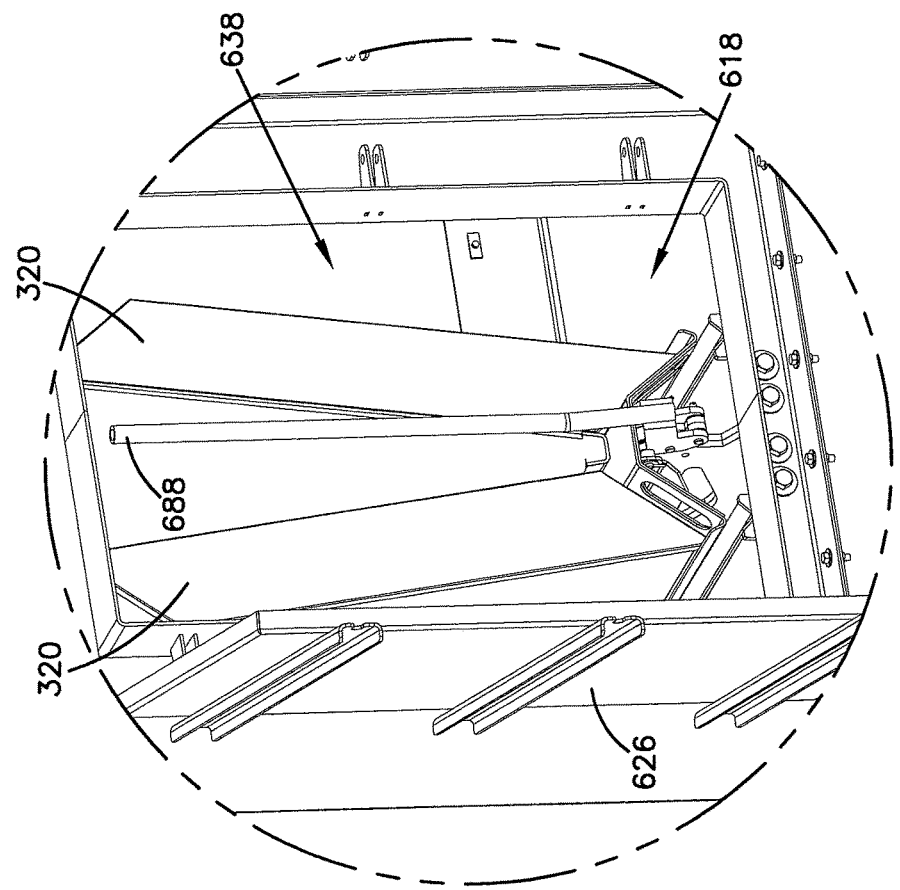
FIG. 53 is an enlarged view of a portion of the dust collector shown in FIG. 52.

FIG. 48 shows the filter cartridge 320 located within one of the frames 504, but before the filter cartridge 320 is pushed or urged into sealing engagement between the perimeter gasket 341 and the V-frame 554. The clamp assembly 580, when in a closed, locked, or clamped position will push the filter cartridge 320 into a sealed and operable engagement with the dust collector housing 506. This sealed and operable engagement with the dust collector housing 506 is accomplished by pushing the side gasket member 342 against the tubesheet 536 and the perimeter gasket member 341 against the V-frame 554 including the bar 558. FIG. 46 is a view similar to FIG. 48, except that FIG. 46 shows the filter cartridge 320 removed from the housing 506 and in a process of being installed therewithin. The frame 504 is shown pivoted to an open or service or loading position, with the stop 552 engaged against the tubesheet 536. After the cartridge 320 is properly loaded within the frame 504 and the clamp assembly 580 engaged, the frame 504 is pivoted to a closed or operational position.

In reference now to FIG. 41, the clamp assembly 580 is discussed in further detail. The clamp assembly 580 is provided to releasably hold or clamp the filter cartridge 320 in place in sealing engagement with the housing 506 of the dust collector 500. The clamp assembly 580 also helps to hold the frame 504 in a closed or operable state, when the clamp assembly 580 is engaged, to prevent the frame 504 from pivoting. When the clamping assembly 580 is released to an open position, this frees the frame 504 to pivot on its pivot axis 582 (FIG. 43) relative to the tubesheet 536.

In the embodiment shown, the clamping assembly 580 includes a hook arrangement 584 and a catch arrangement 586. Typically, one-half of the clamp assembly 580 will be on one of the frames 504 on one side of the V-frame 554, while the other half of the clamp assembly 580 will be on the frame arrangement 504 on the other side of the V-frame 554. The filter cartridge 320 on one side of the V-frame 554 and the filter cartridge 320 on the opposite side of the V-frame 554 form a filter pair 598 (FIG. 48). In the embodiment shown in FIG. 41, the catch arrangement 586 is part of the frame 504*a*, while the hook arrangement 584 is part of the frame 504*b*. When the respective halves 584, 586 are operably engaged, the frames 504*a* and 504*b* are moved together toward the bar 558 of the V-frame 554. The filter cartridges 320 that the respective frames 504*a* and 504*b* are holding (the filter pair 598) are sealed against the V-frame 554 and the tubesheet 536 when the clamp assembly 580 is engaged.

The hook arrangement 584 includes a hook member 588 secured to a holder 590. The hook member 588 is movable and engagable with the catch arrangement 586 through an over-center clamp 592. That is, when the clamp 592 is pivoted or rotated in a direction away from the rail 561 of the frame 504*b*, the hook member 588 is extended laterally in a direction away from a remaining portion of the hook arrangement 584. This allows the hook member 588 to capture or engage a hole 594 in the catch arrangement 586. The clamp 592 is then rotated or pivoted back in a direction toward the rail 561 of the frame 504*b*, which pulls the hook member 588 toward a remaining portion of the hook arrangement 584 and which pulls the frames 504*a* and 504*b* toward each other and toward the V-frame 554 until the cartridge 320 is in sealing engagement with the V-frame 554 and the bar 558.

The catch arrangement 586 is shown in this embodiment to be a flange 596 secured to the rail 561 of the frame 504 through the pin 578.

Figure 36:
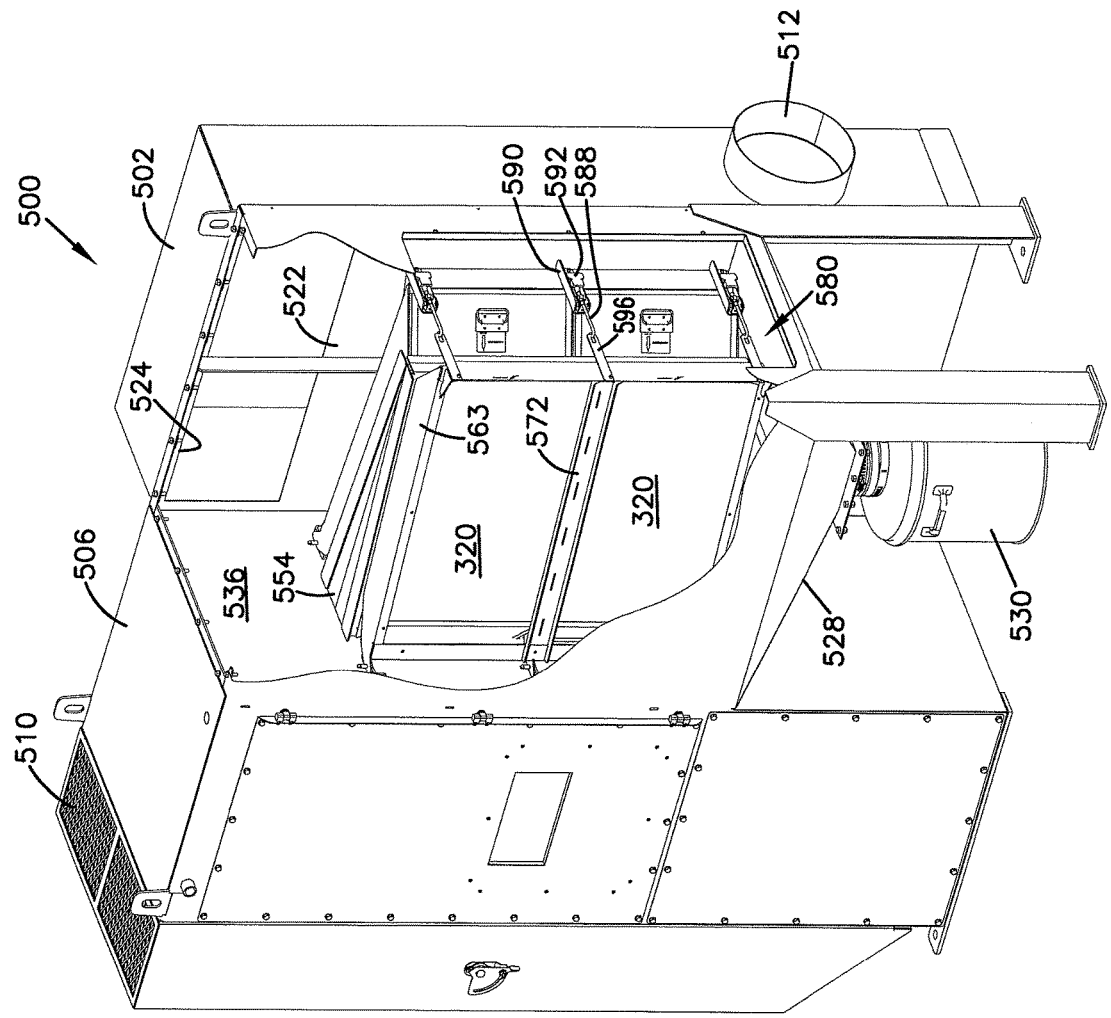
FIG. 36 is a perspective view of the dust collector of FIGS. 30-35 with portions removed to expose internal components.
Figure 37:
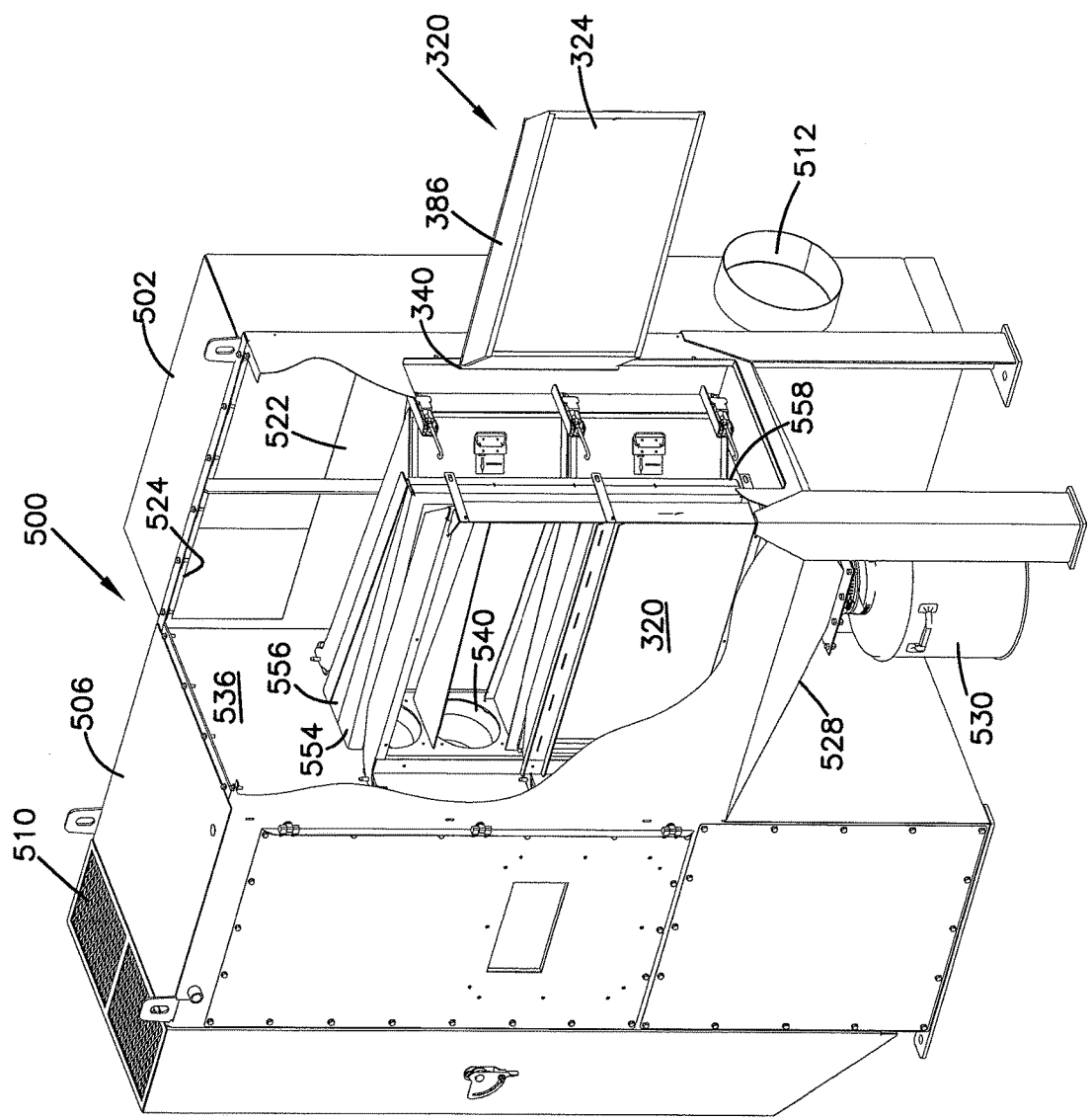
FIG. 37 is a perspective view of the dust collector of FIG. 36 and showing a filter element removed from the dust collector.
Figure 42:
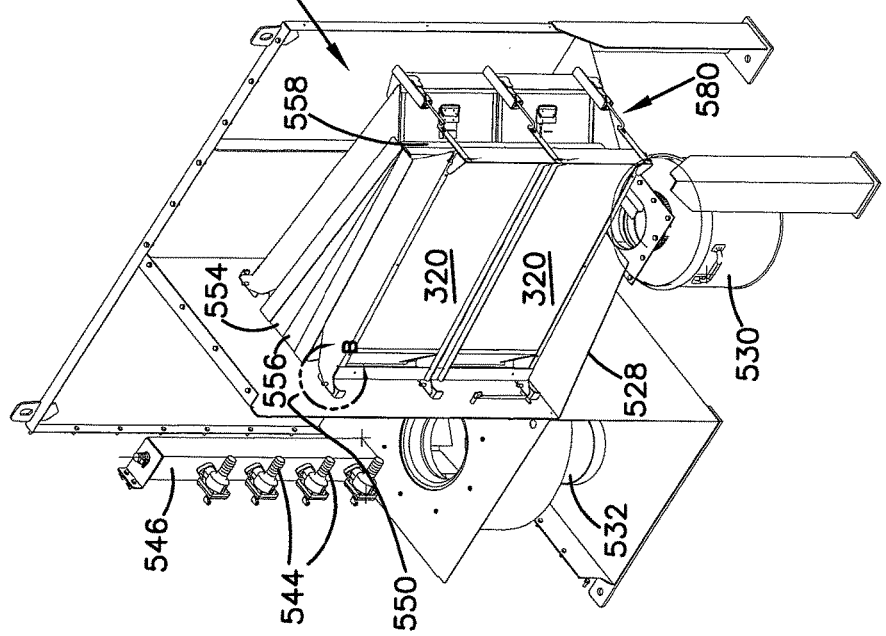
FIG. 42 is a perspective view of the dust collector of FIGS. 30-41, with external walls removed and with the filter elements installed.

As can be seen in FIG. 41, both the hook arrangement 584 and the catch arrangement 586 is pivotable relative to the rail 561 of the frame 504*a* and 504*b*, respectively. FIG. 41 shows two of the clamping assemblies 580. In the upper clamp assembly 580, the hook arrangement 584 and the catch arrangement 586 are shown pivoted downwardly to be adjacent and against the rail 561 of the frame 504*a* and 504*b*, respectively. In this state, the clamping assembly 580 is in a filter servicing condition. That is, the clamping assembly 580 is moved into a condition that allows the filter cartridges 320 to be either removed or loaded into the frames 504 because they are moved out of the way to not interfere with the space that the filter cartridges 320 must pass through for servicing. In the lower clamping assembly 580 shown in FIG. 41, the hook arrangement 584 and catch arrangement 586 are pivoted in a direction transverse to the rails 561 of the respective frames 504*a* and 504*b*. This is a condition of the clamp assemblies 580 just prior to a final step of engagement of the clamp assembly 580. FIGS. 36 and 42 show the clamp assemblies 580 in an engaged and locked position.

In use, dirty air is directed through the pre-cleaner inlet 512 and into the pre-separator region 516. This helps to remove at least some of the dust or other particles from the air. Next, the air flows into the unfiltered air plenum 538 through the opening 524 and into the filter region 518. The dirty air is then directed through the upstream flow faces 324 of the media pack 322 of the air filter cartridges 320. Dirty air is prevented from bypassing the air filter cartridges 320 by the perimeter gasket member 341 that is compressed against the V-frame 554 including the bar 558 and the side gasket member 342 that is compressed against the tubesheet 536.

During use, the air filter cartridges 320 will be periodically back flushed of dust and debris by pulsing of the reverse pulse cleaning arrangement 542. This will send jets of air through the downstream flow face 326 and then through the upstream flow face 324. This will help to knock built up dust and debris from the media pack 322. This dust and debris will fall by gravity into the hopper 528.

After a period of use, the air filter cartridges 320 will need replacement. To service the dust collector 500, the door 526 of the housing 506 is opened. The clamping assemblies 580 are moved from a locked, engaged position to an unlocked, release position. This is done by pivoting the over center clamp 592 to move the hook member 588 out of the hole 594 in each catch arrangement 586. The flanges 596 and hook arrangements 584 are pivoted downwardly to be adjacent to the rails 561 of the frames 504 in order to move the clamping assembly 580 out of the way. Next, the frames 504 are pivoted on their pivot axes 582 relative to the tubesheet 536. The frames 504 are pivoted in a direction away from the V-frame 554. This releases the seals between the gasket arrangement 340 and the tubesheet 536 and V-frame 554. Each air filter cartridge 320 is then removed from the housing 506 through the opening created by the open door 526. The old filter cartridge 320 is then recycled, incinerated, or otherwise discarded. A new filter cartridge 320 is then provided. The new filter cartridge 320 is passed through the opening created by the open door 526 and is oriented within the frame 504. The flange 596 and hook arrangement 584 is pivoted in a direction transverse to the rails 561 of the frames 504, and the clamping assembly 580 moves the pivoting frames 504 in a direction toward the V-frame 554. The over center clamp 592 is engaged, and the clamp assembly 580 is put into its locked and loaded position. This also presses the filter cartridges 320 against the tubesheet 536 and V-frame 554 including the bar 558 to seal each of the filter cartridges 320 in place in the housing 506.

B. FIGS. 57-59

Figure 57:
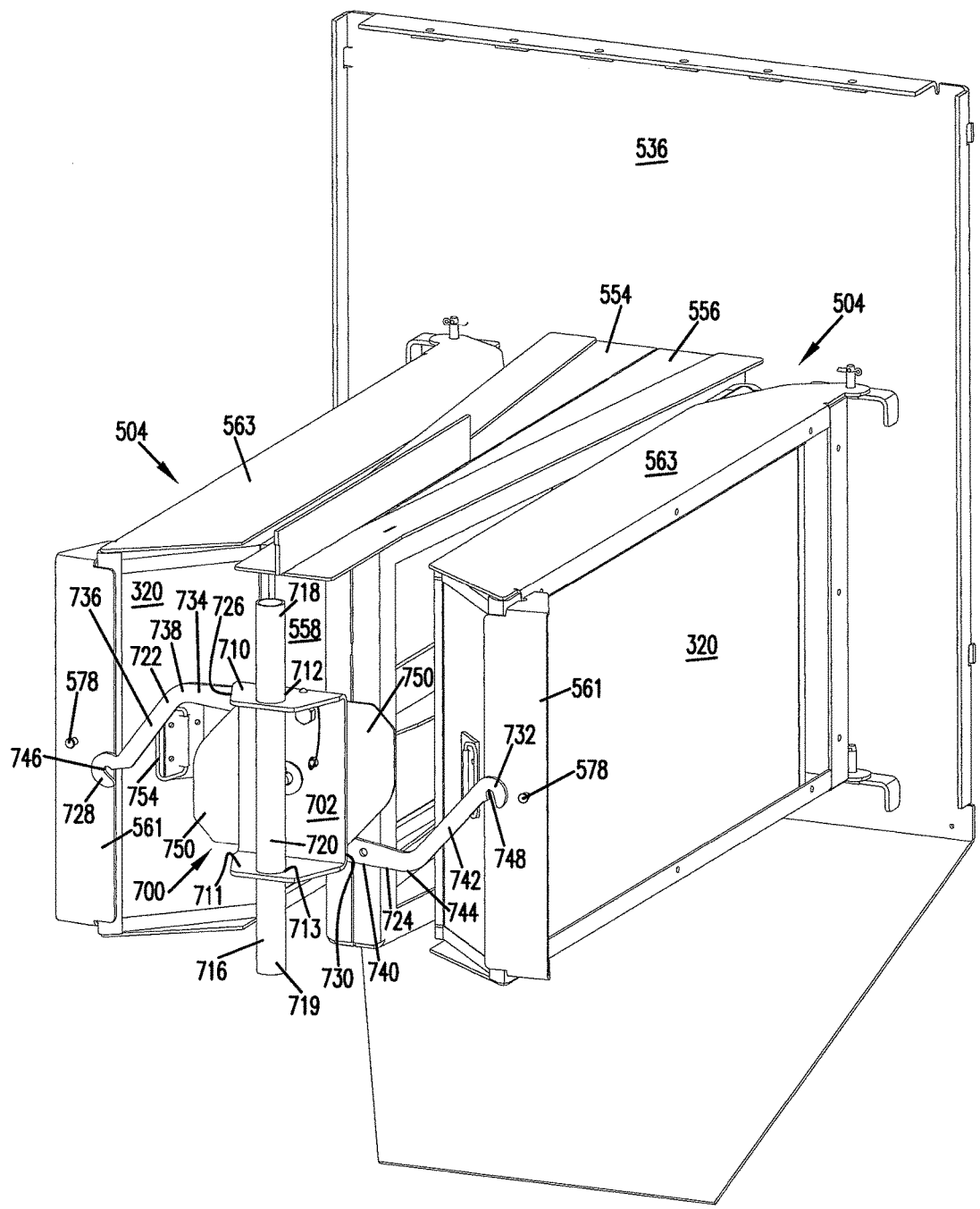
FIG. 57 is a schematic, perspective view of the dust collector of FIGS. 30-48, utilizing an alternative embodiment of a clamp assembly, the clamp assembly being in a release position.
Figure 58:
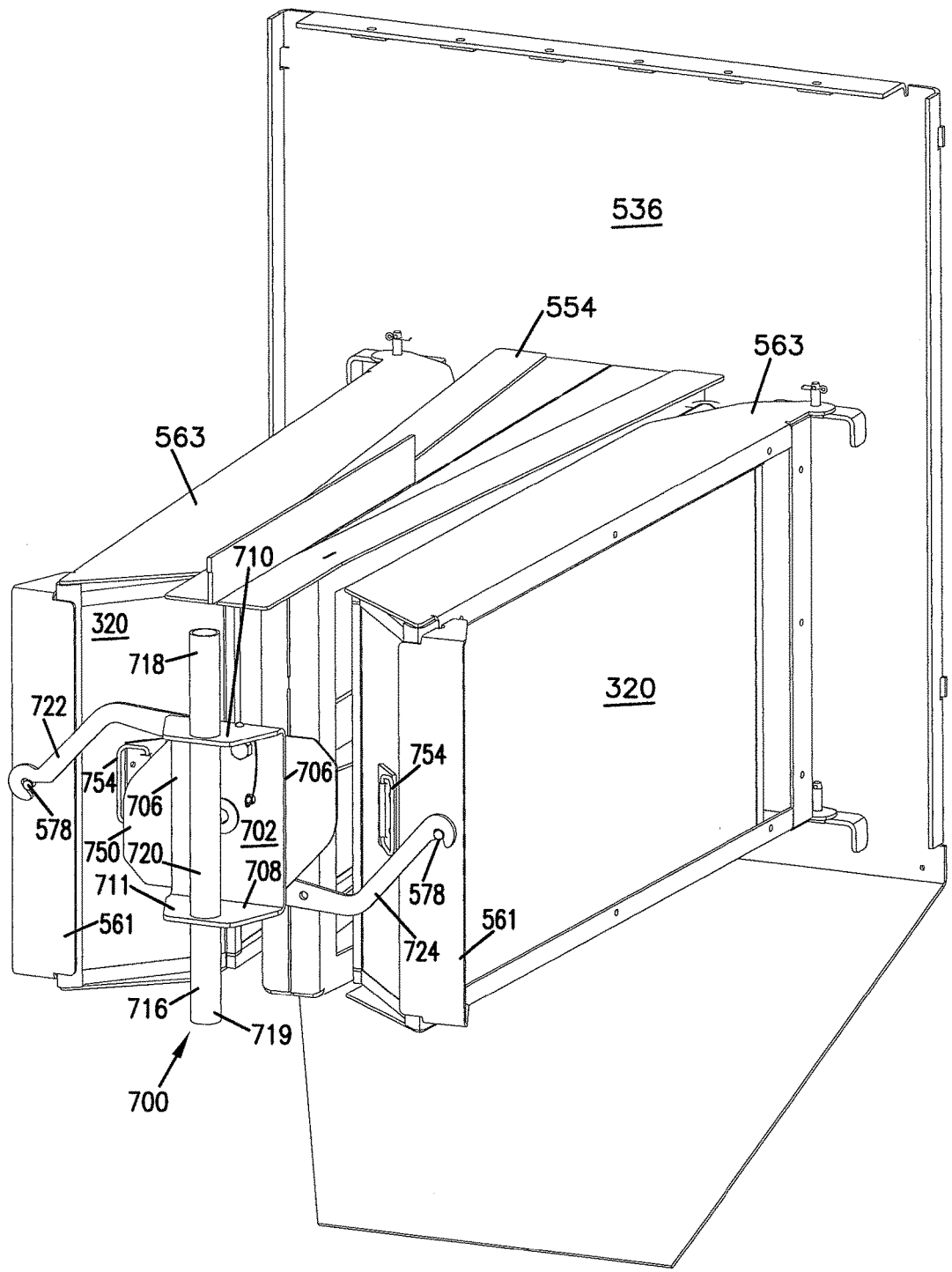
FIG. 58 is a view similar to FIG. 57, with the clamp assembly partially engaged.
Figure 59:
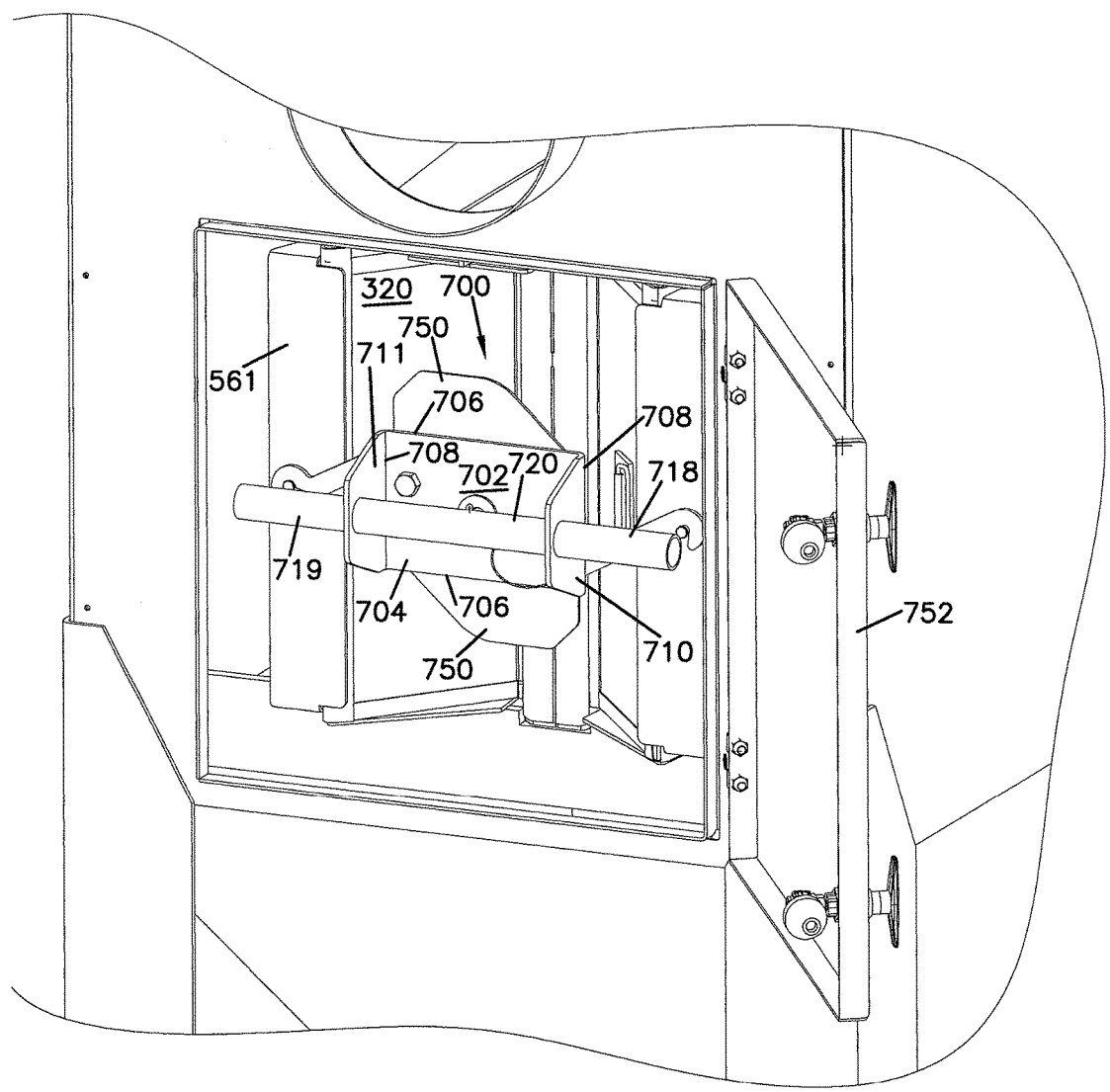
FIG. 59 is a view similar to FIGS. 57 and 58, with the clamp assembly in a clamped or locked position.

In FIGS. 57-59, the dust collector 500 of FIGS. 30-48 has portions depicted schematically, and shows an alternative embodiment of a clamp assembly 700. In FIGS. 57-59, pieces are shown schematically. For example, the frame arrangement 504 shows only the upper half of the frame arrangement, as compared to FIGS. 44 and 45, which shows the complete frame arrangement 504, in which the frame arrangement 504 holds two air filter cartridges 320. In the embodiment of FIGS. 57-59, for purposes of clarity, only the upper half is depicted.

In this embodiment, the clamp assembly 700 includes a plate 702. The plate 702 is depicted as a flat member including an outer side 704 and an opposite side, which is not visible in FIGS. 57-59. The opposite side of the plate 702 is against a portion of the dust collector 500. In this embodiment, specifically, the inner side of the plate 702 is secured to and is against the vertical bar 558 of the V-frame 554. In the embodiment shown, the plate 704 is rectangular in shape having long sides 706 extending between short sides 708.

The plate 702 is pivotable relative to the dust collector 500. In particular, the plate 702 is pivotable relative to the bar 558. By comparing FIG. 58 to FIG. 59, one can see the plate 702 has been pivoted or rotated from a first position in FIG. 58 to a second position in FIG. 59. In FIG. 58, in the first position, the long sides 706 extend vertically, while in FIG. 59, the long sides 706 extend horizontally. As explained below, FIG. 58 corresponds to a release position, while FIG. 59 corresponds to a clamped or locked position.

In this embodiment, the plate 702 further includes a pair of flanges 710, 711 extending from the plate 702. In the embodiment shown, the flanges 710, 711 extend from the short sides 708 of the plate 702. In this embodiment, the flanges 710, 711 are depicted as being generally orthogonal to a remaining portion of the plate 702.

In the preferred arrangement shown, the flanges 710, 711 are integral with, and the same piece of material as a remaining portion of the plate 702. In this embodiment, each of the flanges 710, 711 has a hole 712, 713.

The clamp assembly 700 includes a handle 716. The handle 716 is operatively secured to the plate 702, such that it is constructed and arranged to rotate the plate 702 to move the plate 702 between the release position of FIG. 58 to the clamped or locked position of FIG. 59. In this embodiment, the handle 716 is secured to the plate 702. While a variety of ways are contemplated, in one example, the handle 716 is secured to the plate 702 by passing through the holes 712, 713 of the flanges 710, 711. The handle 716 is secured to the flanges 710, 711, such that the handle 716 has a first grasping portion 718, a second grasping portion 719, and a mid portion 720.

The first grasping portion 718 extends outwardly from the flange 710 and away from the plate 702. The second grasping portion 719 extends from the flange 711 and away from the plate 702. The middle portion 720 extends between the flange 710 and 711 and extends over and adjacent to the plate 702.

In use, a person grasps the handle 716 by placing one hand, typically his right hand, on the first grasping portion 718, while placing his other hand on the second grasping portion 719 and then rotating the handle through an angle, in the example shown, 90 degrees. As the handle is rotated from the release position of FIG. 58 to the clamped position of FIG. 59, the handle 716 is rotated clock-wise about 90 degrees. When the clamp assembly 700 is moved from the clamped or locked position of FIG. 59 to the release position of FIG. 58, the handle 716 is moved counter clock-wise about 90 degrees. It should be understood that the clamp assembly 700 can be designed to move through a variety of ranges of angles, and 90 degrees is just one example. For example, angles greater than 30 degrees and less than 270 degrees can be used.

The clamp assembly 700 further includes a first hooked link 722 and second hooked link 724. The first and second hooked links 722, 724 are secured to the plate 702. Preferably, the first and second hooked links 722, 724 are pivotally connected to the plate 702, such that the hooked links 722, 724 easily swing or pivot relative to the plate 702.

In the embodiment shown, the first hooked link 722 has a plate end 726 secured to the plate 702 and an opposite hooked end 728. The hooked end 728 is also a free end. Analogously, the second hooked link 724 has a plate end 730 and an opposite hooked end 732. The plate end 730 is pivotally secured to the plate 702, as is the plate end 726 secured to the plate 702. The hooked end 732 is also a free end of the second hooked link 724.

The first hooked link 722 has a first section 734 extending from the plate end 726. The first link 722 also has a second section 736 extending between the first section 734 and the hooked end 728. Between the first section 734 and the second section 736 is an elbow 738. The first and second sections 734, 736 are angled there between. In the embodiment shown, the angle is an obtuse angle of about 100-170 degrees.

Analogously, the second hooked link 724 has first and second sections 740, 742 with an elbow 744 there between. The angle between the first section 740 and second section 742 is obtuse, ranging between 100-170 degrees.

The hooked ends 728, 732 define hooks 746, 748. The hooks 746, 748 releasably engage pins or projections 578 that extend from rails 561. The rails 561 are a part of the frame arrangement 504.

It should be appreciated that the first and second hooked links 722, 724 pivot or swing easily relative to the plate 702, when not engaged with the pins 578. In this way, the hooked links 722, 724 can pivot and move out of the way and out of the path of the air filter cartridges 320 during servicing. That is, the first and second hooked links 722, 724 can be pivoted so that they extend vertically downwardly.

In this embodiment, the clamp assembly 700 further includes a flexible flap 750. The flap 750 is adjacent to the plate 702 and extends along the long sides 706 of the plate 702. The flap 750 may be made from a flexible rubber, such that it bends out of the way when the air filter cartridges 320 are removed from the dust collector 500 for servicing. The flap 750 can be used to help prevent fingers or other body parts from being pinched while operating the clamp assembly 700.

In operation, the clamp assembly 700 is utilized as follows: The first and second hooked links 722, 724 are moved or pivoted to a position so that the hooks 746, 748 engage the pins 578 of the respective frame arrangement 504. FIG. 58 shows the hooked links 722, 724 catching or engaging the pins 578. In the position of FIG. 58, the release position, the air filter cartridges 320 are being held within their respective frame arrangements 504 but are in a position pivoted away from the V-frame 554.

Next, the handle 716 is grasped by having a person put one hand on first grasping portion 718 and another hand on second grasping portion 719. Next, the handle 716 is rotated in a clockwise direction (in this example/other designs can work in a counterclockwise direction) to move the handle 716 from the release position into the locked position. While a variety of implementations are possible, in the example shown, the handle 716 is in the release position when it is vertical, and is in the locked position when it is horizontal (FIG. 59).

As the handle 716 is rotated, this rotates the plate 702, which translates into motion moving the first and second hooked links 722, 724. As the hooked links 722, 724 are moved, they pull on the pins 578, which pulls the frames 504 in a direction toward the V-frame 554. This moves the air filter cartridges 320 into sealing engagement with the V-frame 554.

To remove the air filter cartridges 320 from the dust collector 500, a door 752 (FIG. 59) of the dust collector 500 is opened in order to access the interior of the dust collector 500. The clamp 700 is moved from the locked position of FIG. 59 to the release position of FIG. 58 by grasping the handle 716 and rotating it counter clockwise, in this example (in other embodiments, it could be rotated other directions). In this example, the handle 716 is rotated 90 degrees counter clockwise. When handle 716 is rotated to the release position, the plate 702 is rotated, which moves the first and second hooked links 722, 724 and pushes the frame arrangements 504 away from the V-frame 554.

Next, the first and second hooked links 722, 724 are moved so that the hooks 746, 748 no longer engage the pins 578. The first and second hooked links 722, 724 are allowed to swing vertically downwardly so that they are out of the path of the air filter cartridges 320.

Next, the air filter cartridge handles 754 are grasped, and each air filter cartridge 320 is pulled from the frame arrangement 504 and out of the dust collector housing 500. The air filter cartridges 320 may then be replaced and reinstalled, as described above.

V. Example Dust Collector of FIGS. 49-56

Another embodiment of a dust collector is shown in FIGS. 49-56 at 600. The dust collector 600 includes a housing 606. The housing 606 can be made of materials such as sheet metal to form a plurality of walls enclosing the internal components. The housing 606 defines a dirty air inlet 608 (FIG. 51) for taking in dirty, unfiltered air and an outlet 610 for exhausting clean, filtered air.

The housing 606 includes at least one door 626, and in the embodiment shown, a pair of doors 626. The doors 626 are openable and closable in order to access a filter region 618. Located in the filter region 618 are filter cartridges 320. The filter cartridges 320 are the same as the filter cartridges 320, described above. As such, the same reference numerals will be used in connection with description of the air filter cartridges 320 in connection with the dust collector 600 of FIGS. 49-56.

Other features visible for the dust collector 600 include a dust collection hopper 628. The hopper 628 is located under or below the filter region 618 to collect dust or other particulate that falls by gravity from the filter region 618 for various reasons including, for example, reverse pulse cleaning. In general, a blower arrangement can be used to draw air through the housing inlet 608, then through the filter region 618, then to a filtered air side 634 (FIG. 52), and then exhaust the filtered air through the outlet 610.

Figure 52:
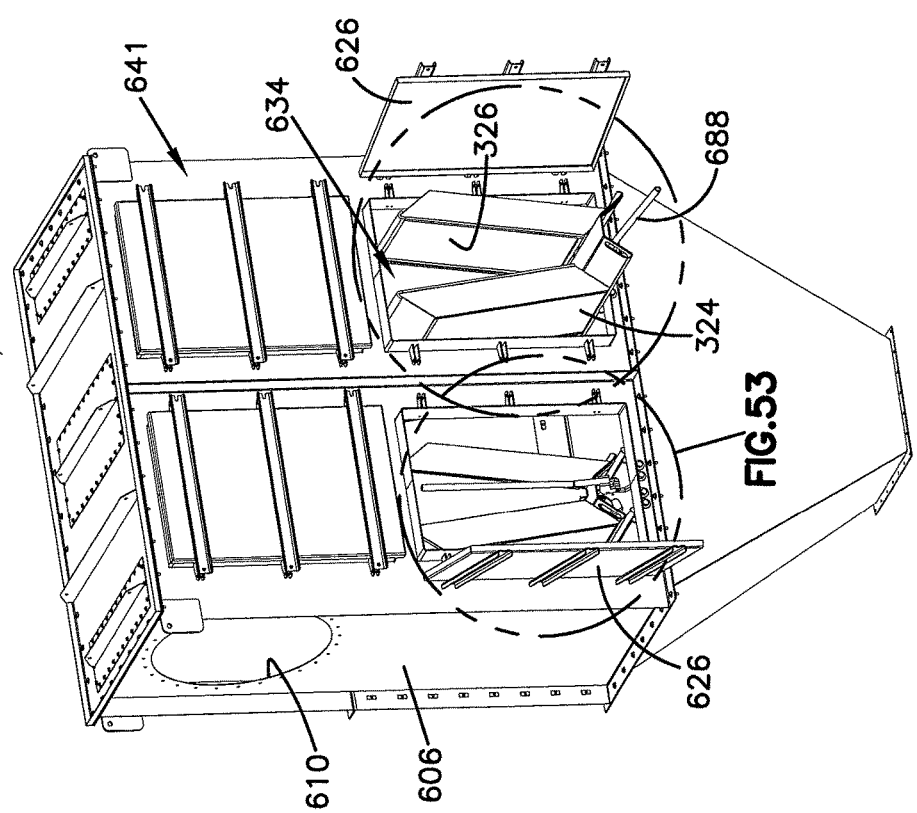
FIG. 52 is a perspective view of the dust collector of FIG. 49, and showing a step of servicing the dust collector by removing filter elements.

The dust collector 600 includes a tube sheet 636 (FIG. 55). The tubesheet 636 is analogous to the tubesheet 536 and tubesheet 360, described above. In this instance, however, the tubesheet 636 is oriented horizontally, as opposed to vertically which is shown in the previous embodiments. The tubesheet 636 functions as a wall that separates an interior volume of the housing 606 between an unfiltered air side or plenum 638 (FIG. 53) and the filtered air side or plenum 634 (FIG. 52).

As with the previous embodiments, the tubesheet 636 has a plurality of holes or apertures therethrough. The apertures are not visible in FIGS. 49-56, but are analogous to the apertures depicted in the previous embodiments. The apertures are for allowing filtered air to flow from the filter region 618 through the tubesheet 636, into the filtered air plenum 634, and then out through the clean air outlet or exhaust 610. In this embodiment, the filter elements used are the same as the air filter cartridges 320, described above. The filter cartridge 320 is sealed with the gasket arrangement 340 against the tubesheet 636 to prevent unfiltered air from passing through apertures in the tubesheet 636. The filter cartridges 320 are also sealed against a frame arrangement 604 (FIGS. 54 and 55) which is discussed further below.

As with the dust collector 350 and dust collector 500, the dust collector 600 includes a reverse pulse cleaning arrangement, the details of which are not depicted in FIGS. 49-56. The reverse pulse cleaning arrangement is constructed and arranged to emit a pulse of air from the filtered air plenum 634 and through the downstream flow faces 326 (FIG. 52) of each of the air filter cartridges 320. By pulsing air from the clean air side 634 through the downstream flow faces 326, dust and other debris clogging the upstream flow faces 324 (FIG. 52) of the air filter cartridges 320 are dislodged and knocked loose from the air filter cartridge 320. From there, the dust and debris fall by gravity into the dust collection hopper 628 located below the filter region 618. For the dust collector 600, the reverse pulse cleaning arrangement is located in region 641 (FIGS. 49 and 52), which is vertically above and over the horizontal tubesheet 636.

In reference now to FIGS. 54 and 55, the frame arrangement 604 is provided to help hold the filter cartridges 320 in sealing engagement against the tubesheet 636. In FIG. 54, it can be seen how the frame 604 is generally triangular in appearance, such that it forms a V-shape. The edges of the V-shaped frame arrangement 604 can be seen at 650, 651. These edges 650, 641 form sealing surfaces 652, 653 for engagement with the perimeter gasket member 341 (FIG. 55) of the air filter cartridge 320.

In FIG. 55, it can be seen how the dust collector housing 606 includes a guide ramp 694 projecting from the tubesheet 636. The guide ramp 694 is adjacent to the sealing surface of the tubesheet 636 and is constructed and arranged to orient the air filter cartridge 320 in sealing engagement against the tubesheet 636. As can be seen in FIG. 55, the ramp 694 is angled from the tubesheet 636 in a direction that is generally non-coplanar and non-orthogonally with respect to the tubesheet 636. In practice, as each filter cartridge 320 is oriented in an operable position within the housing 606, the end of the air filter cartridge 320 nearest the tubesheet 636 engages the ramp 694. The ramp 694 helps to slide and guide the air filter cartridge 320 into place with the side gasket member 342 engaging and abutting against the tubesheet 636.

In reference now to FIG. 56, the dust collector 600 further includes a cartridge holder tray 660. The cartridge holder tray 660 is for holding and supporting the filter cartridges 320 in place within the housing 606. In the embodiment shown, the cartridge holder tray 660 includes first and second ramped surfaces 661, 662 angled in a direction toward each other. While a variety of embodiments are possible, in the embodiment shown, the first ramped surface 661 and the second ramped surface 662 are separated by a section 664. In the embodiment depicted, the section 664 is generally horizontal and flat.

At the base of each of the ramped surfaces 661, 662, which is the edge opposite from the middle section 664, the cartridge holder tray 660 includes upwardly extending edges 666, 667. The edge 666 is angled relative to the first ramped surface 661. The angle between the edge 666 and the first ramp surface 661, in the embodiment shown, is not greater than 90 degrees, and preferably is about the same or within a few degrees larger than the angle of the media pack 322 of the filter cartridge 320. For example, as discussed above, in the embodiment of FIGS. 8-10 each strip 334 of the media pack 322 is angled relative to a horizontal surface from the upstream flow face 324 to the downstream flow face 326 at an angle of 20-80 degrees, for example, 30-60 degrees, and more particularly 40-50 degrees. This angle of the edge 666 relative to the first ramped surface 661 helps to securely hold the air filter cartridge 322 in place on the first ramp surface 661. As can be seen in FIG. 56, the edge 666 is relatively short compared to the length of the first ramped surface 661, in that it is no greater than 25% of the length of the first ramped surface.

The second edge 667 is structured analogously as the first edge 666. The second edge 667 is angled relative to the second ramped surface 662 in the same way as the edge 666 is relative to the first ramped surface 661.

The first and second ramped surfaces 661, 662 converge toward each other as they go from the edges 666, 667 to the middle section 664. That is, the cartridge holder tray 660 is widest in dimension between the ends of the ramped surfaces 661, 662 where the edges 666, 667 are formed. The cartridge holder tray 660 is at its narrowest along the middle section 664.

As can be seen in FIG. 55, the cartridge holder tray 660 holds a pair of filter cartridges 320 in a generally v-shape. The cartridges 320 are located closest to each other adjacent to the middle section 664 of the cartridge holder tray 660 and at the intersection of the downstream flow face 326 and the second side panel 337.

In reference again to FIG. 56, the cartridge holder tray 660 further includes, in this embodiment, a handle arrangement 670. The handle arrangement 670 is provided so that a person servicing the dust collector 600 can more easily manipulate the filter cartridges 320 in order to remove them and replace them with new filter cartridges 320. In the embodiment shown, the handle arrangement 670 is shown as at least one, and preferably a pair of holes 672, 673 in the first ramped surface 661 and second ramped surface 672. As can be seen in FIG. 56, the holes 672, 673 are elongated and generally extend from a portion adjacent the edges 666, 667 up to the middle section 664. The holes 672, 673 are sized to accommodate at least a few fingers of a human hand and are spaced from end edge 675 so that a handle section 678 may be grasped by a human hand. This allows a person to hold onto the cartridge holder tray 660 during servicing. This will be discussed more fully below.

In this embodiment, the cartridge holder tray 660 is slidably held on a lift assembly 680. The lift assembly 680, in general, is constructed and arranged to move the cartridge holder tray 660 and any air filter cartridges 320 mounted thereon, between a sealed position, in which the air filter cartridge 320 is sealed against the tubesheet 636, and a service position in which the air filter cartridge 320 is spaced away from the tubesheet 636 and can be removed from the housing 606.

In the embodiment shown, the lift assembly 680 includes a bracket 682 that allows it to be fastened or connected to the housing 606. The bracket 682 generally extends the length of the cartridge holder tray 660 and the length of the second side panel 337 of the filter cartridge 320. A platform 684 is connected to the bracket 682 and may be raised or lowered through a camming mechanism 686 through action of a lever 688. The platform 684 holds at least one, and preferably a plurality of rollers 690. The rollers 690 engage against a bottom side 665 of middle section 664 of the cartridge holder tray 660. When the lift assembly 680 is in a service position, the cartridge holder tray 660 may be moved, by sliding it relative to the platform 684. The rollers 690 engage against the bottom side 665 of the cartridge holder tray 660, to allow the cartridge holder tray 660 to easily move relative to the platform 684 and the overall lift assembly 680.

The lever 688 is movable between the sealed position and the service position, as characterized above. In the sealed position, the lever 688 is oriented generally vertically, as can be seen in FIG. 55. This position also allows the doors 626 (FIG. 49) of the housing 606 to be closed. When in the sealed position, the lever 688 has moved the camming mechanism 686 so that the platform 684 is raised vertically upwardly to move the platform 684, the cartridge holder tray 660, and the filter cartridges 320 in a direction vertically upwardly, toward the tubesheet 636 so that the air filter cartridges 320 are in sealing engagement against the tubesheet 636.

The lever 688 is movable from the sealing position to the service position, as shown in FIG. 52. In the servicing position, the lever 688 is generally horizontal and extends out of the housing 606 through the opening created by open doors 626. When the lever 688 is moved from the sealed position to the servicing position, the motion of the lever 688 moves the camming mechanism 686 in a way that lowers the platform 684. When the platform 684 is lowered, this lowers the cartridge holder tray 660, the air filter cartridges 320 mounted thereon, and thus moves the filter cartridges 320 from sealing engagement against the tubesheet 636. The person servicing the dust collector 600 may then grasp the handle arrangement 670 and move the cartridge holder tray 660 relative to the platform 684 by rolling the tray 660 against the rollers 690 and move the tray with the filter cartridges 320 from inside of the housing 606 to at least partially outside the housing 606.

After a period of use, the air filter cartridges 320 will need replacement. To service the dust collector 600, the door 626 of the housing 606 is open. The pair of filter cartridges 320 are moved out of sealing position by moving or pivoting the lever 688. The lever 688 is moved from the vertical position of FIG. 54, which also is a sealed position, and pivoted to a release position or servicing position, which is the horizontal position shown in FIG. 52. When the lever 688 is pivoted, this moves the camming mechanism 686, which causes the platform 684 to move vertically into a lower position. When the platform 684 is moved lower, this lowers the tray 660, which also lowers the pair of air filter cartridges 320. This also releases the seal between the air filter cartridges 320 and the tubesheet 636.

Next, the tray 660 is slid relative to the housing 606, by moving the tray 660 relative to the platform 684 of the lift assembly 680. The person servicing may do this by grasping the handle section 678 and applying a pulling force to the tray 660, so that the tray 660 rolls against the rollers 690 on the platform 684.

This action moves the air filter cartridges 320 outside of the housing 606 and allows access. The old air filter cartridges 320 are removed and recycled, incinerated, or otherwise discarded. A new pair of filter cartridges 320 are provided. The new filter cartridges 320 are oriented on the tray 660 by placing the panel 337 against the first ramped surface 661, for a first of the air filter cartridges 320, and placing a respective second filter cartridge 320 having panel 337 against the second ramp surface 662. The first and second filter cartridges 320 are held in the tray 660 by the respective edges 666, 667, as well as the first and second ramped surfaces 661, 662, respectively.

The tray 660 holding the filter cartridges 320 is then rolled or slid back into the housing 606 by moving the tray 660 relative to the platform 684. The filter cartridges 320 are moved in place, so that they are positioned underneath the tubesheet 636. The lever 688 is then moved or pivoted from the service position to the sealed position, by moving the lever 688 to a vertical position. This moves the camming mechanism 686, which causes the platform 684 to rise, moving the tray 660 and the filter cartridges 320 vertically upwardly until the gasket 342 forms a seal with the tubesheet 636. The guide ramp 694 helps to appropriately guide the air filter cartridges 320 in place.

Next, the doors 626 are closed, and the dust collector 600 is again ready for filtration operation.

The above provides examples of principles of the invention. Many embodiments can be made using these principles. It is noted that not all the specific features described herein need to be incorporated in an arrangement for the arrangement to have some selected advantage according to the present disclosure.

I claim:

1. An air filter cartridge comprising:
   (a) a media pack having upstream and downstream opposite flow faces, first and second opposite sides extending between the upstream and downstream opposite flow faces, and third and fourth opposite sides extending between the upstream and downstream opposite flow faces;
   (b) first and second side panels arranged parallel to each other with the media pack therebetween;
   (c) a third side panel against the third side of the media pack;
   (d) a fourth side panel against the fourth side of the media pack;
   (e) a handle secured to at least one of the first, second, third, and fourth side panels; and
   (f) a gasket arrangement including:
      (i) a perimeter gasket member around a perimeter of the downstream flow face to form a window, with an opening in the window exposing the downstream flow face; and
      (ii) a side gasket member adjacent to the perimeter gasket member without a gap in between, and adjacent to at least a partial extension of the first side panel; the side gasket member including no portion against the second side panel, third side panel, and fourth side panel; the side gasket member configured to create a seal by compression of the side gasket member with a tubesheet, when the air filter cartridge is installed in a tubesheet.

2. The air filter cartridge of claim 1 wherein the side gasket member and the perimeter gasket member include at least two separate pieces attached or fitted together.

3. The air filter cartridge of claim 2 wherein the side gasket member extends against the first side panel from the downstream flow face a distance no greater than 40% of an overall length of the first side panel.

4. The air filter cartridge of claim 3 wherein the handle is centered on the at least one of the first, second, third, and fourth side panels.

5. The air filter cartridge of claim 4 wherein the handle includes a grasping ring that is movable from against the at least one of the first, second, third, and fourth side panels.

6. The air filter cartridge of claim 4 wherein the side gasket member is angled 30-60° relative to the downstream flow face.

7. The air filter cartridge of claim 4 wherein the side gasket member is angled 45-50° relative to the downstream flow face.

8. The air filter cartridge of claim 1 wherein the media pack comprises a stack of strips of single facer filter media material, each strip including a fluted media sheet secured to a facing media sheet and oriented with flutes of each fluted sheet extending in a direction between the upstream and downstream flow faces.

9. The air filter cartridge of claim 1 wherein the handle is secured to the third side panel.

10. The air filter cartridge of claim 4 wherein the media pack includes one of pleated media, or Z-media.

11. The air filter cartridge of claim 1 wherein the handle is secured to the fourth side panel.

12. The air filter cartridge of claim 1 further including adhesive securing the gasket arrangement to the cartridge.

13. The air filter cartridge of claim 1 wherein the first side panel, second side panel, third side panel, and fourth side panel comprise rigid plastic.

14. The air filter cartridge of claim 1 wherein the first side panel, second side panel, third side panel, and fourth side panel comprise metal.

* * * * *